United States Patent [19]
Cornett et al.

[11] Patent Number: 5,216,612
[45] Date of Patent: Jun. 1, 1993

[54] INTELLIGENT COMPUTER INTEGRATED MAINTENANCE SYSTEM AND METHOD

[75] Inventors: Rickey R. Cornett, Dobson; R. Victor Walsh; Ronald S. Willard, both of Winston-Salem; Michael Z. Johnston, Kernersville; Jaime P. Saluta, Winston-Salem; Daniel J. Tylak, Lewisville; Michael J. Bird, Clemmons, all of N.C.

[73] Assignee: R. J. Reynolds Tobacco Company, Winston-Salem, N.C.

[21] Appl. No.: 552,728

[22] Filed: Jul. 16, 1990

[51] Int. Cl.$^5$ ............................................. G06F 15/46
[52] U.S. Cl. ..................................... 364/468; 364/401
[58] Field of Search ................ 364/468, 478, 401–403, 364/131–135, 550, 551.01, 551.02, DIG. 1, DIG. 2, 469–473, 474.01–474.37, 476, 477, 149–151, 156

[56] References Cited

U.S. PATENT DOCUMENTS

| | | | |
|---|---|---|---|
| 4,073,005 | 2/1978 | Parkin | 364/200 |
| 4,087,836 | 5/1978 | DeFoe | 358/44 |
| 4,151,590 | 4/1979 | Azegami | 318/591 |
| 4,304,001 | 12/1981 | Cope | 371/8 |
| 4,346,446 | 8/1982 | Erbstein et al. | 364/551 |
| 4,383,298 | 5/1983 | Huff et al. | 364/464.01 X |
| 4,457,772 | 7/1984 | Haynes et al. | 364/476 |
| 4,472,783 | 9/1984 | Johnstone et al. | 364/468 X |
| 4,484,270 | 11/1984 | Quernemoen et al. | 364/200 |
| 4,495,582 | 1/1985 | Dessert et al. | 364/469 |
| 4,530,134 | 7/1985 | Hösel | 19/105 |
| 4,634,572 | 1/1987 | Lichti | 419/44 |
| 4,668,026 | 8/1987 | Scribner et al. | 340/572 |
| 4,675,675 | 6/1987 | Corwin et al. | 340/945 |
| 4,698,766 | 10/1987 | Entwistle et al. | 364/468 |
| 4,788,531 | 11/1988 | Corwin et al. | 340/945 |
| 4,803,634 | 2/1989 | Ohno et al. | 364/478 |
| 4,827,423 | 5/1989 | Beasley et al. | 364/468 |
| 5,089,970 | 2/1992 | Lee et al. | 364/468 |
| 5,146,404 | 9/1992 | Calloway et al. | 364/403 X |

FOREIGN PATENT DOCUMENTS 57-6958  1/1982  Japan.

OTHER PUBLICATIONS

Imaging System Bridges Gap in Maintenance Computerization, Maintenance Technology, Jul. 1990, pp. 75, 76 and 78.

Primary Examiner—Joseph Ruggiero
Attorney, Agent, or Firm—Grover M. Myers; Mitchell S. Bigel

[57] ABSTRACT

An intelligent computer integrated maintenance system and method includes an electronically stored parts manual which contains a hierarchical listing of all parts in production machines, and a maintenance operations computer controller which includes a maintenance schedule management subsystem, an engineering change control subsystem, a parts manual management subsystem and a spares inventory management subsystem. The maintenance schedule management subsystem obtains a schedule of actual and planned production, and groups maintenance activities in order to minimize lost production time. The engineering change control subsystem integrates engineering change activities with maintenance activities to maximize production time. The automated parts manual is also updated to account for engineering changes. The spare parts inventory management subsystem orders spare parts based on predicted maintenance rather than on prescribed inventory levels. Production efficiency is thereby maximized, as is the use of available maintenance manpower. Engineering changes are easily accommodated and spare parts inventory is kept to a minimum.

165 Claims, 46 Drawing Sheets

|  | WEEK |  |  |  |  |  |  |  |  |
| --- | --- | --- | --- | --- | --- | --- | --- | --- | --- |
|  | 1 | 2 | 3 | 4 | ... | 25 | 26 | 27 | 28 ... |
| TIME DEPENDENT (RS) | | | | | | | | | |
| MAN HOURS | — | — | 5 | 4 | | 2 | 8 | 3 | 2 |
| MACHINE HOURS | — | — | 2 | 3 | | 2 | 4 | 1 | 2 |
| USAGE DEPENDENT (PRODN.) | | | | | | | | | |
| MAN HOURS | 8 | 3 | 1 | 8 | | 2 | 4 | 2 | 3 |
| MACHINE HOURS | 4 | 2 | 1 | 4 | | 2 | 3 | 2 | 3 |
| MIC DIRECTIVES (MR) | | | | | | | | | |
| MAN HOURS | 3 | 2 | — | 5 | | — | 8 | 5 | 1 |
| MACHINE HOURS | 3 | 3 | — | 5 | | — | 10 | 2 | 1 |
| TOTAL CAPACITY REQUIRED | | | | | | | | | |
| MAN HOURS | 11 | 5 | 6 | 17 | | 4 | 20 | 10 | 6 |
| MACHINE HOURS | 7 | 5 | 3 | 12 | | 4 | 17 | 5 | 6 |
| HOURS AVAILABLE* | | | | | | | | | |
| MAN HOURS | 10 | 10 | 10 | 10 | | 10 | 10 | 10 | 10 |
| MACHINE HOURS | 10 | 10 | 10 | 10 | | 10 | 10 | 10 | 10 |
| CAPACITY REMAINING | | | | | | | | | |
| MAN HOURS | −1 | 5 | 4 | −7 | | 6 | −10 | — | 4 |
| MACHINE HOURS | 3 | 5 | 7 | −2 | | 6 | −7 | 5 | 4 |
| RESCHEDULED HOURS | | | | | | | | | |
| MAN HOURS | | 4(b) | 4(a) | | | 6(d) | | | 4(e) |
| MACHINE HOURS | | | 2(c) | | | 6(f) | | 1(g) | |

\* TOTAL HOURS − 40% RESERVED FOR UNPLANNED MAINTENANCE

RESCHEDULING OPERATIONS
(a) 4 HOURS OF MANHOUR CAPACITY SHORTAGE IN WEEK 4 WERE MOVED TO WEEK 3.
(b) 1 HOUR OF MANHOUR CAPACITY SHORTAGE IN WEEK 1 WAS MOVED TO WEEK 2, ALONG WITH THE REMAINING HOURS OF SHORTAGE FROM WEEK 4.
(c) 2 HOURS OF MACHINE HOUR SHORTAGE WAS MOVED FROM WEEK 4 TO WEEK 3.
(d) 6 HOURS OF MANHOUR CAPACITY SHORTAGE IN WEEK 26 WERE MOVED TO WEEK 25.
(e) 4 HOURS OF MANHOUR CAPACITY SHORTAGE IN WEEK 26 WERE MOVED TO WEEK 28.
(f) 6 HOURS OF MACHINE HOUR CAPACITY SHORTAGE IN WEEK 26 WERE MOVED TO WEEK 25.
(g) 1 HOUR OF THE MACHINE HOUR CAPACITY SHORTAGE IN WEEK 26 WAS MOVED TO WEEK 27.

FIG. 2

PRODUCTION/MAINTENANCE PLANNING

COMPLEX SCHEDULE

| COMPLEX | ACT HRS | WEEK 1 | 2 | 3 | 4 | 5 | 6 | 7 | 8 |
|---|---|---|---|---|---|---|---|---|---|
| 1A-1 | 800 | P | P | P | P | M₁ | P | P | P |
| 1A-2 | 800 | P | P | M₂ | P | I | P | P | P |
| 1A-3 | 800 | P | P | P | P | P | P | P | P |
| 3A-1* | 800 | P | P | P | M₃ | I | I | I | P |
| 3A-2 | 600 | P | P | P | P | P | P | P | P |
| 3A-3 | 700 | P | P | M₄ | P | P | M₅ | P | P |

*NOTE: 3A-1 BRAND UNDER INVENTORY TARGET (4)
P = PRODUCTION
M = MAINTENANCE
I = IDLE

MIC-DIRECTIVES AND TIME DEPENDENT MAINTENANCE REQUESTS

| MAINTENANCE REQUEST | COMPLEX | WEEK |
|---|---|---|
| MR1-MIC MOD | 1A-1 | 5 |
| MR2-MIC UPGRADE | 1A-2 | 3 |
| MR3-RS | 3A-1 | 4 |
| MR4-RS | 3A-3 | 3 |
| MR5-RS | 3A-3 | 6 |

FIG. 8A

PRODUCTION/MAINTENANCE PLANNING

COMPLEX SCHEDULE

| COMPLEX | | ACT HRS | WEEK 1 | 2 | 3 | 4 | 5 | 6 | 7 | 8 |
|---|---|---|---|---|---|---|---|---|---|---|
| | 1A-1 | 800 | P | P | P | P/M | M₁ | P | P | P |
| | 1A-2 | 800 | P | P | M₂ | P | — | P/M | P | P |
| | 1A-3 | 800 | P | P | P | P/M | P | P | P | P |
| | 3A-1* | 800 | P | P | P | M₃ | — | — | P/M | P |
| | 3A-2 | 600 | P | P | P | P | P | P/M | P | P |
| | 3A-3 | 700 | P | P | M₄ | P | P | M₅ | P/M | P |

*NOTE: 3A-1 BRAND UNDER INVENTORY TARGET (4)
P = PRODUCTION
M = MAINTENANCE
I = IDLE
P/M = USAGE DEPENDENT MAINTENANCE

MIC-DIRECTIVES/MODS AND TIME DEPENDENT MAINTENANCE REQUESTS

| MAINTENANCE REQUEST | COMPLEX | WEEK |
|---|---|---|
| MR1-MIC MOD | 1A-1 | 5 |
| MR2-MIC UPGRADE | 1A-2 | 3 |
| MR3-RS | 3A-1 | 4 |
| MR4-RS | 3A-3 | 3 |
| MR5-RS | 3A-3 | 6 |

FIG. 8B

PRODUCTION/MAINTENANCE PLANNING

COMPLEX SCHEDULE

| COMPLEX | ACT HRS | WEEK 1 | 2 | 3 | 4 | 5 | 6 | 7 | 8 |
|---|---|---|---|---|---|---|---|---|---|
| 1A-1 | 800 | P | P | P | P | $M_{1,5}$ | P | P | P |
| 1A-2 | 800 | P | P | $M_2$ | P | $M_7$ | P | P | P |
| 1A-3 | 800 | P | P | P | $M_6$ | P | P | P | P |
| 3A-1* | 800 | P | P | P | P | $M_{3,9}$ | P | P | P |
| 3A-2 | 600 | P | P | P | P | P | I | P | P |
| 3A-3 | 700 | P | P | $M_4$ | P | P | $M_{10}$ | P | P |

*NOTE: 3A-1 BRAND UNDER INVENTORY TARGET (4)
P = PRODUCTION
M = MAINTENANCE
I = IDLE

ACTIONS TAKEN TO REASSIGN MAINTENANCE TIMES
- 1A-1  MOVE P/M TO 5
- 1A-2  MOVE P/M TO 5
- 1A-3  SCHEDULE P/M
- 3A-1  MOVE $M_3$ TO 5; COMBINE WITH P/M 6
- 3A-2  SCHEDULE P/M TO 6
- 3A-3  MOVE P/M TO 6; COMBINE WITH $M_5$

MIC-DIRECTIVES/MODS, TIME DEPENDENT AND USAGE DEPENDANT MAINTENANCE REQUESTS

| MAINTENANCE REQUEST | COMPLEX | WEEK |
|---|---|---|
| MR1-MIC MOD | 1A-1 | 5 |
| MR2-MIC UPGRADE | 1A-2 | 3 |
| MR3-RS | 3A-1 | 4 5 |
| MR4-RS | 3A-3 | 3 |
| MR5-RS | 3A-3 | 6 |
| MR6-PM | 1A-1 | 5 |
| MR7-PM | 1A-2 | 5 |
| MR8-PM | 1A-3 | 4 |
| MR9-PM | 3A-1 | 5 |
| MR10-PM | 3A-2 | 6 |
| MR11-PM | 3A-3 | 6 |

FIG. 8C

PRODUCTION/MAINTENANCE PLANNING

COMPLEX SCHEDULE

| COMPLEX | | WEEK | | | | | | | |
|---|---|---|---|---|---|---|---|---|---|
| | ACT HRS | 1 | 2 | 3 | 4 | 5 | 6 | 7 | 8 |
| 1A-1 | 800 | P | P | P | $M_{1,6}$ | P | P | P |
| 1A-2 | 800 | P | P | $M_2$ | P | $M_7$ | P | P | P |
| 1A-3 | 800 | P | P | P | $M_8$ | P | P | P | P |
| 3A-1* | 800 | P | P | P | P | I | $M_{3,9}$ | $M_{10}$ | P |
| 3A-2 | 600 | P | P | P | P | P | P | P | P |
| 3A-3 | 700 | P | P | $M_4$ | P | P | $M_{5,11}$ | P | P |

*NOTE: 3A-1 BRAND UNDER INVENTORY TARGET (4)
P = PRODUCTION
M = MAINTENANCE
I = IDLE

ASSUMPTION: ONLY TWO MAINTENANCE OPERATIONS PER WEEK
3A-1  MOVE $M_{3,9}$ TO 6
3A-2  MOVE $M_{10}$ TO 7

MIC—DIRECTIVES/MODS,
TIME DEPENDENT AND
USAGE DEPENDANT
MAINTENANCE REQUESTS

| MAINTENANCE REQUEST | COMPLEX | WEEK |
|---|---|---|
| MR1—MIC MOD | 1A-1 | 5 |
| MR2—MIC UPGRADE | 1A-2 | 3 |
| MR3—RS | 3A-1 | 5̶ 6 |
| MR4—RS | 3A-3 | 3 |
| MR5—RS | 3A-3 | 6 |
| MR6—PM | 1A-1 | 5 |
| MR7—PM | 1A-2 | 5 |
| MR8—PM | 1A-3 | 4 |
| MR9—PM | 3A-1 | 5̶ 6 |
| MR10—PM | 3A-2 | 6̶ 7 |
| MR11—PM | 3A-3 | 6 |

FIG. 8D

PRE010BN— EXPLODED BILL OF MATERIAL FOR MACHINE 1175 UNIT 01 COMPLEX 1 PAGE 1

| LEVEL | QTY PER | QTY REQD | DRAWING SEQ | VENDOR PART | DESCRIPTION | PART | SCRAP FACTOR | EFFECTIVITY | EFF DATE | STOCKED |
|---|---|---|---|---|---|---|---|---|---|---|
| 1 | 1 | 1 | 0001 | 010101 PACKER | PACKER FOR UNIT 01 COM | 1176 | | | | |
| 1 | 1 | 1 | 0002 | 010101 MAKER | MAKER FOR UNIT 01 COMP | 1177 | | | | |
| 1 | 1 | 1 | 0002 | 010101 OVERWRAP | OVERWRAP FOR UNIT 01 C | 1178 | | | | |
| 2 | 1 | 1 | 0001 | 21A-01 | FRAME SUCKERS | 1187 | | | | |
| .3 | 1 | 1 | 0001 | 0051.00 | 21A0051.00 | 1188 | | 1010A | 02/10/ | |
| .4 | 1 | 1 | 0000 | 0051.01.01 | REVISED 21A0051.01 | 2111 | | 1010D | 02/10/ | |
| .4 | 1 | 1 | 0001 | 0051.01 | 21A0051.01 | 1216 | | | | |
| .5 | 1 | 1 | 0001 | 029 | DISTRIBUTOR | 1189 | | | | |
| .5 | 1 | 1 | 0002 | 4001023014 | RING NUT | 1190 | | | | |
| .5 | 2 | 2 | 0003 | 5807000001 | THREADED PLUG | 1191 | | | | |
| .5 | 2 | 2 | 0004 | 3514001003 | GASKET | 1192 | | | | |
| .5 | 1 | 1 | 0005 | 4030 | DISTRIBUTOR | 1193 | | | | |
| .5 | 1 | 1 | 0005 | 4030.01 | DISTRIBUTOR REPLACEMENT | 2113 | | 1011D | 02/04/ | |
| .5 | 1 | 1 | 0006 | 4001031018 | TUBE CONNECTION | 1194 | | 1011A | 02/05/ | |
| .5 | 4 | 4 | 0007 | 2514001003 | GASKET | 1192 | | | | |
| .5 | 4 | 4 | 0008 | 2516707003 | TIE-WRAP | 1195 | | | | |
| .5 | 2 | 2 | 0009 | 2514203104 | PLUG/STOPPER | 1196 | | | | |
| .5 | 2 | 2 | 0010 | 2514001004 | GASKET | 1197 | | | | |
| 3 | 1 | 1 | 0001 | A0124.00 | 21A0124.00 | 1198 | | | | |
| .4 | 1 | 1 | 0001 | A0124.01 | 21A0124.01 | 1199 | | | | |
| .5 | 1 | 1 | 0001 | 4668 | SUPPORT | 1200 | | | | |
| .5 | 1 | 1 | 0002 | 876 | COVER | 1201 | | | | |
| .5 | 4 | 4 | 0003 | 2520505006 | SCREW | 1202 | | | | |
| .5 | 4 | 4 | 0004 | 2520506011 | SCREW | 1203 | | | | |

FIG. 12A

EXPLODED BILL OF MATERIAL FOR MACHINE 1175 UNIT 01 COMPLEX 1 PAGE 1

| PREOIOBN-LEVEL | QTY PER | EXPLODED QTY REQD | DRAWING SEQ | VENDOR PART | DESCRIPTION | PART | SCRAP FACTOR | EFFECTIVITY | EFF DATE | STOCKED |
|---|---|---|---|---|---|---|---|---|---|---|
| .5 | 1 | 1 | 0005 | 2513102149 | GASKET | 1204 | | | | |
| .5 | 1 | 1 | 0006 | 4001073017 | GEAR | 1205 | | | | |
| .5 | 1 | 1 | 0007 | 4675 | SHAFT | 1206 | | | | |
| .5 | 1 | 1 | 0008 | 2520506008 | SCREW | 1207 | | | | |
| .5 | 1 | 1 | 0009 | 2519709l2 | PIN | 1208 | | | | |
| .5 | 1 | 1 | 0010 | 2519530008 | RING NUT | 1209 | | | | |
| .5 | 1 | 1 | 0011 | 2508121008 | BEARING | 1210 | | | | |
| .5 | 1 | 1 | 0012 | 2509804020 | BEARING | 1211 | | | | |
| .5 | 1 | 1 | 0013 | 4672 | GEAR | 1212 | | | | |
| .5 | 1 | 1 | 0014 | 4671 | SHAFT | 1213 | | | | |
| .5 | 1 | 1 | 0015 | 4001019060 | KEY | 1214 | | | | |
| .5 | 1 | 1 | 0016 | 2519530007 | RING NUT | 1215 | | | | |
| .5 | 1 | 1 | 0017 | 2508102005 | BEARING | 1217 | | | | |
| .5 | 1 | 1 | 0018 | 4669 | SUPPORT | 1218 | | | | |
| .5 | 1 | 1 | 0019 | 4670 | COVER | 1219 | | | | |
| .5 | 4 | 4 | 0020 | 2520503001 | SCREW | 1220 | | | | |
| .5 | 4 | 4 | 0021 | 2520505002 | SCREW | 1221 | | | | |
| .5 | 1 | 1 | 0022 | 2508124019 | BEARING | 1222 | | | | |
| .5 | 1 | 1 | 0023 | 2519104043 | RING | 1223 | | | | |
| .5 | 1 | 1 | 0024 | 2513101104 | SEAL | 1224 | | | | |
| .5 | 1 | 1 | 0025 | 4676 | PIN | 1225 | | | | |
| .5 | 1 | 1 | 0026 | 2513102055 | GASKET | 1226 | | | | |
| .5 | 1 | 1 | 0027 | 2508301003 | CAM FOLLOWER | 1227 | | | | |
| .5 | 1 | 1 | 0028 | 2519601010 | WASHER | 1020 | | | | |
| .5 | 1 | 1 | 0029 | 2519602010 | WASHER | 1057 | | | | |
| .5 | 1 | 1 | 0030 | 2519553019 | NUT | 1228 | | | | |
| .5 | 1 | 1 | 0031 | 4677 | FLANGE | 1229 | | | | |
| .5 | 3 | 3 | 0032 | 2520505009 | SCREW | 1230 | | | | |

FIG. 12B

PRE010BN-02/02/ EXPLODED BILL OF MATERIAL FOR MACHINE 1175 UNIT 01 COMPLEX 1    PAGE 1
AS OF 02/05/

| LEVEL | QTY PER | QTY REQD | DRAWING SEQ | VENDOR PART | DESCRIPTION | PART | SCRAP FACTOR | EFFECTIVITY | EFF DATE | STOCKED |
|---|---|---|---|---|---|---|---|---|---|---|
| 1 | 1 | 1 | 0001 | 010101 PACKER | PACKER FOR UNIT 01 COM | 1176 | | | | |
| 1 | 1 | 1 | 0002 | 010101 MAKER | MAKER FOR UNIT 01 COMP | 1177 | | | | |
| 1 | 1 | 1 | 0003 | 010101 OVERWRAP | OVERWRAP FOR UNIT 01 C | 1178 | | | | |
| ..2 | 1 | 1 | 0001 | 21A-01 | FRAME SUCKERS | 1187 | | | | |
| ...3 | 1 | 1 | 0001 | 0051.00 | 21A0051.00 | 1188 | | 10100 | 02/10/ | |
| ....4 | 1 | 1 | 0001 | 0051.01 | 21A0051.01 | 1216 | | | | |
| .....5 | 1 | 1 | 0001 | 4029 | DISTRIBUTOR | 1189 | | | | |
| .....5 | 1 | 1 | 0002 | 4001023014 | RING NUT | 1190 | | | | |
| .....5 | 2 | 2 | 0003 | 5807000001 | THREADED PLUG | 1191 | | | | |
| .....5 | 2 | 2 | 0004 | 2514001003 | GASKET | 1192 | | | | |
| .....5 | 1 | 1 | 0005 | 4030.01 | DISTRIBUTOR REPLACEMENT | 2113 | | 1011A | 02/05/ | |
| .....5 | 4 | 4 | 0006 | 4001031018 | TUBE CONNECTION | 1194 | | | | |
| .....5 | 4 | 4 | 0007 | 2514001003 | GASKET | 1192 | | | | |
| .....5 | 4 | 4 | 0008 | 2516707003 | TIE-WRAP | 1195 | | | | |
| .....5 | 2 | 2 | 0009 | 2514203104 | PLUG/STOPPER | 1196 | | | | |
| .....5 | 2 | 2 | 0010 | 2514001004 | GASKET | 1197 | | | | |
| ...3 | 1 | 1 | 0001 | 0124.00 | 21A0124.00 | 1198 | | | | |
| ....4 | 1 | 1 | 0001 | 0124.01 | 21A0124.01 | 1199 | | | | |
| .....5 | 1 | 1 | 0001 | 4668 | SUPPORT | 1200 | | | | |
| .....5 | 1 | 1 | 0002 | 876 | COVER | 1201 | | | | |
| .....5 | 4 | 4 | 0003 | 2520505006 | SCREW | 1202 | | | | |
| .....5 | 4 | 4 | 0004 | 2520506011 | SCREW | 1203 | | | | |
| .....5 | 1 | 1 | 0005 | 2513102149 | GASKET | 1204 | | | | |
| .....5 | 1 | 1 | 0006 | 4001073017 | GEAR | 1205 | | | | |
| .....5 | 1 | 1 | 0007 | 4675 | SHAFT | 1206 | | | | |
| .....5 | 1 | 1 | 0008 | 2520506008 | SCREW | 1207 | | | | |
| .....5 | 1 | 1 | 0009 | 2519709012 | PIN | 1208 | | | | |

FIG.13A

PRE010BN-02/02/ EXPLODED BILL OF MATERIAL FOR MACHINE 1175 UNIT 01 COMPLEX 1    PAGE 1
                                 AS OF 02/05/

| LEVEL | QTY PER | QTY REQD | DRAWING SEQ | VENDOR PART | DESCRIPTION | PART | SCRAP FACTOR | EFFECTIVITY | EFF DATE | STOCKED |
|---|---|---|---|---|---|---|---|---|---|---|
| ..5 | 1 | 1 | 0010 | 2519530008 | RING NUT | 1209 | | | | |
| ..5 | 1 | 1 | 0011 | 2508121008 | BEARING | 1210 | | | | |
| ..5 | 1 | 1 | 0012 | 2509804020 | BEARING | 1211 | | | | |
| ..5 | 1 | 1 | 0013 | 4672 | GEAR | 1212 | | | | |
| ..5 | 1 | 1 | 0014 | 4671 | SHAFT | 1213 | | | | |
| ..5 | 1 | 1 | 0015 | 4001019060 | KEY | 1214 | | | | |
| ..5 | 1 | 1 | 0016 | 2519530007 | RING NUT | 1215 | | | | |
| ..5 | 1 | 1 | 0017 | 2508102005 | BEARING | 1217 | | | | |
| ..5 | 1 | 1 | 0018 | 4669 | SUPPORT | 1218 | | | | |
| ..5 | 1 | 1 | 0019 | 4670 | COVER | 1219 | | | | |
| ..5 | 4 | 4 | 0020 | 2520503001 | SCREW | 1220 | | | | |
| ..5 | 4 | 4 | 0021 | 2520505002 | SCREW | 1221 | | | | |
| ..5 | 1 | 1 | 0022 | 2508124019 | BEARING | 1222 | | | | |
| ..5 | 1 | 1 | 0023 | 2519104043 | RING | 1223 | | | | |
| ..5 | 1 | 1 | 0024 | 2513101104 | SEAL | 1224 | | | | |
| ..5 | 1 | 1 | 0025 | 4676 | PIN | 1225 | | | | |
| ..5 | 1 | 1 | 0026 | 2513102055 | GASKET | 1226 | | | | |
| ..5 | 1 | 1 | 0027 | 2508301003 | CAM FOLLOWER | 1227 | | | | |
| ..5 | 1 | 1 | 0028 | 2519601010 | WASHER | 1020 | | | | |
| ..5 | 1 | 1 | 0029 | 2519602010 | WASHER | 1057 | | | | |
| ..5 | 1 | 1 | 0030 | 2519553019 | NUT | 1228 | | | | |
| ..5 | 1 | 1 | 0031 | 4677 | FLANGE | 1229 | | | | |
| ..5 | 3 | 3 | 0032 | 2520505009 | SCREW | 1230 | | | | |
| ..5 | 1 | 1 | 0033 | 4678 | RING | 1231 | | | | |
| ..5 | 1 | 1 | 0034 | 2521105005 | SCREW | 1232 | | | | |

FIG. 13B

PRE010BN-02/02/ EXPLODED BILL OF MATERIAL FOR MACHINE 1175 UNIT 01 COMPLEX 1 PAGE 1
AS OF 02/10/

| LEVEL | QTY PER | QTY REQD | DRAWING SEQ | VENDOR PART | DESCRIPTION | PART | SCRAP FACTOR | EFFECT-IVITY | EFF DATE | STOCKED |
|---|---|---|---|---|---|---|---|---|---|---|
| .1 | 1 | 1 | 0001 | 010101 PACKER | PACKER FOR UNIT 01 COM | 1176 | | | | |
| .1 | 1 | 1 | 0002 | 010101 MAKER | MAKER FOR UNIT 01 COMP | 1177 | | | | |
| .1 | 1 | 1 | 0003 | 010101 OVERWRAP | OVERWRAP FOR UNIT 01 C | 1178 | | | | |
| .2 | 1 | 1 | 0001 | 21A-01 | FRAME SUCKERS | 1187 | | | | |
| .3 | 1 | 1 | 0001 | 0051.00 | 21A0051.00 | 1188 | | | | |
| ...3 | 1 | 1 | 0000 | 0051.01.01 | REVISED 21A0051.01 | 2111 | | 1010A | 02/10 | |
| ...4 | 1 | 1 | 0001 | 4029 | DISTRIBUTOR | 1189 | | | | |
| ....5 | 1 | 1 | 0002 | 4001023014 | RING NUT | 1190 | | | | |
| ....5 | 2 | 2 | 0003 | 5807000001 | THREADED PLUG | 1191 | | | | |
| ....5 | 2 | 2 | 0004 | 2514001003 | GASKET | 1192 | | | | |
| ....5 | 1 | 1 | 0005 | 4030.01 | DISTRIBUTOR REPLACEMENT | 2113 | | 1011A | 02/05 | |
| ....5 | 4 | 4 | 0006 | 4001031018 | TUBE CONNECTION | 1194 | | | | |
| ....5 | 4 | 4 | 0007 | 2514001003 | GASKET | 1192 | | | | |
| ....5 | 4 | 4 | 0008 | 2516707003 | TIE-WRAP | 1195 | | | | |
| ....5 | 2 | 2 | 0009 | 2514203104 | PLUG/STOPPER | 1196 | | | | |
| ....5 | 2 | 2 | 0010 | 2514001004 | GASKET | 1197 | | | | |
| ...3 | 1 | 1 | 0001 | 21A0124.00 | 21A0124.00 | 1198 | | | | |
| ...4 | 1 | 1 | 0001 | 21A0124.01 | 21A0124.01 | 1199 | | | | |
| ....5 | 1 | 1 | 0001 | 4668 | SUPPORT | 1200 | | | | |
| ....5 | 1 | 1 | 0002 | 867 | COVER | 1201 | | | | |
| ....5 | 4 | 4 | 0003 | 2520505006 | SCREW | 1202 | | | | |
| ....5 | 4 | 4 | 0004 | 2520506011 | SCREW | 1203 | | | | |
| ....5 | 1 | 1 | 0005 | 2513102149 | GASKET | 1204 | | | | |
| ....5 | 1 | 1 | 0006 | 4001073017 | GEAR | 1205 | | | | |

FIG. 14A

PRE010BN-02/02/ EXPLODED BILL OF MATERIAL FOR MACHINE 1175 UNIT 01 COMPLEX 1 PAGE 1
AS OF 02/10/ SCRAP EFFECT- EFF
QTY QTY DRAWING
| LEVEL | QTY PER | QTY REQD | DRAWING SEQ | VENDOR PART | DESCRIPTION | PART | FACTOR | IVITY | DATE | STOCKED |
|---|---|---|---|---|---|---|---|---|---|---|
| .5 | 1 | 1 | 0007 | 4675 | SHAFT | 1206 | | | | |
| .5 | 1 | 1 | 0008 | 2520506008 | SCREW | 1207 | | | | |
| .5 | 1 | 1 | 0009 | 2519709012 | PIN | 1208 | | | | |
| .5 | 1 | 1 | 0010 | 2519530008 | RING NUT | 1209 | | | | |
| .5 | 1 | 1 | 0011 | 2508121008 | BEARING | 1210 | | | | |
| .5 | 1 | 1 | 0012 | 2509804020 | BEARING | 1211 | | | | |
| .5 | 1 | 1 | 0013 | 4672 | GEAR | 1212 | | | | |
| .5 | 1 | 1 | 0014 | 4671 | SHAFT | 1213 | | | | |
| .5 | 1 | 1 | 0015 | 4001019060 | KEY | 1214 | | | | |
| .5 | 1 | 1 | 0016 | 2519530007 | RING NUT | 1215 | | | | |
| .5 | 1 | 1 | 0017 | 2508102005 | BEARING | 1217 | | | | |
| .5 | 1 | 1 | 0018 | 4669 | SUPPORT | 1218 | | | | |
| .5 | 1 | 1 | 0019 | 4670 | COVER | 1219 | | | | |
| .5 | 4 | 4 | 0020 | 2520503001 | SCREW | 1220 | | | | |
| .5 | 4 | 4 | 0021 | 2520505002 | SCREW | 1221 | | | | |
| .5 | 1 | 1 | 0022 | 2508124019 | BEARING | 1222 | | | | |
| .5 | 1 | 1 | 0023 | 2510104043 | RING | 1223 | | | | |
| .5 | 1 | 1 | 0024 | 2513101104 | SEAL | 1224 | | | | |
| .5 | 1 | 1 | 0025 | 4676 | PIN | 1225 | | | | |
| .5 | 1 | 1 | 0026 | 2514102055 | GASKET | 1226 | | | | |
| .5 | 1 | 1 | 0027 | 2508301003 | CAM FOLLOWER | 1227 | | | | |
| .5 | 1 | 1 | 0028 | 2510601010 | WASHING | 1020 | | | | |
| .5 | 1 | 1 | 0029 | 2510602010 | WASHER | 1057 | | | | |
| .5 | 1 | 1 | 0030 | 2519553019 | NUT | 1228 | | | | |
| .5 | 1 | 1 | 0031 | 4677 | FLANGE | 1229 | | | | |
| .5 | 3 | 3 | 0032 | 2520505009 | SCREW | 1230 | | | | |
| .5 | 1 | 1 | 0033 | 4678 | RING | 1231 | | | | |
| .5 | 1 | 1 | 0034 | 2521105005 | SCREW | 1232 | | | | |

FIG.14B

| PART MASTER PART # | DESC | STATUS | IMAGE ADD | DATE LAST CHG | XYZ PART# | SUBSTITUTE REPLACEMENT# | ECN # | ECN ACTION | COMPLEXES USED IN | LOW LEVEL CODE | PLANNING LEVEL CODE |
|---|---|---|---|---|---|---|---|---|---|---|---|
| 010101 | UNIT 1 COMPLEX 1 | | | | | | | | | 0 | 0 |
| 010101 PACKER | PACKER FOR 1-1 | | | | | | | | | 1 | 1 |
| 010101MAKER | MAKER FOR 1-1 | | | | | | | | | 1 | 1 |
| 010101 OVERWRAP | OVERWRAP FOR 1-1 | | | | | | | | | 1 | 1 |
| 21A-01 | FRAME SUCKERS | | | | | | | | | 2 | 2 |
| 21A0051.00 | SECTION 1 | | | | | | | | 1-1-1,1-1-2,67-1-3 | 3 | 3 |
| 21A0051.00 | SECTION 1A | | | | | | | | | 4 | 4 |
| 0A4029 | DISTRIBUTOR | | | | 01368 | | | | | 5 | 5 |
| 4001023014 | RING NUT | | | | 15973 | | | | | 5 | 5 |
| 5807000001 | THREADED PLUG | | | | 78531 | | | | | 5 | 5 |
| 25140001003 | GASKET | | | | 69577 | | | | | 5 | 5 |
| 0A4030 | DISTRIBUTOR | | | | 01598 | | | | | 5 | 5 |
| 4001031018 | TUBE CONNECTION | | | | 00136 | | | | | 5 | 5 |
| 2514001003 | GASKET | | | | 69753 | | | | | 5 | 5 |
| 2516707003 | TIE-WRAP | | | | 33657 | | | | | 5 | 5 |
| 2514203104 | PLUG/STOPPER | | | | 59672 | | | | | 5 | 5 |
| 25140001004 | GASKET | | | | 37596 | | | | | 4 | 4 |
| 21A0051.01.01 | SECTION 1.01 | | | | | | | | | 5 | 5 |
| 0A4030.01 | DISTRIBUTOR | | | | 96752 | | | | | | |
| 670101 | FACT 67 UNIT 1 COM 1 | | | | | | | | | 0 | 0 |
| 01A | PACKER FOR 67-1-1 | | | | | | | | | 1 | 1 |
| 01B | MAKER FOR 67-1-1 | | | | | | | | | 1 | 1 |
| 01B1 | SECTION-1 | | | | | | | | | 2 | 2 |

FIG.15A

PART MASTER

| PART # | DESC | STATUS | IMAGE ADD | DATE LAST CHG | XYZ PART# | SUBSTITUTE REPLACEMENT# | ECN # | ECN ACTION | COMPLEXES USED IN | LOW LEVEL CODE | PLANNING LEVEL CODE |
|---|---|---|---|---|---|---|---|---|---|---|---|
| 01B11 | PART-A | | | | 55687 | 55666 | 886 | | ④ | 3 | 3 |
| 01B13 | PART-C | | | | 56679 | | | | | 3 | 3 |
| 01B14 | PART-D | | | | 34698 | | | | | 3 | 3 |
| 01B16 | PART-F | | | | 46291 | 01B15 | 456 | S | ② | 3 | 3 |
| 01B17 | PART-G | | | | 26977 | | | | | 3 | 3 |
| 01N111 | PART-K | | | | 00197 | | | | | 3 | 3 |
| 01B12 | PART-B | | | | 56680 | | | | | 3 | 3 |
| 01B15 | PART-E | | | | 97320 | 01B16 | 456 | R | ② | 3 | 4 |
| 01B18 | PART-H | | | | 33691 | | | | | 3 | 3 |
| 01B19 | PART-I | | | | 25993 | | | | | 3 | 3 |
| 01B110 | PART-J | | | | 97360 | | | | | 3 | 3 |

FIG.15B

PARTS LIST

| | ASSEMBLY # | PARTS # | SEQ # | QTY-PER | SCRAP FACTOR | ECN # | ECN ACTION | DATE LAST CHANGED | CUMULATIVE RUN HOURS | MEAN-TIME FAILURE RATE/HOURS |
|---|---|---|---|---|---|---|---|---|---|---|
| 1 | 010101 | 010101 PACKER | 1 | 1 | 0 | | | | | |
| 2 | 010101 | 010101 MAKER | 2 | 1 | 0 | | | | | |
| 3 | 010101 | 010101 OVERWRAP | 3 | 1 | 0 | | | | | |
| 4 | 010101 OVERWRAP | 21A-01 | 1 | 1 | 0 | | | | | |
| 5 | 21A-01 | 21A0051.00 | 1 | 1 | 0 | | | | | |
| 6 | 21A0051.00 | 21A0051.01 | 1 | 1 | 0 | 1010 | D | | | |
| 7 | 21A0051.01 | 0A4029 | 1 | 1 | 0 | | | | | |
| 8 | 21A0051.01 | 4001023014 | 2 | 1 | 0 | | | | | |
| 9 | 21A0051.01 | 5807000001 | 3 | 2 | 1 | | | | | |
| 10 | 21A0051.01 | 2514001003 | 4 | 2 | 0 | | | | | |
| 11 | 21A0051.01 | 0A4030 | 5 | 1 | 0 | 1011 | D | | | |
| 12 | 21A0051.01 | 4001103 1018 | 6 | 4 | 1 | | | | | |
| 13 | 21A0051.01 | 2514001003 | 7 | 4 | 0 | | | | | |
| 14 | 21A0051.01 | 2516707003 | 8 | 4 | 0 | | | | | |
| 15 | 21A0051.01 | 2514203104 | 9 | 2 | 0 | | | | | |
| 16 | 21A0051.01 | 2514 01004 | 10 | 2 | 0 | | | | | |
| 17 | 21A-01 | 21A0051.01.01 | 1 | 1 | 0 | 1010 | A | | | |
| 18 | 21A0051.01 | 0A4030.01 | 1 | 5 | 0 | 1011 | A | | | |

FIG.16A

PARTS LIST

| | ASSEMBLY # | PARTS # | SEQ # | QTY-PER | SCRAP FACTOR | ECN # | ECN ACTION | DATE LAST CHANGED | CUMULATIVE RUN HOURS | MEAN-TIME FAILURE RATE/HOURS |
|---|---|---|---|---|---|---|---|---|---|---|
| 19 | 6710101 | 01A | 1 | 1 | 0 | | | | | |
| 20 | 670101 | 01B | 1 | 1 | 0 | | | | | |
| 21 | 01B | 01B1 | 1 | 1 | 0 | | | | | |
| 22 | 01B1 | 01B12 | 1 | 1 | 0 | 123 | D | ① | | |
| 23 | 01B1 | 01B13 | 2 | 1 | 0 | | | | | |
| 24 | 01B1 | 01B14 | 3 | 2 | 0 | | | | | |
| 25 | 01B1 | 01B16 | 4 | 1 | 1 | 456 | D | ② | | |
| 26 | 01B1 | 01B17 | 5 | 1 | 0 | | | | | |
| 27 | 01B1 | 01B11 | 6 | 1 | 0 | 789 | D | ③ | | |
| 28 | 01B1 | 01B12 | 1 | 1 | 0 | 123 | A | ① | | |
| 29 | 01B1 | 01B15 | 3 | 2 | 0 | 456 | A | ② | | |
| 30 | 01B1 | 01B18 | 6 | 1 | 0 | 789 | A ⎤ | ③ | | |
| 31 | 01B1 | 01B19 | 7 | 1 | 0 | 789 | A ⎥ | | | |
| 32 | 01B1 | 01B110 | 8 | 1 | 0 | 789 | A ⎦ | | | |

FIG. 16B

ENGINEERING CHANGE NOTICE

| ECN # | ECN-CRITERIA (DATE, MR#, USE-UP, NEXT REPLACEMENT) | | ECN DESCRIPTION | |
|---|---|---|---|---|
| 1 | 1010 | D | 02/10/XX | REPLACE OLD DRAWING |
| 2 | 1011 | D | 02/05/XX | IMPROVED DISTRIBUTOR |
| 3 | 123 | D | 02/15/XX | GROUP PM SCHEDULED | ① |
| 4 | 456 | U | PART-F | INVENTORY USE-UP | ② |
| 5 | 789 | M | MR123 | MIC IMPROVEMENT MOD | ③ |
| 6 | 886 | U | RJR | RJR USE-UP | ④ |

FIG.17

PARTS LIST

| PART NBR | DESCRIPTION | ECN NBR | ECN CRITERIA |
|---|---|---|---|
| 670101 | COMPLEX | | |
| .01A | PACKER | | |
| .01B | MAKER | | |
| ..01B1 | SECTION-1 | | |
| ...01B11 | PART-A | | |
| ...01B13 | PART-C | | |
| ...01B14 | PART-D | | |
| ...01B16 | PART-F | | |
| ...01B17 | PART-G | | |
| ...01B11 | PART-K | | |

FIG. 18

PARTS LIST

| PART NBR | DESCRIPTION | ECN NBR | ECN CRITERIA |
|---|---|---|---|
| 670101 | COMPLEX | | |
| .01A | PACKER | | |
| .01B | MAKER | | |
| ..01B1 | SECTION-1 | | |
| ...01B11 | PART-A | | |
| ...01B12 | PART-B | 123 | ADD 02/15/XX |
| ...01B13 | PART-C | 123 | DEL 02/15/XX |
| ...01B14 | PART-D | | |
| ...01B15 | PART-E | 456 | ADD USE-UP (PART-F) |
| ...01B16 | PART-F | 456 | DEL USE-UP (PART-F) |
| ...01B17 | PART-G | | |
| ...01B18 | PART-H | 789 | ADD MR123 |
| ...01B19 | PART-I | 789 | ADD MR123 |
| ...01B110 | PART-J | 789 | ADD MR123 |
| ...01B111 | PART-K | 789 | DEL MR123 |

FIG. 19

PARTS LIST

| PART NBR | DESCRIPTION | ECN NBR | ECN CRITERIA |
|---|---|---|---|
| 670101 | COMPLEX | | |
| .01A | PACKER | | |
| .01B | MAKER | | |
| ..01B1 | SECTION-1 | | |
| ...01B11 | PART-A | | |
| ...01B12 | PART-B | | |
| ...01B14 | PART-D | 123 | ADD 02/15/XX |
| ...01B15 | PART-E | 456 | ADD USE-UP (PART-F) |
| ...01B16 | PART-F | 456 | DEL USE-UP (PART-F) |
| ...01B17 | PART-G | | |
| ...01B18 | PART-H | 789 | ADD MR123 |
| ...01B19 | PART-I | 789 | ADD MR123 |
| ...01B110 | PART-J | 789 | ADD MR123 |
| ...01B111 | PART-K | 789 | DEL MR123 |

PARTS LIST

| PART NBR | DESCRIPTION | ECN NBR | ECN CRITERIA |
|---|---|---|---|
| 670101 | COMPLEX | | |
| .01A | PACKER | | |
| .01B | MAKER | | |
| ..01B1 | SECTION-1 | | |
| ...01B11 | PART-A | | |
| ...01B12 | PART-B | 123 | ADD 02/15/XX |
| ...01B14 | PART-D | | |
| ...01B15 | PART-E | 456 | ADD USE-UP (PART-F) |
| ...01B17 | PART-G | | |
| ...01B18 | PART-H | 789 | ADD MR123 |
| ...01B19 | PART-I | 789 | ADD MR123 |
| ...01B110 | PART-J | 789 | ADD MR123 |
| ...01B111 | PART-K | 789 | DEL MR123 |

PARTS LIST

| PART NBR | DESCRIPTION | ECN NBR | ECN CRITERIA |
|---|---|---|---|
| 670101 | COMPLEX PACKER | | |
| .01A | MAKER | | |
| .01B | SECTION-1 | | |
| ..01B1 | PART-A | | |
| ...01B11 | PART-B | 123 | ADD 02/15/XX |
| ...01B12 | PART-D | | |
| ...01B14 | PART-E | 456 | ADD USE-UP (PART-F) |
| ...01B15 | PART-G | | |
| ...01B17 | PART-H | 789 | ADD MR123 |
| ...01B18 | PART-I | 789 | ADD MR123 |
| ...01B19 | PART-J | 789 | ADD MR123 |
| ...01B110 | | | |

FIG.22

PARTS LIST ON 2/14/XX NO ECN'S HAVE BEEN APPLIED

| PART NBR | DESCRIPTION | ECN NBR | ECN CRITERIA |
|---|---|---|---|
| 670101 | COMPLEX | | |
| .01A | PACKER | | |
| .01B | MAKER | | |
| ..01B1 | SECTION-1 | | |
| ...01B11 | PART-A | | |
| ...01B13 | PART-C | 123 | ADD 02/15/XX |
| ...01B14 | PART-D | | |
| ...01B16 | PART-F | 456 | ADD USE-UP (PART-F) |
| ...01B17 | PART-G | | |
| ...01B111 | PART-K | 789 | ADD MR123 |

FIG. 26

| 01B1 SECTION 1 | 1/7 | 1/14 | 1/21 | 1/28 | 2/4 | 2/11 | 2/18 | 2/25 | ... |
|---|---|---|---|---|---|---|---|---|---|
| | | ECN NONE | | | | | | | |
| RUN HOURS | 100 | 100 | 100 | 100 | 100 | 100 | 100 | 100 | ... |
| PLAN BOM REQ | 2 | 4 | 0 | 5 | 3 | 2 | 5 | 0 | |
| 01B13 PART C | | ECN 123 | DEL 2/15 | | | | | | |
| RUN HOURS | 100 | 100 | 100 | 100 | 100 | 0 | 0 | 0 | ... |
| PLAN BOM REQ | 2 | 4 | 0 | 5 | 3 | 0 | 0 | 0 | |
| 01B12 PART B | | ECN 123 | ADD 2/15 | | | | | | |
| RUN HOURS | 0 | 0 | 0 | 0 | 0 | 100 | 100 | 100 | ... |
| PLAN BOM REQ | 0 | 0 | 0 | 0 | 0 | 2 | 5 | 0 | |

FIG. 31

PART C MEANTIME FAILURE 1375

| | ACTUAL | WEEK1 | WEEK2 | WEEK3 | WEEK4 | WEEK5 | WEEK6 | WEEK7 | WEEK8 | ---- | WEEK20 | WEEK21 |
|---|---|---|---|---|---|---|---|---|---|---|---|---|
| | 100 | 100 | 100 | 100 | 50 | 50 | 100 | 100 | 100 | ---- | 100 | 100 |
| CUMULATIVE RUN HOURS | 900 | 1000 | 1100 | 1200 | 1300 | 1350 | 1400 | 125 | 225 | 3250 | ---- | 1405 | 175 |
| REQ | | 0 | 0 | 0 | 0 | 1 | 0 | 0 | 0 | ---- | 1 | 0 |

FIG. 32

01B16 PART F  ECN 456 USE-UP  SUBSTITUTE 01B15 (PART E)

| WEEK | 1 | 2 | 3 | 4 | 5 | 6 | 7 | 8 | 9 | 10 | 11 | 12 |
|---|---|---|---|---|---|---|---|---|---|---|---|---|
| PARTS REQUIRED | 10 | 10 | 15 | 8 | 10 | 10 | 8 | 5 | 5 | 10 | 11 | 12 |
| ON ORDER | | 20 | | | | | | | | | | |
| ON-HAND W/ORDER | 20 | 30 | 15 | 7 | (-3) 17 | 7 | (-1) 19 | 14 | 9 | (-6) 14 | (-6) 14 | 4 |
| PLANNED ORDERS | 0 | 0 | 0 | 0 | 20 | 0 | 20 | 0 | 0 | 20 | 20 | 0 |
| REPLENISHMENT | | | 20 | | 20 | | | 20 | 20 | | | |

ORDER QUANTITY 20
LEAD TIME 2 WEEKS
SAFETY STOCK 0

FIG.33

01B16 PART F  ECN 456 USE-UP  SUBSTITUTE 01B15 (PART E)

| WEEK | 1 | 2 | 3 | 4 | 5 | 6 | 7 | 8 | 9 | 10 | 11 | 12 |
|---|---|---|---|---|---|---|---|---|---|---|---|---|
| PARTS REQUIRED | 10 | 10 | 15 | 8 | 10 | 0 | 0 | 0 | 0 | 0 | 0 | — |
| ON ORDER | | 20 | | | | | | | | | | |
| ON-HAND W/ORDER | 30 | 30 | 15 | 7 | −3 | 0 | 0 | 0 | 0 | 0 | 0 | 0 |
| PLANNED ORDERS REPLENISHMENT | 0 | 0 | 0 | 0 | 0 | 0 | 0 | 0 | 0 | 0 | 0 | 0 |

ORDER QUANTITY  20
LEAD TIME  2 WEEKS
SAFETY STOCK  0

FIG. 34A

01B15 PART E   ECN 456 USE-UP   REPLACEMENT 01B16 (PART F)

| WEEK | 1 | 2 | 3 | 4 | 5 | 6 | 7 | 8 | 9 | 10 | 11 | 12 |
|---|---|---|---|---|---|---|---|---|---|---|---|---|
| PART REQUIRED ON ORDER | 0 | 0 | 0 | 0 | 3 | 10 | 8 | 5 | 5 | 15 | 20 | 10 |
| ON-HAND W/ORDER | 30 | 30 | 30 | 30 | 27 | 17 | 9 | 4 | (−1) 19 | 4 | (−16) 4 | (−6) 14 |
| PLANNED ORDERS REPLENISHMENT | 0 | 0 | 0 | 0 | 0 | 0 | 0 | 0 | 20 | 0 | 20 | 20 |

ORDER QUANTITY  20
LEAD TIME  2 WEEKS
SAFETY STOCK  0

FIG. 34B

INTELLIGENT COMPUTER INTEGRATED MAINTENANCE SYSTEM AND METHOD

FIELD OF THE INVENTION

This invention relates to equipment maintenance and more particularly to computer integrated maintenance systems and methods.

BACKGROUND OF THE INVENTION

Computer integrated manufacturing systems are widely used in state of the art manufacturing operations for controlling the operation of many manufacturing or production machines in one or more manufacturing plants. The machines may be organized into production lines each of which may produce a particular product. The machines in a production line may be functionally interconnected so that if one machine is unavailable due to a failure or due to maintenance activity, the entire production line may be unavailable for production, or the production capacity of the line may be limited. Computer integrated manufacturing systems may be used to control the production machines and the flow of materials from one machine to another during the course of producing a product. Computer integrated manufacturing systems may also be used to schedule the purchasing of raw materials necessary for producing a product, and for developing a master schedule for all the machines in order to produce the desired amount of product at each production line at the desired time.

In order to increase the production efficiency and manufacturing flexibility of large manufacturing operations, computer integrated manufacturing systems are now being widely installed and used. Representative computer integrated manufacturing systems are described in U.S. Pat. Nos. 4,346,446 to Erbstein et al. entitled "Management and Analysis System for Web Machines and the Like"; 4,472,783 to Johnstone et al. entitled "Flexible Manufacturing System"; 4,457,772 to Haynes et al. entitled "Management Control System for Forming Glassware"; and 4,803,634 to Ohno et al. entitled "Production Process Control System in Newspaper Printing".

A computer integrated manufacturing system which includes multiple levels of computer control to organize and disseminate the information for controlling shop floor level systems is described in U.S. Pat. No. 4,827,423 to Beasley et al. entitled "Computer Integrated Manufacturing System", assigned to the assignee of the present invention, the disclosure of which is hereby expressly incorporated herein by reference. In Beasley et al., manufacturing scheduling data and data relating to process, product and material specifications as well as bills of material are generated in an upper level computer system and refined and downloaded as needed to lower level computers controlling the shop floor process. The upper level computers are capable of communication with the computers on the lower levels, and computers on the same level are capable of communication with each other as needed to pass information back and forth.

The art has heretofore suggested adding a maintenance module to a computer integrated manufacturing system in order to integrate maintenance of the production machines into the computer integrated manufacturing system. For example, the Haynes et al. '772 patent noted above discloses a glassware production control system which also provides maintenance information. The Ohno et al. '634 patent noted above also describes a production process control computer which includes a materials and maintenance control subsystem. The materials and maintenance control subsystem controls the timing of parts replacement. The timing of parts replacement is calculated in advance from the cumulative total of the predicted life of consumable parts and operation time and displayed or printed so as to enable order placement for parts. The maintenance system includes a parts list file containing a list of all consumable parts in the system. The parts list file is updated by collecting information on the operation of the machine so that residual service lives of consumable parts may be calculated. When parts replacement is needed, the quantity of parts used for replacement is deducted from the stock volume in the parts inventory file. When the stock volume of parts in the parts inventory file becomes smaller than at the time of parts ordering, an order form slip is printed. In other words, a "point of ordering" system is provided. A running total of elapsed time is computed and compared with the durable life of parts so that the time and date of actual replacement can be calculated and a schedule of maintenance may thereby be derived.

The art has recognized the potential advantage of providing a computer integrated maintenance system for a computer integrated manufacturing system. Indeed, for a sophisticated computer integrated manufacturing system, which controls many production machines in many production lines in one or more plants, it is almost essential that maintenance be controlled and scheduled by computer. Unfortunately, heretofore known computer integrated maintenance systems did not intelligently integrate maintenance into manufacturing. For example, in presently available computer integrated maintenance systems, the computer may schedule a low priority maintenance operation such as an oil change for one machine in a production line even though a major maintenance operation for the production line may be taking place a week later. Similarly, a "point of ordering" system for spare parts may order new parts when the number in inventory falls below the number stored in the system, even though in reality the machine is scheduled to be replaced in the near future. Similarly, a computer integrated maintenance system may prescribe a number of maintenance operations to be performed at one time even though insufficient manpower exists for performing all of that maintenance at that time.

Accordingly, there is a need for an "intelligent" computer integrated maintenance system which does more than merely schedule maintenance by adding total accumulated hours and scheduling maintenance when the hours reach a predetermined number. An intelligent maintenance system must also do more than merely function as a point of order system to order maintenance parts when inventory falls below a predetermined number.

The need for an intelligent computer integrated maintenance system has become more pressing as the complexity of computer integrated manufacturing systems has increased. As the number of machines being controlled and the number of simultaneous manufacturing lines being controlled increases, it becomes difficult for a human to understand the overall work flow in sufficient detail to intelligently modify maintenance instructions generated by a computer integrated maintenance system. Similarly, it is difficult for humans to assimilate all of the maintenance data and intelligently modify spare parts ordering instructions generated by a point of ordering system.

SUMMARY OF THE INVENTION

An intelligent computer integrated maintenance system is provided for use with a computer integrated manufacturing system, where the computer integrated manufacturing system includes a computer controller for controlling many production lines, each of which includes many production machines for producing a particular product. The manufacturing system computer controller contains an electronically stored master schedule file which includes a schedule of actual production and planned production for the production lines so that the manufacturing system computer controller controls the production machines based upon the planned production in the master schedule file.

According to the invention, the computer integrated maintenance system includes an electronically stored parts manual which contains a hierarchial listing of parts in the plurality of production machines in the plurality of production lines. The electronically stored parts manual does not merely contain a listing of consumable or maintenance parts. Preferably it contains a complete bill of materials for each machine in each line. The bill of materials is contained in a hierarchial listing, which breaks each machine into assemblies and breaks each assembly into its subassemblies, down to the level of individual parts. Preferably, the electronically stored parts manual includes corresponding image files which illustrate the hierarchial listing of parts at each level.

The intelligent computer integrated maintenance system also includes a maintenance operations computer controller which is connected to the electronically stored parts manual and is adapted to be connected to the master schedule file. According to the invention, the maintenance operations computer controller includes four subsystems: (1) a maintenance schedule management subsystem; (2) an engineering change control subsystem; (3) a parts manual management subsystem; and (4) a spares inventory management subsystem.

The maintenance schedule management subsystem generates a master maintenance schedule. The maintenance schedule management subsystem obtains a schedule of actual production and planned production for all of the production lines from the master schedule file. It also interfaces with the parts manual management subsystem to identify parts in the hierarchial listing to be maintained during a predetermined time period, and also identifies a corresponding maintenance time during the predetermined time period for each identified part based upon the obtained schedule of actual production and planned production.

However, rather than generating maintenance orders based solely upon the predetermined time period calculated for each identified part, the maintenance schedule management subsystem of the present invention reassigns the corresponding maintenance times for the identified parts based upon the hierarchial listing of parts in the electronically stored parts manual, so that lost production time for each production line is reduced. A revised schedule of planned production, based on the reassigned maintenance times, is then generated and communicated back to the master schedule file in the computer integrated manufacturing system. Accordingly, the plurality of production lines are controlled based upon the revised schedule of planned production to allow for maintenance activities while maximizing production.

According to the present invention, the maintenance operations computer does not merely schedule maintenance time based upon the schedule of actual production and planned production. Rather, the maintenance times identified during a predetermined time period are rearranged based upon the hierarchial listing of parts in the electronically controlled stored parts manual to reduce lost production time for each production line. For example, the production schedule for each of the production line is analyzed to determine whether the line is scheduled to be offline during a time interval which is sufficiently close to the calculated maintenance time to allow maintenance to be postponed or moved forward to the machine offline time.

The present invention realizes that production and maintenance both compete for the use of machines, and accordingly schedules non-critical maintenance tasks for machine down times so that production time is maximized. Similarly, when a number of maintenance tasks at a production line are scheduled for a short time interval, the maintenance tasks are grouped together so that they may all be performed simultaneously. For example, a most critical maintenance task may be identified and all other maintenance tasks for the line may be scheduled to be performed at the same time as the critical maintenance tasks. Down time is thereby minimized.

According to another aspect of the invention, after a revised maintenance schedule is calculated, the manpower requirement for performing the maintenance is calculated. If the manpower requirement exceeds the available manpower, the maintenance tasks are rescheduled in a hierarchy of importance/criticality, so that a group of tasks may be performed with the available manpower.

The intelligent computer integrated maintenance system also intelligently schedules maintenance at the end of the machine life. In particular, an indication is provided to the computer integrated maintenance system when a machine is reaching the end of its useful life, either because the machine is worn out or because the machine is scheduled to be replaced or modified in an upgrade. The intelligent computer integrated maintenance system postpones selected maintenance activity on machines which are scheduled to be taken out of service in the near future.

The intelligent computer integrated maintenance system of the present invention also allows iterative maintenance operations planning to be performed. For example, strategic planning of maintenance operations for a multi-year period may be performed in order to determine manpower requirements, spare parts requirements, and actual production capabilities which include maintenance time. Maintenance operations planning may also be performed for intermediate range periods such as a yearly period in order to determine parts ordering requirements, manpower availability and the like. Then, maintenance operations planning may be performed for a short range period such as daily, in order to generate daily maintenance schedules. Accordingly, maintenance operations planning may be performed in long-range, intermediate range and short-term iterations.

As described above, the intelligent computer integrated maintenance system of the present invention also includes a parts manual management subsystem which controls a parts manual file. The parts manual file contains a complete bill of materials for each production machine. The electronically stored parts manual file does not merely include consumables or maintenance parts. Rather, it includes all parts in the machine in a hierarchial listing, commonly using 5-6 levels of parts, so that a complete subsystem description of the machine is available. Preferably, an electronically stored image of each level is also stored with the listing of parts so that maintenance parts can be identified and repairs are simplified. According to the invention, all parts in the hierarchical listing are categorized as either "consumable", "replaceable", "generic" or "non-stocked". Consumable parts are those for which spare parts planning is based on the number of hours used. For replaceable parts, the mean-time to failure rate versus the actual run time determines the maintenance schedule. For generic parts such as screws, bulk inventory is maintained and a point of ordering system is used. Finally non-stocked parts, which are typically not maintenance parts, are typically not stocked and are not ordered until actually needed.

The electronically stored parts manual file may include more than one part number for each part in the system. In particular, each part may include a "generic parts identifier" or "international part code" to indicate that a generic, often less expensive industry standard part may be used instead of the manufacturer's specified part number. Also, a "substitute part number" may be used to indicate that more than one part may be used in the particular maintenance operation. Also a "changed part number" may be used to indicate that as of a certain date, or other change criteria a revised part number should be used as part of an "engineering change control" procedure described below. The electronically stored parts manual may be downloaded to local computers associated with each production machine so that a hierarchical description of each associated production machine may be found in its associated computer. The electronically stored parts manual may also be included in a personal computer, on CD-ROM or other storage means. The electronically stored parts manual may be included in the same computer as the intelligent computer integrated maintenance system, or in a separate computer therefrom.

The spare parts inventory management subsystem of the intelligent computer integrated maintenance system allows ordering of spare parts based on predicted maintenance, rather than on the prescribed inventory levels. Spare parts budgeting is also accommodated. According to the invention, generic parts are ordered using a conventional order point system when the inventory quantities fall below a predetermined order point. For replaceable parts, however, the parts requirements are calculated based on time phased manufacturing requirements and mean-times to failure. The automated parts manual file is used to extend the production plan to parts replacement. A requirement is generated to replace a part in the week that it will exceed its mean-time to failure, and order forms for the parts are generated, or the parts may be ordered electronically.

The engineering change control management subsystem interfaces with an engineering change control file in the computer integrated manufacturing system in order to intelligently accommodate engineering changes. The engineering change control file indicates engineering changes to be made in the production machines in order to upgrade the machines or reconfigure the production machines to produce new products. This schedule of engineering changes is integrated into the maintenance schedule management subsystem, the parts manual management subsystem and the spares inventory management subsystem. For example, at the end of a machine's useful life, scheduled maintenance is postponed or eliminated. Similarly, maintenance parts are not ordered for these machines even though inventory falls below a predetermined level, to allow for depletion of inventory when the machine is taken off line. According to the invention, engineering changes may be phased into maintenance operation by controlling the phase-in by a specified date, by a specified spare parts inventory level or by assigning engineering changes to be made by a specific maintenance request.

The computer integrated maintenance system and method of the present invention allows maintenance operations to be integrated into production in an intelligent manner. When used, production efficiency is maximized as is the use of available maintenance manpower. Engineering changes and machine upgrades are easily accommodated and spare parts inventory is kept at a minimum with minimum waste of spare parts.

The computer integrated maintenance system and method of the present invention need not be used in a production line environment as described above. Indeed, the computer integrated maintenance system and method of the present invention need not be used in connection with a computer integrated manufacturing system, or in connection with manufacturing at all. The computer integrated manufacturing system and method of the present invention may be used in connection with any collection of machines or apparatus which are used to perform a primary or main function and also require maintenance. Such a collection of machines will be referred to herein as a "complex".

A "complex", according to the present invention, may include a production line as described above. A complex may also include a plurality of independent machines which are not structurally or functionally interconnected in a production line. For example, the present invention may be used to control maintenance in a machine shop having many independent machine tools.

A "complex", according to the present invention, may also include machines which are not related to production or manufacturing at all. For example, an airplane or automobile fleet operated by an airline, car rental agency, corporation or government agency is a complex, according to the present invention, because the airplanes or automobiles have a primary function but also have maintenance requirements. Similarly, a building may include a bank of elevators which also have maintenance requirements. The present invention may be used to intelligently control airplane, automobile or elevator maintenance, consistent with the primary function.

BRIEF DESCRIPTION OF THE DRAWINGS

FIG. 2 is a block diagram illustrating the results of planning and scheduling of maintenance operations by the maintenance schedule management subsystem of FIG. 1.

FIGS. 8A-8D illustrate an example of the operations of FIG. 7.

FIGS. 12A, 12B, 13A, 13B, 14A, and 14B illustrate an example of updating the parts manual file during the operations of FIG. 11.

FIGS. 15A and 15B illustrate the layout of the parts master file according to the present invention.

FIGS. 16A and 16B illustrate the layout of a parts list file according to the present invention.

FIG. 17 illustrates the layout of an engineering change notice file according to the present invention.

FIGS. 18-22 illustrate an example of changes made to the parts manual file during the operations of FIG. 11.

FIG. 26 illustrates an example of an active parts list according to the present invention.

FIGS. 31-33 illustrate an example of the operations of FIG. 30.

FIGS. 34A and 34B illustrate another example of the operations of FIG. 30.

DESCRIPTION OF A PREFERRED EMBODIMENT

The present invention now will be described more fully hereinafter with reference to the accompanying drawings, in which a preferred embodiment of the invention is shown. This invention may, however, be embodied in many different forms and should not be construed as limited to the embodiment set forth herein; rather, this embodiment is provided so that this disclosure will be thorough and complete, and will fully convey the scope of the invention to those skilled in the art. Like numbers refer to like elements throughout.

INTRODUCTION AND OVERVIEW

Figure 1:
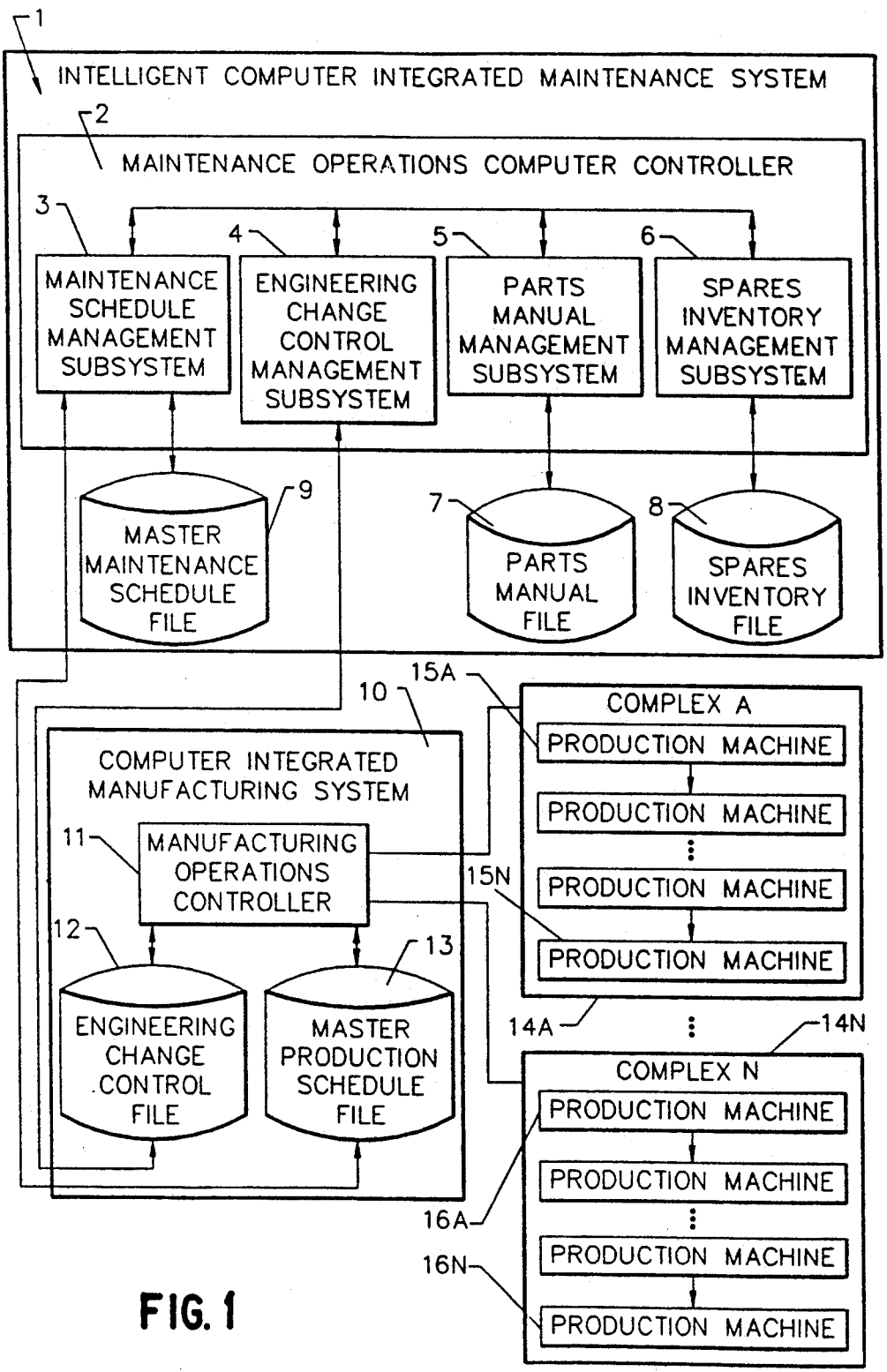
FIG. 1 is a schematic block diagram of the intelligent computer integrated maintenance system of the present invention.

Referring now to FIG. 1, the overall design and operation of an intelligent computer integrated maintenance system 1 according to the present invention will now be described. The intelligent computer integrated maintenance system of FIG. 1 is designed to operate in conjunction with a computer integrated manufacturing system 10, which includes a manufacturing operations controller 11. However, it will be understood by those having skill in the art that the system of the present invention may be used to control maintenance in any "complex", defined as a collection of machines having a primary function and maintenance requirements. In the preferred embodiment described herein, the complex is a plurality of production lines.

The intelligent computer integrated maintenance system 1 of the present invention may operate in combination with the computer integrated manufacturing system 10 described in U.S. Pat. No. 4,827,423 to Beasley et al., assigned to the assignee of the present invention, the disclosure of which is hereby incorporated herein by reference. The Beasley et al. patent describes the detailed design and operation of computer integrated manufacturing system 10. In particular, the design of manufacturing operations controller 11, corresponding to "Level III" and "Level IV" computers, is described in detail in the Beasley et al. patent and will not be described in detail therein.

Manufacturing operations controller 11 generates a master production schedule file 13, corresponding to the "scheduling system" and "plant scheduling system" in the Level IV and Level III computer systems of the Beasley et al. patent. Manufacturing operations controller 11 also generates an engineering change control file 12 corresponding to the "change order file" in the Beasley et al. patent. It will also be understood by those having skill in the art that engineering changes control file, which is generated separate from the manufacturing operations controller, may also be provided.

Manufacturing operations controller 11 is designed to control a plurality of production complexes. In FIG. 1, complexes 14A . . . 14N may each be thought of as a production line which includes a plurality of production machines 15A . . . 15N, 16A . . . 16N for producing an intermediate or finished product. As shown in FIG. 1, the complex's machines are functionally interconnected so that if one machine in the complex is unavailable due to a failure or due to maintenance activity, the entire complex is unavailable for production, or the production capacity of the complex is limited.

The intelligent computer integrated maintenance system 1 of the present invention includes a maintenance operations computer controller 2 having four subsystems therein. These subsystems are the maintenance schedule management subsystem 3, the engineering change control management subsystem 4, the parts manual management subsystem 5 and the spares inventory management subsystem 6. Each of these subsystems will be described in detail below. Their operation may be summarized as follows:

Maintenance schedule subsystem 3 obtains a schedule of actual production and planned production for the complexes from the master production schedule file 13. Parts to be maintained during a predetermined time period and a predetermined maintenance time during the predetermined time period for each part are identified, based upon the obtained schedule. The maintenance schedule management subsystem produces a reassigned planned production schedule and provides this schedule to master production schedule file 13.

Engineering change control management system 4 incorporates the engineering changes which are included in engineering change control file 12 into the maintenance schedule. Accordingly, maintenance of existing production machines is intelligently scheduled based on future engineering changes for the production machines.

Parts manual management subsystem 5 is designed to operate with an electronically stored parts manual file 7 which contains a hierarchical listing of all parts in the production machines in the complexes. The parts listing does not merely include maintenance or consumable parts; it includes a complete bill of materials for each production machine. Preferably, accompanying each bill of materials is an image of the associated bill of materials. For a typical machine 5-6 levels of materials are provided with the highest level being the part number for the entire machine, and the lowest level being the lowest replaceable part level for the machine.

The parts manual file 7 enables the maintenance schedule management subsystem 3 to tie together maintenance events scheduled for different parts of a particular production machine in a complex, so that maintenance operations for a complex are intelligently grouped together to reduce, and preferably to minimize, downtime of a complex. The parts manual management system 5 also interfaces with the engineering change control management system 4 so that an accurate parts manual file incorporating engineering change controls may be maintained.

Spares inventory management subsystem 6 is designed to operate with a spares inventory file 8 to manage ordering and inventory of spare parts. Spares inventory management system cooperates with the parts manual management subsystem 5 and the engineering change control management system 4 so that spare parts are ordered based upon an accurate list of parts in the parts manual file. When possible, generic or substitute parts are ordered rather than manufacture-specific parts. Furthermore, inventory management takes into account expected engineering changes so that unusable spare parts inventory is minimized. The spares inventory management subsystem 6 generates orders for parts based upon the maintenance schedule generated by maintenance schedule management subsystem 3. Generic parts are typically ordered using a point of order system in which additional quantities of parts are ordered when the quantity on hand is less than a predefined number. In contrast, nongeneric parts are ordered on a one-by-one basis based on the expected maintenance to be performed. Accordingly, inventory of these parts is minimized.

It will be understood by those having skill in the art that maintenance operations computer controller 2 is preferably implemented by a computer program running on a stored program computer, with subsystems 3, 4, 5 and 6 being modules which run on the maintenance operations computer. However, it will also be understood by those having skill in the art that each of subsystems 3, 4, 5, and 6 may run on a separate computer, interconnected using a common data bus. Parts manual file 7 and spares inventory file typically are files on a magnetic or optical storage systems or other well-known non-volatile storage means. It will also be understood by those having skill in the art that the intelligent computer integrated maintenance system 1 may be implemented on a single computer system with computer integrated manufacturing system 10 in an integrated computer integrated manufacturing/maintenance system. For multiple complexes the maintenance operations computer controller 2 is typically implemented using a mainframe computer such as an IBM 3090. However, one or more personal computers may also be used for one or more of the subsystems or the entire maintenance system.

The detailed hardware and software design of the intelligent computer integrated maintenance system of the present invention will depend on the number and complexity of complexes being controlled, the number of functions desired, the available computer resources, and a number of other factors well known to those having skill in the art. The following description of the intelligent computer integrated maintenance system will enable those skilled in the art to implement a system which can be integrated with known computer integrated manufacturing systems.

OVERVIEW: MAINTENANCE SCHEDULE MANAGEMENT SUBSYSTEM 3

An overview of the operation of the maintenance schedule management subsystem 3 (FIG. 1) will now be described. Maintenance operations fall into two categories: planned and unplanned (emergency). Unplanned emergencies occur when a machine breaks down or is producing poor quality products. One feature of the present invention is that unplanned maintenance operations may be entered into the system, and planned maintenance operations which are scheduled to occur within a predetermined time period of the unplanned maintenance may be implemented during the unplanned maintenance. In other words, when the complex is unavailable for production due to an unplanned maintenance activity, planned maintenance which can be accomplished simultaneously is also performed, so that the complex need not be taken off line a second time a short time later to perform planned maintenance operations.

Planned maintenance may be "time dependent", such as an oil change every three months regardless of hours used; or "usage dependent" based upon actual run hours, such as a visual inspection performed every fifteen hundred production hours. One other form of planned maintenance is a Maintenance Improvement Committee (MIC) directive which is a major event such as a machine upgrade.

The maintenance schedule management subsystem 3 controls time dependent events using a regularly scheduled (RS) maintenance file in the maintenance operations computer controller 2. An RS record is established for each production machine and the time interval for a maintenance operation is coded in the RS record. This information is used to time-phase future time dependent events.

Usage dependent events are controlled by the master maintenance schedule file 13. Actual run hours are maintained by complex. Future run hours are derived by accumulating the planned run hours by complex based on the planned schedule. This information is used to determine the timing of future usage dependent maintenance events.

Maintenance Improvement Committee (MIC) directives are events developed by the engineering maintenance improvement committee. These directives include items such as machine conversions to produce different products, machine upgrades, preventative maintenance trials, machine overhauls or machine relocations. Maintenance improvement committee directives are established by entering a planned maintenance request in the maintenance operation's computer controller. Planned maintenance requests are used to time-phase future maintenance improvement committee directives.

It will be understood by those having skill in the art that the complex is the common denominator between maintenance and production. In the embodiment of FIG. 1, when maintenance is performed on a piece of equipment in a complex, the entire complex is inoperative. According to the invention, all planned maintenance operations are grouped by complex. Each production machine within a complex may have a different time-phased maintenance operation to perform. According to the invention, to minimize complex down time, these operations are coordinated so that multiple maintenance operations are performed simultaneously. For example, one machine in a complex may be due for maintenance on a particular Monday while another machine in the same complex may have time-phased preventative maintenance due on the following Wednesday. According to the invention, both maintenance events are rescheduled based upon the most critical maintenance to be perform.

A work plan stating the steps to be performed for each planned maintenance operation is created by the maintenance schedule management subsystem. Time-phased events are extended by the work plan to calculate the man hours, by labor grade and machine hour down time required to perform each task. The time-phase man hours are then compared to the man hours available for each week. Man hours available can be defined as the total maintenance hours (maintenance staff multiplied by the hours of the week) minus the time reserved for unplanned or emergency maintenance. For example, if ten employees perform full time maintenance activities and there are 40 hours in a week, then there are 400 total maintenance hours available per week. If a 40% contingency is reserved for unplanned maintenance, then 160 of the 400 hours represent unplanned hours and 240 hours may be dedicated for planned events.

Time-phased planned events are then rescheduled based on the criticality of the event and production requirements and the following activities take place: the complex is scheduled for down time so that the planned maintenance operation can be performed. The maintenance schedule is passed to the master production schedule file and the complex is removed from the available production activity. The maintenance request is downloaded to the computer at the complex. (The computer at the complex is described in the above mentioned Beasley et al. patent.) Maintenance requests are also used to record unplanned or emergency maintenance operations. Planned maintenance events may be performed when the machine is down for unplanned/emergency repair. Overall complex availability may be improved according to the invention by performing the planned maintenance while the complex is down. The time-phased planned maintenance man hours plus the man hours reserved for unplanned maintenance activities are extended by the hourly rate to calculate the annual maintenance budget.

FIG. 2 illustrates the results of planning and scheduling of maintenance operations by the maintenance schedule management subsystem 3. As shown in FIG. 2, the time dependent maintenance requirements are calculated in terms of both man hours and machine hours on a per week basis. The usage dependent man hours and machine hours are also calculated based on the master production schedule file 13. Maintenance Improvement Committee directive changes are also calculated in terms of man hours and machine hours. Then, the total capacity required in terms of man hours and machine hours is calculated for each week. The total capacity required is then compared to the hours available. It will be understood that the total hours include a 40% reserve for unplanned maintenance. Subtracting the hours reserved for unplanned maintenance yields the remaining hours which can be scheduled. As shown in FIG. 2, it is assumed that 10 man hours and 10 machine hours are available for planned maintenance. It will be seen that week one includes a one man hour capacity shortage, week four produces a seven man hour and two machine hour shortage, and week twenty-six produces a ten man hour and seven machine hour shortage.

Then, according to the invention, the maintenance requests are rescheduled in such a way that the man hours and machine hours are rescheduled to accommodate these shortages. Examples of "Rescheduling Operations" are illustrated in FIG. 2. In operation (a), four hours of man hour capacity shortage in week four are moved to week three. In operation (b), one hour of man hour capacity in week one is moved to week two along with the three remaining hours of the shortage from week four. In operation (c), two hours of machine hour shortage is moved from week four to week three. In operation (d), six hours of man hour capacity shortage in week twenty-six are moved to week twenty-five. In operation (e), four hours of man hour capacity shortage in week twenty-six are moved to week twenty-eight. In operation (f), six hours of machine hour capacity shortage in week twenty-six are moved to week twenty-five. Finally, in operation (g), one hour of the machine hour capacity shortage in week twenty-six is moved to week twenty-seven, and the due dates in all maintenance requests are changed to match the rescheduled times. Accordingly, by rearranging the maintenance events, all planned maintenance and production can be accommodated with the available resources.

OVERVIEW: PARTS MANUAL MANAGEMENT SUBSYSTEM 5

Equipment vendors typically provide a parts manual for each piece of equipment they sell. The parts manual contains engineering drawings and parts lists of all components used in the equipment and describe how the equipment is assembled. When maintenance is performed or engineering changes are planned, the parts manual provides essential reference information.

Figure 3:
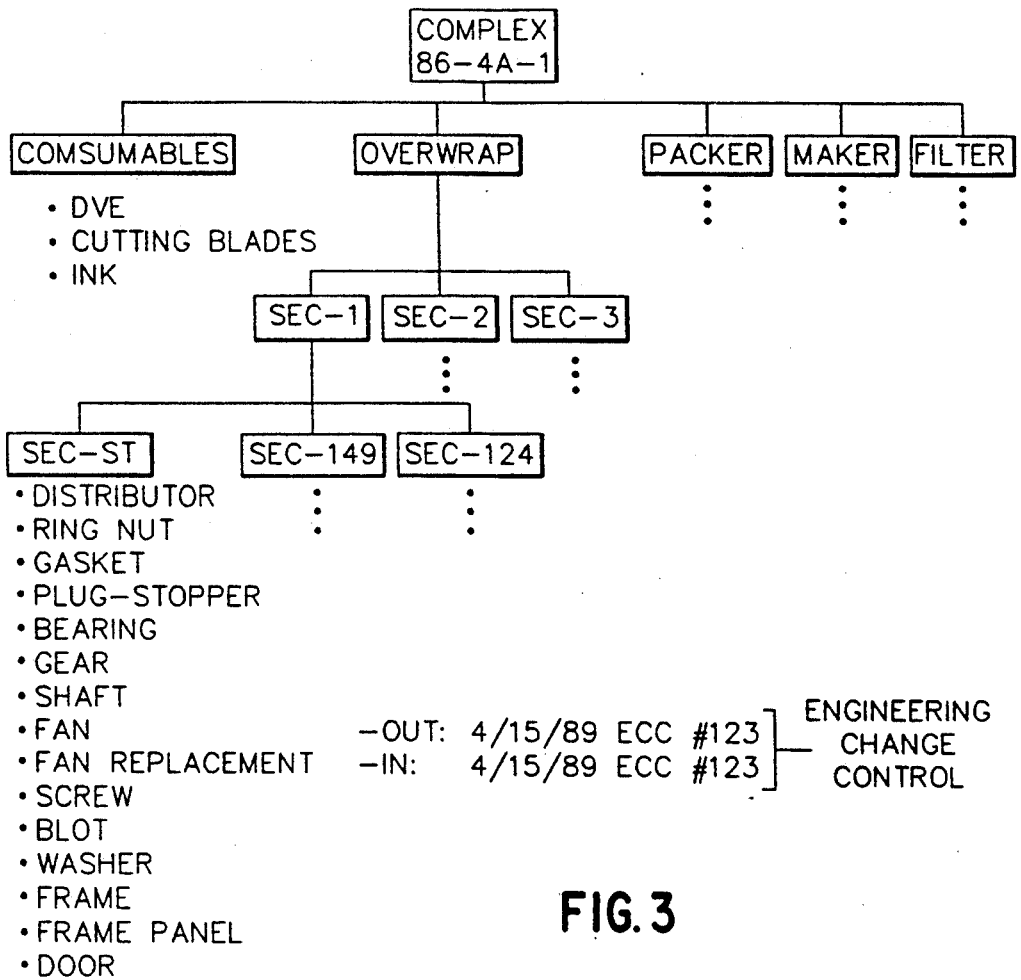
FIG. 3 illustrates a schematic example of the parts manual file of FIG. 1.

The parts manual file 7 (FIG. 1) of the present invention is a bill of material representation of the vendor's parts manual. The parts manual file organizes all vendor part manuals for a particular complex. This provides a multi-level bill of material for the equipment in each complex. FIG. 3 provides an example of a parts manual file for a complex denoted 86-4A-1.

Referring to FIG. 3 it will be noted that all parts that comprise a piece of equipment are maintained in the parts manual file, not merely those parts which are consumables or maintenance parts. Accordingly, the parts manual file contains a hierarchical listing of all parts in each machine in the plurality of production complexes. As will be described below, each level of parts in the parts manual file is preferably accompanied by a graphic image illustration of the interrelation of those parts.

All of the parts that comprise a piece of equipment, and which are included in the parts manual file, may be divided into four categories: consumable, replaceable, generic, and non-stocked. Consumable parts are those which are consumed by the production process but not maintained on a list of materials required to produce a product. Some examples include printing dies, tape belts and cutting blades. Because parts of this type must be replaced when they wear out or are used up, they are listed as component items in the parts manual file. According to the invention, spare parts planning for consumable parts is based on future run hours as determined by the maintenance schedule management subsystem 3. For example, tape belts are replaced at the beginning of each production shift. Therefore, each scheduled complex must have a set of tape belts for each production shift scheduled. The total number of tape belts required to support the planned schedule provides the number of belts required each day, week or month.

Replaceable parts are those which have an extended life but are subject to wear or failure. Examples include fans, motors, shafts and drives. These items have a mean-time failure rate which is initially provided by the machine vendor, who is normally the supplier of replacement parts. According to the invention, actual run hours and future run hours for these parts are determined from the master production schedule file and compared to the mean-time failure rate to determine projected parts replacement. When these parts are replaced, the actual run hours are set to zero and the accumulation cycle begins again. The replaceable part information (including for example, complex equipment number, maintenance request number, accumulated hours and other pertinent data) is saved in a parts history file described below. Statistical analysis is applied to review the mean-time failure rate for the part in this complex. If a vendor supplied mean-time failure rate is available, it is reviewed and modified when necessary. When no vendor supplied rate is available, a historical mean-time failure rate will be calculated based on parts history information. The parts manual file also provides information on replacement parts which are still under warranty by the vendor. The vendor's warranty date and/or warranty hours are maintained for the warranty comparison.

Generic parts are those which are used by many machines and include such items as nuts, bolts and washers. These parts are maintained in bulk and issued as required. These items are carried in the parts manual file for reference.

Non-stocked parts include the machine frames, doors, and other items which are not likely to require replacement due to failure or maintenance. These items are carried in the parts manual file for reference.

The vendor's supplied engineering drawings, or "exploded views", are stored as graphic images on magnetic or other media linked to the corresponding parts lists in the parts manual file. This enables a repairer or maintainer to request the parts list for a particular drawing, or request the drawing for a particular parts list.

The part number listing in the parts manual file also cross-references the vendor part number to an internal company part number, spares inventory system part number and an industry standard part number for generic parts or other parts where possible. In addition, the parts manual file can display multi-level parts listings, "part where used" information, summarized parts listings and engineering drawing and/or component parts associated with a pending engineering change notice. The parts manual file 7 is maintained in a central location and may be distributed. A copy may be provided for each complex containing only those production machines in the particular configuration found in that complex. This copy may be contained in a remotely accessible personal computer having a CD-ROM.

It will be understood by those having skill in the art that under certain circumstances it may be necessary to procure replacement parts prior to the modification of the parts manual file. For example, in an efficiency upgrade program, replacement parts may be identified for the improvement before the sequence in which complexes are to be modified has been determined. Another example is when an improvement kit has been obtained but the engineering drawing is not yet available. In both cases "Planning Bills of Material" provide a method of identifying the replacement parts and timing associated with an improvement program. The engineering department can create a planning bill for engineering changes without modifying the parts manual file.

The planning bill is used to evaluate machine modifications and plan for the stocking of new machine parts. For example, if a machine upgrade requires that fifty new parts are to replace forty existing parts on various locations of the machine, a planning bill listing the fifty new parts and the forty old parts is created. The plan may be costed and several implementation plans may be proposed. The planning bill may be used to schedule the time-phased parts delivery. Obsolete parts, i.e. those which are to be replaced, are phased out according to the planning bill. The actual implementation of the project is done through the parts manual file under engineering change control as described below. The planning bill is removed upon completion of the project.

OVERVIEW: ENGINEERING CHANGE CONTROL MANAGEMENT SUBSYSTEM 4

The Engineering Change Control Management Subsystem 4 (FIG. 1) maintains the parts manual file 7 using engineering change control procedures. Engineering drawings and parts lists are added, changed or deleted from the parts manual file based upon one of the "effectivity" control techniques described below.

The most commonly used effectivity control technique is a "specified date", for example: on April 15th, part A will be replaced by part B. Another effectivity control technique is "spare parts inventory use-up". With this technique, part B is issued when part A is no longer available. ECN control will ensure that part A is no longer ordered. Effectivity control can also be tied to a maintenance request "serial number". When this technique is used a particular change is implemented beginning with the maintenance request number specified and then applied to all subsequent maintenance requests.

Engineering change control is the communication of equipment changes to the production floor. When equipment changes are required, the parts manual file is updated by inserting, changing or removing drawings and/or parts. The engineering change control process is completed when the required changes have been implemented and the maintenance request associated with the modification is complete.

Figure 4:
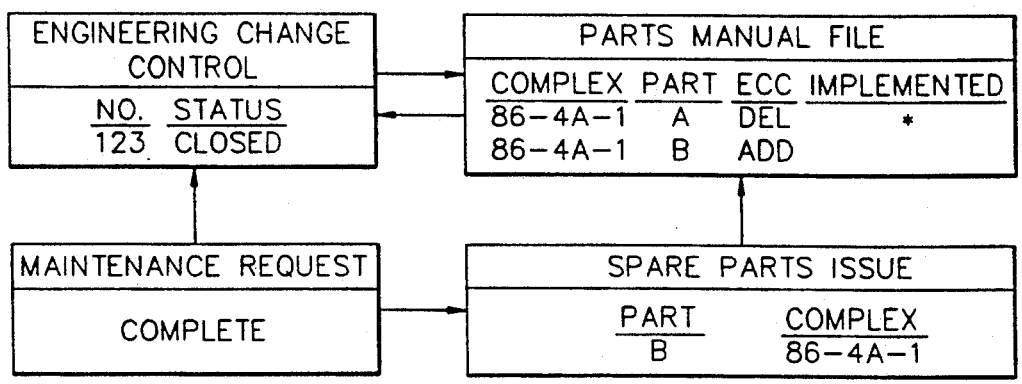
FIG. 4 illustrates an example of the engineering change control process according to the present invention.

The engineering control process is illustrated in FIG. 4. As shown in FIG. 4, part A in complex 86-4A-1 is to be replaced by part B under engineering change control No. 123. Maintenance request number XXX is performed by issuing part B from spare parts inventory to complex 86-4A-1. When maintenance request number XXX is closed, i.e. the work is completed, engineering change control number 123 is also closed and the parts manual file is updated to reflect the implementation of engineering change control number 123. Updates to the parts manual file, including a bill of material and an image of the drawings, are transmitted to the plant which includes the machine which has been updated.

OVERVIEW: SPARES INVENTORY MANAGEMENT SUBSYSTEM 6

The Spares Inventory Management Subsystem 6 controls the ordering of spare parts. According to the invention, generic items such as nuts, bolts and washers, are reordered using a typical "order point" technique. In other words, when the quantity on hand falls below a predetermined order point, a replacement order is generated for a standard order quantity.

Replaceable parts are managed using time-phased requirement techniques. The planning cycle consists of three steps. First, the time-phase parts requirements are calculated. These requirements come from three sources: parts required to support time-phased maintenance requests, parts defined on planning bills and anticipated parts replacement due to parts exceeding the mean-time failure rate. Anticipated parts replacement takes the current production plan for each complex and extends the plan through the hierarchical description in the automated parts manual. The planned run hours for each week are added to the actual run hours. A requirement is then created to replace the part during the week in which it will exceed the mean-time failure rate and the accumulated run hours are set to zero for that week. This yields the anticipated replacement requirements of all complexes which is summed to derive the total time-phased replacement requirements for the part. The time-phased requirements consumes the on-hand inventory until it is depleted. Spare parts used to support unplanned maintenance are removed from the on-hand inventory when the spare parts are issued. Replacement of these spare parts may cause the system to order them sooner than originally planned.

Finally, a replacement order is created for each week in which requirements exceed the on-hand balance, or safety stock, if one is maintained. The replacement order may be released to the supplier a predetermined number of days prior to when the part is required, based upon the lead-time that the vendor requires to ship the part. All spare parts required to support the maintenance requests, planning bills and replacement parts are combined to determine the total amount to be ordered for each spare part. The system may also generate paper order forms for the parts, or may electronically order the parts.

When the parts manual file of the present invention is used, a repairer can enter a specific complex number and page down through the hierarchical listing of parts until the proper parts drawing is displayed. When the repairer selects the parts he needs, the computer can convert the selection into a spare parts inventory system number and display the quantity that is currently available in inventory at the repairer's plant. If the quantity available meets the requirements, the repairer can have the parts issued immediately and applied to the maintenance request. When the quantity is insufficient, the repairer can request additional parts from the central parts supply or another plant and allocate those parts to the appropriate maintenance request. When the parts are transferred, they are issued to that maintenance request.

It should be noted that according to the invention, the repairer will be allowed to access the parts manual file at any one of the hierarchical levels. Accordingly, for example, if the repairer knows the machine number, he can enter that number and begin paging at that point in the parts manual file. In addition, part drawings can be printed.

DETAILED OPERATION: MAINTENANCE SCHEDULE MANAGEMENT SUBSYSTEM 3

The Maintenance Schedule Management Subsystem 3 (FIG. 1) integrates the master production schedule in the Master Production Schedule File 13 with the maintenance requirements for the complexes to thereby produce a Revised Master Production Schedule File and a Master Maintenance Schedule File 9. The result of this integration is a comprehensive schedule for all activity performed on a complex. An activity can be the production of an item, or a regularly scheduled maintenance operation. The Manufacturing Operations Controller 11 operates upon the Master Production Schedule File 13 to generate a schedule for each complex which will meet the production requirements within the complex capacity available. The Maintenance Schedule Management Subsystem 3 generates a Master Maintenance Schedule File 9 which includes a maintenance plan for each complex to support the master production schedule.

Figure 5:
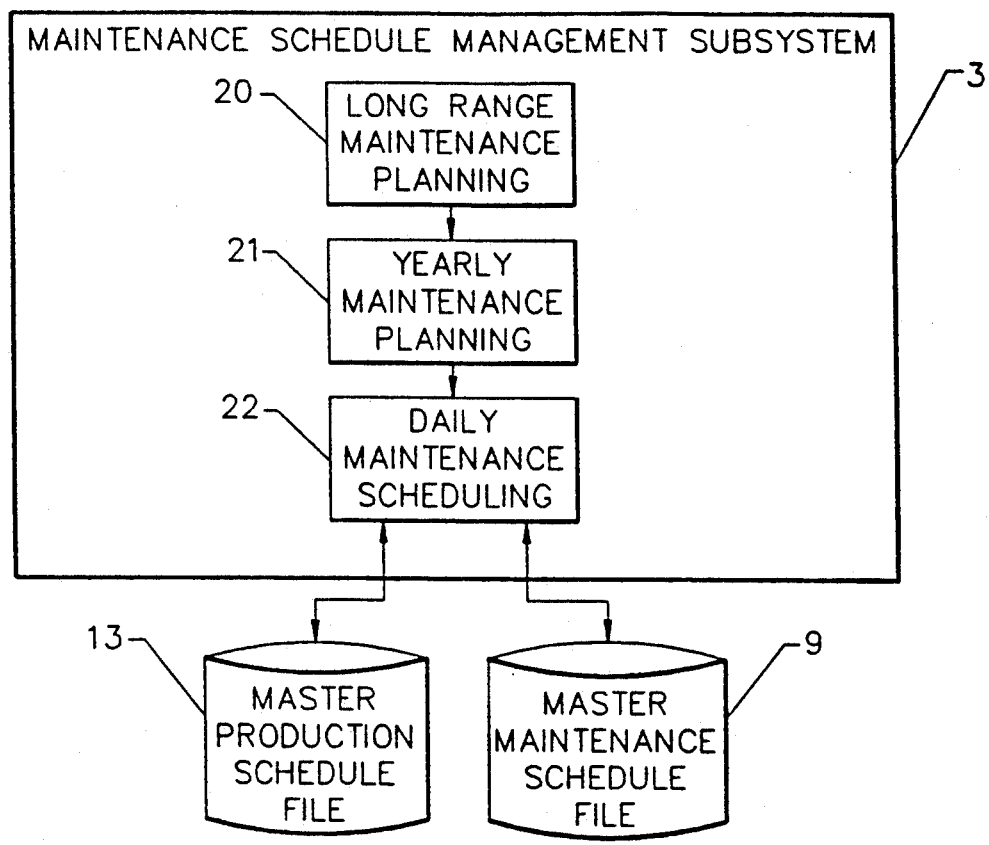
FIG. 5 is a block diagram of the maintenance schedule management subsystem of FIG. 1.

Referring now to FIG. 5, the Maintenance Schedule Management Subsystem 3 operates in three time-phases. First, long range maintenance planning for equipment procurement and configuration modifications is performed at Block 20. Then, maintenance planning and budgeting for the current year are performed at Block 21. The last phase is the scheduling of the daily maintenance activity, Block 22. Each of these phases will be described in detail below.

Long Range Maintenance Planning 20

The Maintenance Schedule Management Subsystem function begins with long range maintenance planning. The operations performed for long range maintenance planning 20 are described in FIG. 6. Long range planning may be performed in quarters for a one to ten year planning horizon. The strategic business plan is obtained (Block 25) and the current complex capacity is obtained for a first complex (Block 26). The rated complex capacity at 100 percent is a function of the speed, daily production hours and the number of production days in the quarter. This capacity is modified by applying an efficiency rate and utilization rate. The efficiency rate is used to reduce capacity to account for product set-ups, minor operating adjustments and special runs. The utilization rate reserves capacity for overhauls, modifications and other maintenance functions.

The comparison is performed at Block 29 by assigning each product to the complexes which can produce that product, until all products are scheduled (Block 27). It will be understood by those having skill in the art that multiple products may typically be produced on various complexes. Based on the priority of which product runs on which complex and the effectivity date when the product can be scheduled, a projection of capacity constraints is established. If no capacity constraints are found i.e. the product can be scheduled (Block 30), the first phase of long range maintenance planning is complete, and an indication of the excess capacity available, if any, is tracked at Block 36.

If there is a capacity shortage (Block 30) the capacity constraints are identified at Block 31. If overtime can resolve the capacity constraints (Block 32), it is planned and the comparison of requirements to capacity is tried again. I overtime is unavailable (Block 32), the second course of action is to increase the complex production capacity. This is done at Block 33 by improving the complex efficiency rate to provide more efficient use of the complex, and/or by improving complex availability to improve maintenance operations to increase production. The maintenance planner can state the minimum/maximum utilization to schedule a complex. The long range maintenance planning function will alter the utilization within the guide lines (Block 34) and the comparison of requirements to capacity is tried again.

If an increase in machine utilization cannot resolve capacity requirements (Block 35) the third course is to compare the required capacity to the excess capacity of other complexes, at Block 37. The long term trend of the other complexes is analyzed and Complexes which can be modified to produce the required products are selected at Block 38. Then, at Block 39 maintenance requests are created to perform the modifications if they occur in the first year of the planning horizon.

The above three alternatives are performed for all products until all products are scheduled (Block 27). The process then ends (Block 28). If these three alternatives cannot resolve the capacity constraints, a capital expenditure analysis may be generated to recommend the purchase of additional machinery.

The modified machine capacity file created at Block 38 is provided to the Manufacturing Operations Controller 11 (FIG. 1) for use when creating a production plan. The maintenance requests created at Block 39 to perform the complex modifications matches the modified machine capacity file. This is the first step of the integration of production and maintenance. The downtime for complex modification is reserved when the manufacturing operations controller creates the production plan.

Yearly Maintenance Planning 21

Referring again to FIG. 5, the second operation performed by Maintenance Schedule Management Subsystem 3 is yearly maintenance planning 21. Yearly maintenance planning creates a weekly maintenance schedule for the first year of the planning horizon. Long range maintenance planning reserves a complex by applying a utilization percentage; for example, reserve 10% of the time on a complex for maintenance operations. The utilization percentage rate is replaced by the yearly maintenance plan.

Figure 6:
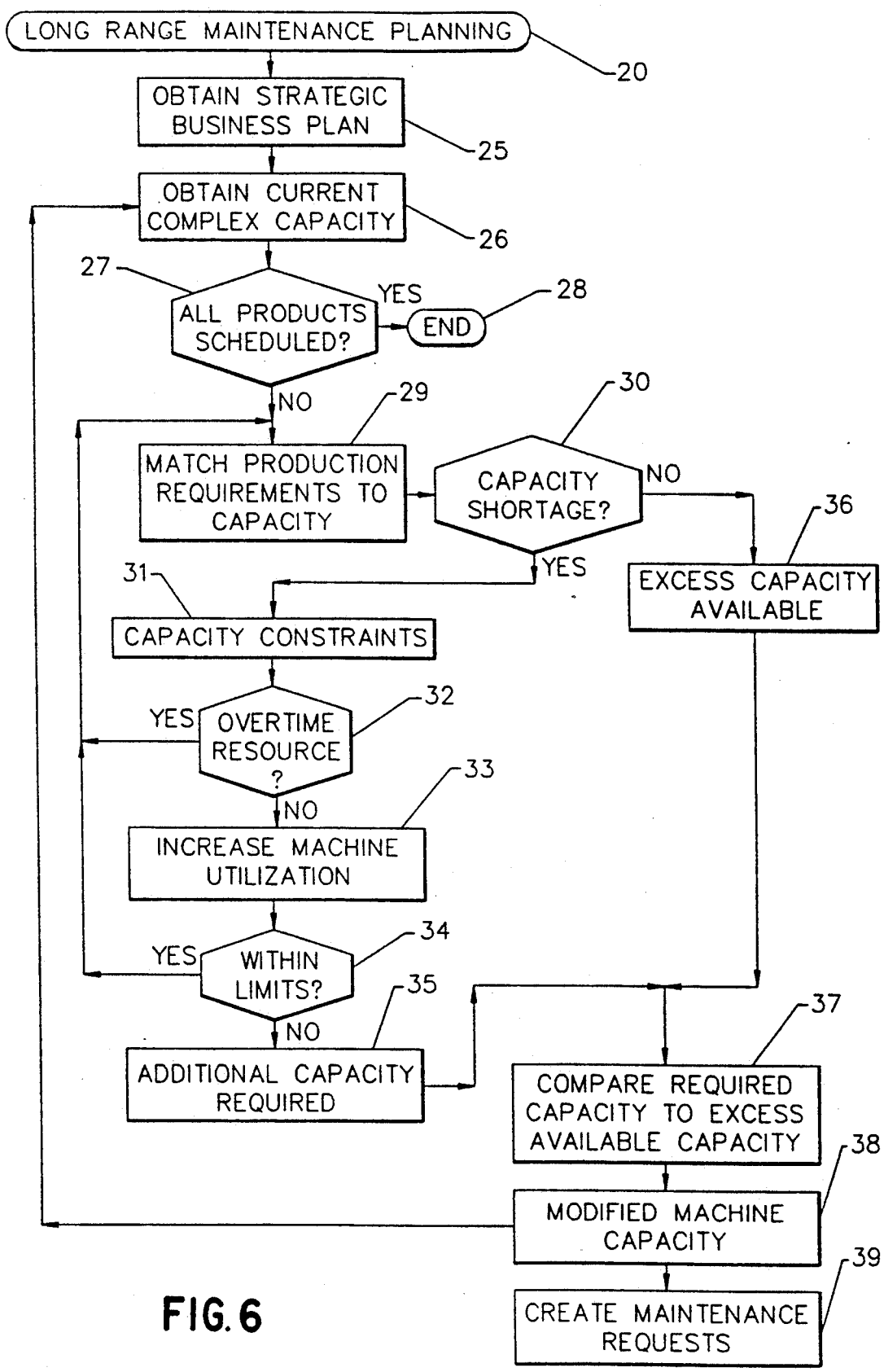
FIG. 6 illustrates the operations performed by the maintenance schedule management subsystem of FIG. 5 for long-range maintenance planning.
Figure 7A:
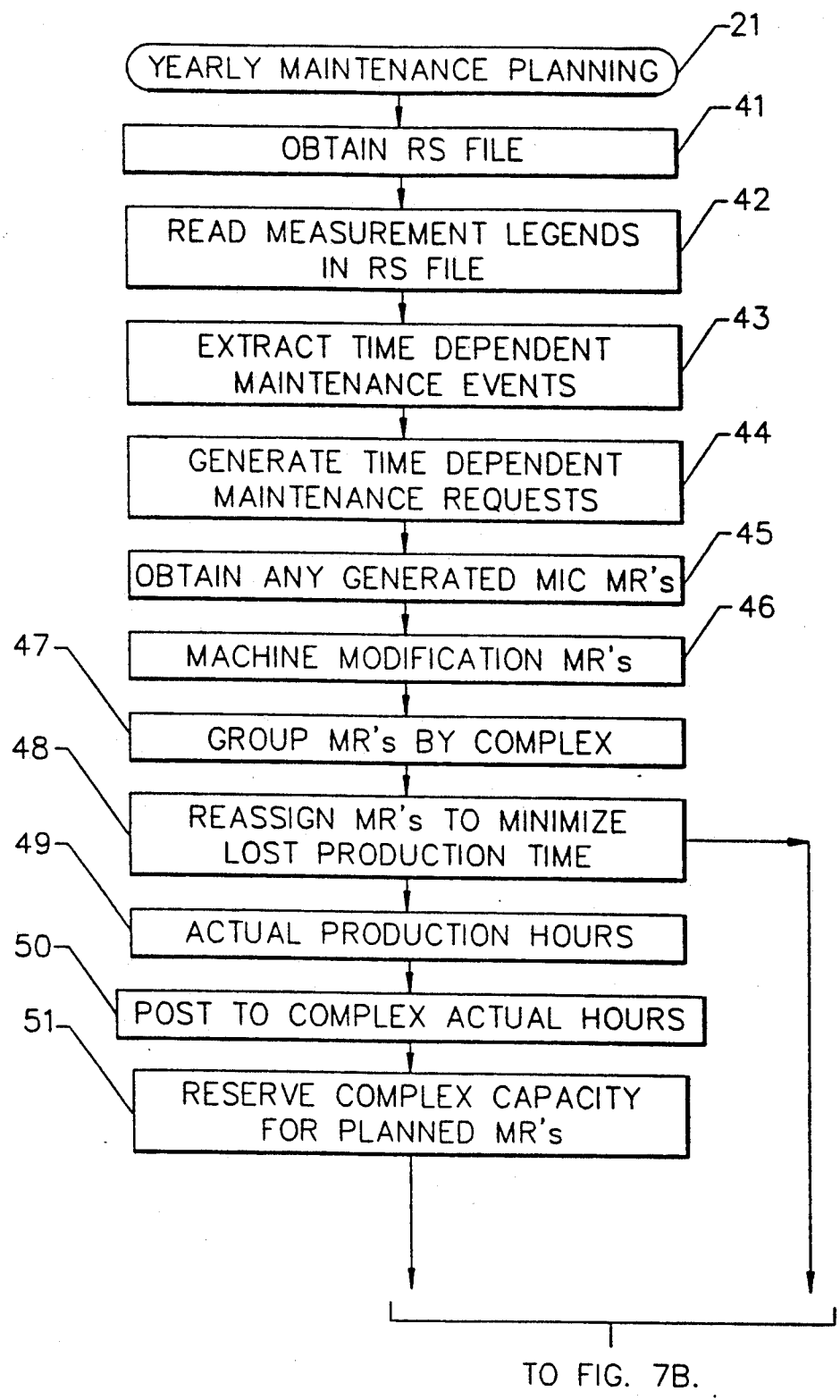
FIG. 7A-7C illustrates the operations performed by the maintenance schedule management subsystem of FIG. 5 for yearly maintenance planning.

Referring now to FIG. 7, the detailed operations performed by the Yearly Maintenance Planning Function 21 will now be described. The objective of this function is to group all known maintenance requests by complex. Maintenance requests may come from (1) complex modifications planned in phase one (FIG. 6); (2) Time dependent maintenance functions based on regularly-scheduled events such as an oil change; (3) MIC directives (Maintenance Improvement Committee directives) such as trials, modifications and upgrades; and (4) Usage dependent maintenance functions based on planned run hours for each complex. The maintenance requests for complex modifications, time dependent events and Maintenance Committee directives are grouped together. Once the grouping is complete, the dates that the MR's will be performed are rescheduled to minimize the complex downtime. The Usage dependent maintenance requests are created and merged with the other maintenance requests.

Referring to FIG. 7, the time dependent maintenance requests are generated at Block 44 by reading the Regularly-Scheduled (RS) file (Block 41). This file contains a RS record for each type of time dependent event to be performed on each piece of equipment. These events may require that the equipment be down - oil changes, lubrication or belt replacement. Other events perform visual inspection and equipment analysis while the equipment is still running. The measurement record is read for each RS record at Block 42 to extract the time interval that this event is to take place (Block 43). A planned maintenance request is created at Block 44 for each time dependent event during the first 52 weeks of the planning horizon.

MIC directives for trials, modifications and equipment upgrades are entered by the Maintenance Improvement Committee and are obtained at Block 45. The use of the equipment is reserved by the master production schedule when the complex will be out of production for an extended period of time. The complex modifications requests, initiated by production in phase one, are combined with the other planned maintenance requests, at Block 46.

Referring to Block 47, the maintenance requests for the time dependent, MIC directives and complex modifications are grouped by complex. Then, referring to Block 48, each of the maintenance requests for the complex are reassigned to minimize lost time for maintenance. Each maintenance request has a critical indicator which assigns the sequence which maintenance operations should be performed. Each maintenance request also has a window during which that maintenance request must be performed. The dates that each maintenance request is planned are examined so that less critical maintenance requests are combined with other maintenance requests. Maintenance requests are rescheduled to minimize the downtime of a complex.

Figure 7B:
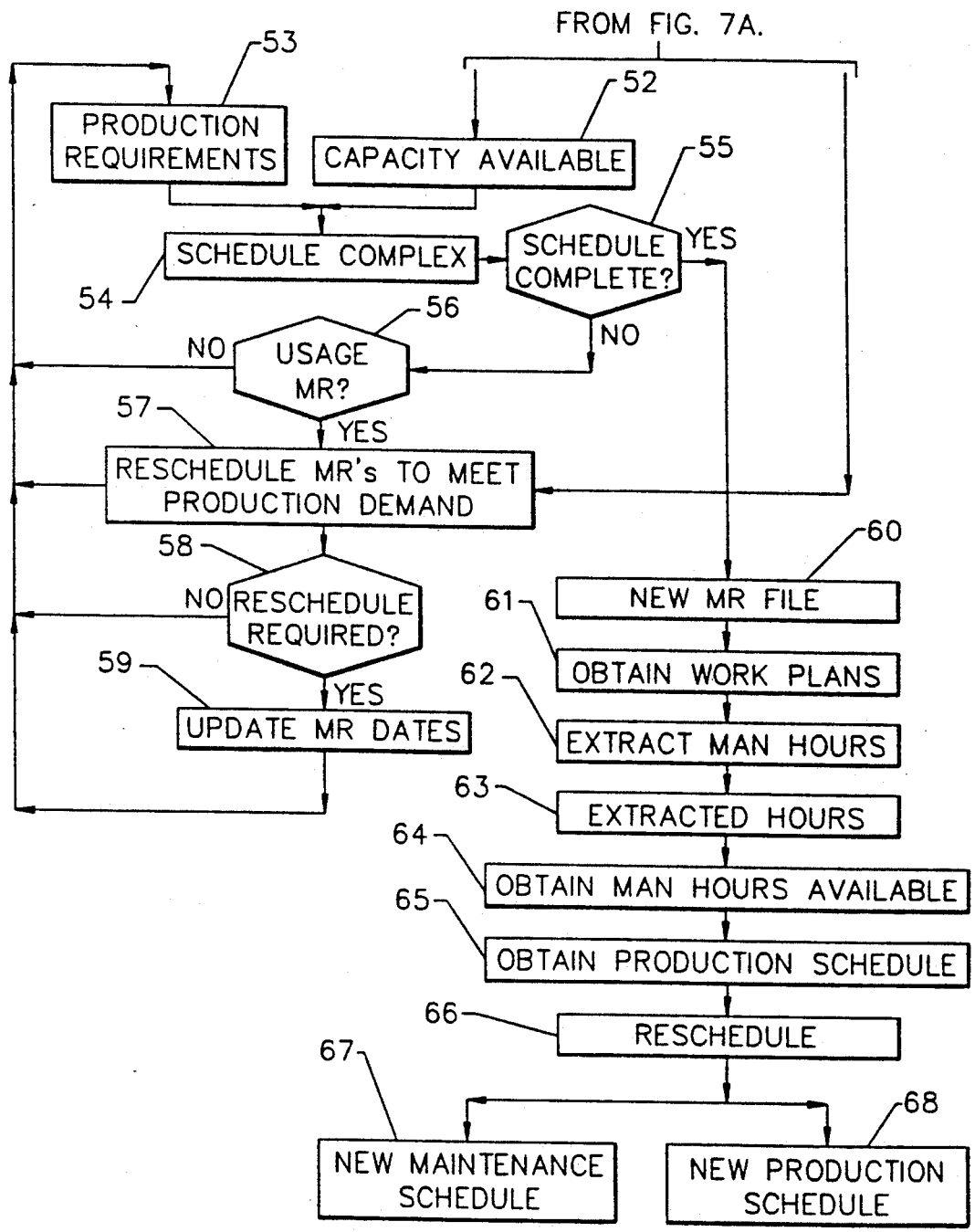
Figure 7C:
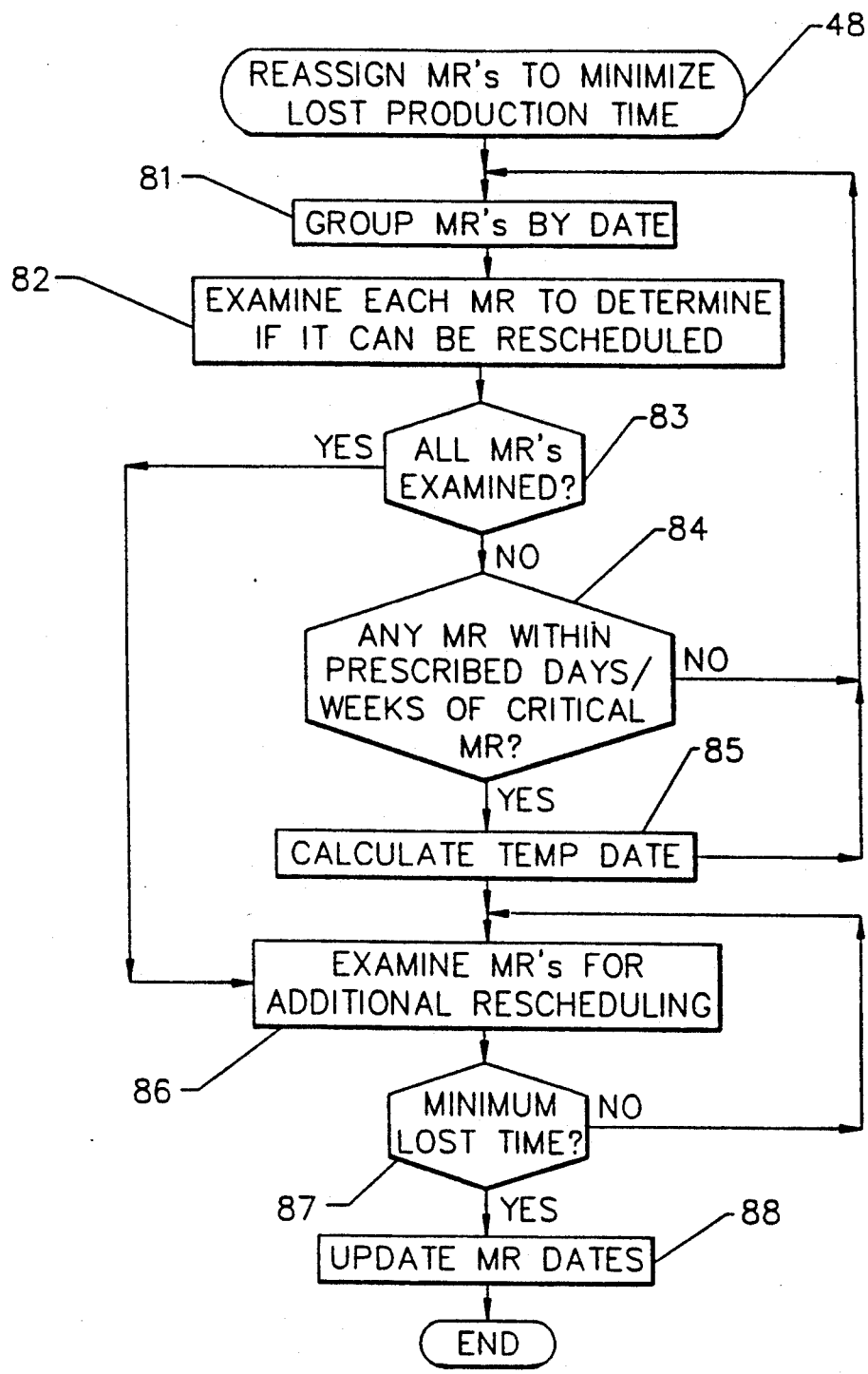

Referring now to FIG. 7C, the detailed operations for reassigning maintenance requests to minimize lost production time (Block 48 of FIG. 7A) will now be described. As shown in Block 81, maintenance requests are first grouped by date. Then, at Block 82, the sorted maintenance requests are examined to determine if they can be rescheduled to match other maintenance requests. This step continues until all maintenance requests have been examined (Block 83). The rescheduling is done to meet the most critical maintenance requests. In particular, each maintenance request may contain the number of days or weeks a maintenance request can be rescheduled and still meet the maintenance objectives. Block 84 examines the remaining maintenance requests to see if they can meet the maintenance objectives in terms of the number of days or weeks. Maintenance requests which can be rescheduled have a temporary schedule date calculated at Block 85. When all maintenance requests have been processed, maintenance requests are examined once again for additional rescheduling at Block 86. A check is made at Block 87 to see if the rescheduled maintenance requests produce the minimum lost production time. An additional pass is made to Block 86 to examine additional rescheduling and finally the rescheduled maintenance request dates are updated at Block 88.

For example, assume a complex modification is planned in week 20. Several time dependent maintenance operations are required for the same complex. One maintenance operation is scheduled for week 18 and another for week 21. These time dependent maintenance operations can be performed within two weeks of the original request date. The two time dependent maintenance operations will be rescheduled for week 20. In order to minimize lost time, the two time dependent maintenance operations will be performed while the complex is down for modification.

Referring again to FIG. 7A, planned maintenance requests are generated by the master production schedule for usage dependent events. Usage dependent events occur when a piece of equipment has been in production (use) for a given number of hours. Certain preventive maintenance operations are performed on the equipment based on the accumulated actual run hours plus the planned run hours. The master production schedule schedules a complex to be down to perform usage dependent events. Usage dependent events are calculated as follows:

(1) Actual production hours which a complex has run is accumulated (Block 49). The current week's production hours are added to the actual life-to-date hours.

(2) The time to perform the maintenance requests for time dependent, MIC directives and complex modifications is removed from the capacity hours available for production, at Block 51, and a new schedule of available capacity is generated at Block 52.

(3) The production requirements are loaded to the complex based on the capacity available after allowing for maintenance request (Block 54).

(4) The planned run hours are then added to the actual life-to-date hours. At Block 56, when the projected planned run hours exceed a usage dependent event (for example: do a class A overhaul every 1250 production hours) a maintenance request is planned (Block 57).

(5) The dates for a usage dependent maintenance request are then matched with other maintenance requests. If the complex is not scheduled for production close to the date for a usage dependent maintenance request, the request is rescheduled at Block 58 to be performed when the complex is not in use (Block 59). If production is required in a week in which maintenance is required, a check is made to determine if production can be moved to an idle complex. If the production requirement cannot be met, the maintenance request is rescheduled. The production requests and maintenance requests are rearranged at Block 53 to conform to the new schedule.

The above process is repeated, until, at Block 55, all maintenance requests have an assigned schedule date. A new maintenance request file is generated at Block 60. The machine capacity has also been reserved to perform the planned maintenance.

The next step is to extract the estimated labor hours required to perform the maintenance requests. There are two methods of extracting labor hour requirements. The labor hour requirements may be entered directly on the maintenance request. Alternatively, as shown in FIG. 7 at Block 61 the maintenance scheduler can indicate the work plan which has the detailed labor hour requirements. Based on the maintenance request's start date and the duration of the maintenance request, indicated by the end date, the labor hours are accumulated by labor type for each week of the planning horizon as shown at Block 62.

This yields the labor hours required to perform all of the maintenance requests (Block 63). The weekly labor hours available (total labor hours minus percent reserved for unplanned maintenance) is obtained at Block 64 and is compared to the weekly labor hours required. The production schedule is also obtained at Block 65. Finite scheduling techniques, involving automatic priority revision in order to level maintenance operations to the time available, are used to resolve all overloaded weeks and reschedule maintenance at Block 66. Each maintenance request is examined for criticality. The less critical maintenance requests are rescheduled to fill weeks where excess labor hours exists. This rescheduling is filtered by the production schedule obtained at Block 65 to ensure that the impact to the inventory policy is minimized. The result is a new maintenance schedule (Block 67) and a new production schedule (Block 68) An integrated weekly plan is now available.

Yearly Maintenance Planning

An example of the processing of FIG. 7 will now be described with reference to FIG. 8. Referring to FIG. 7 and FIG. 8A, the first step is to take the known maintenance requests for the MIC directives (Block 45) and time dependent events (Block 44) and insert them into the production schedule, replacing production capacity FIG. 8A illustrates the organization of regularly scheduled time dependent maintenance events and MIC directive maintenance by week. FIG. 8A also illustrates insertion of the time dependent maintenance requests into the production schedule for the complexes.

The next step shown in FIG. 8B, corresponding to Block 51 of FIG. 7, calculates the usage dependent maintenance requests, shown as "P/M". The scheduled hours are added to the actual hours to project when a maintenance request needs to be generated (Blocks 49 and 50 of FIG. 7). For example complex 1A-1 has 800 actual hours prior to week one. At 1250 hours a maintenance request is to be created. Adding a weeks worth of scheduled run hours (112 hours per production week) to the actual hours indicates that complex 1A-1 will reach the 1250 maintenance point during week four. A tentative maintenance request to perform the usage dependent maintenance operations is scheduled for week four.

Referring now to FIG. 8C, the third step, corresponding to Block 51 of FIG. 7, combines the maintenance requests to minimize downtime. For example, referring to FIG. 8C, both the maintenance requests for a time dependent event (MR3 in week four) and a usage dependent event (MR9 in week seven) are combined and rescheduled into week five when the complex is due to be idle. Production is below the inventory target desired for week four. The rescheduling of the maintenance requests achieves the production and the maintenance objectives. The complex schedule (Block 54) and New MR file (Block 60) are illustrated in FIG. 8C.

The final step, corresponding to Blocks 61–66 of FIG. 7, is to balance the required labor hours with the available labor hours. Referring to FIG. 8D, it is assured that only two maintenance operations can be performed per week. Week five has three maintenance operations scheduled. Complex 3A-1 is the best choice to reschedule because production is not scheduled for week six. However, week six will then have three maintenance operations. To allow the maintenance of 3A-1 to move to week six, the maintenance operation of complex 3A-2 will be moved to week seven. The resultant maintenance schedule (Block 67) and production schedule (Block 68) are illustrated in FIG. 8D).

Daily Maintenance Scheduling 22

Referring again to FIG. 5, the final phase performed by Maintenance Schedule Management Subsystem 3 is daily maintenance scheduling 22. Daily maintenance scheduling creates a comprehensive daily production/maintenance schedule. The previous phase (yearly maintenance planning) integrated the weekly maintenance and production plans for the entire planning horizon. The daily maintenance scheduling converts the weekly maintenance plan into the daily maintenance schedule.

Figure 9:
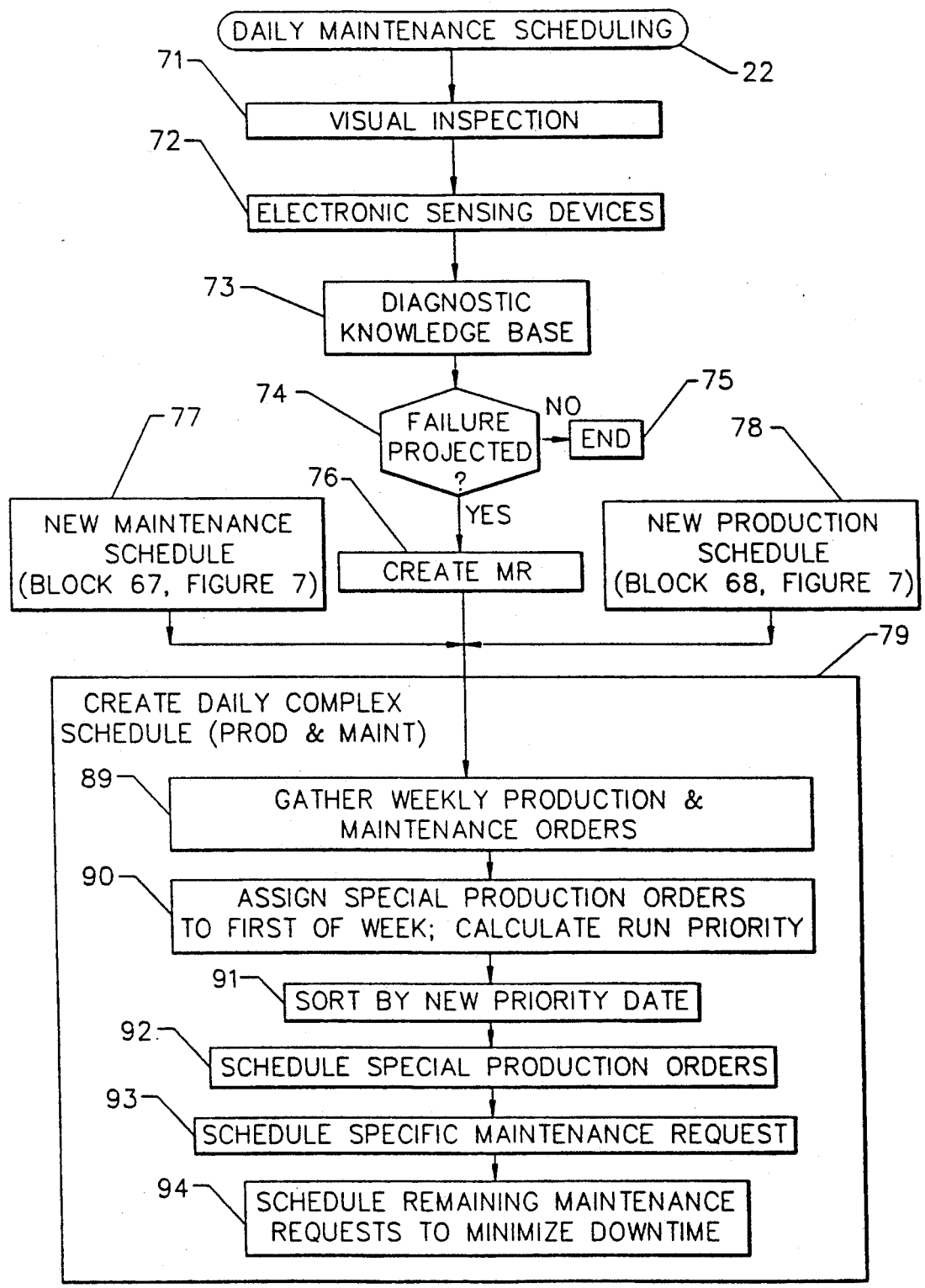
FIG. 9 illustrates the operations performed by the maintenance schedule management subsystem of FIG. 5 for daily maintenance scheduling.

Many of the maintenance requests have the actual dates that the maintenance event is to occur. MIC directives and machine modifications are examples. Time dependent and usage dependent maintenance events can occur any day of the week in which they are planned. The last group of maintenance requests to be gathered are those found during visual inspection and from electronic sensing devices FIG. 9 illustrates the process of gathering these maintenance requests.

Time dependent events for visual inspection can reveal potential equipment failures. The results of such visual inspections are obtained at Block 71. Electronic sensing devices may also be placed on key equipment components. Statistical process control (SPC) techniques are used to capture and evaluate the status of key equipment components. No action is taken when the readings are within the tolerance limits. Diagnostic data is generated from the visual inspection description and the SPC input for each reading outside the tolerance limits at Block 72. The diagnostic data may be evaluated at Block 73 using an expert system with an accompanying knowledge base to perform diagnostic checks. If no failure is projected (Block 74), the process ends at Block 75. If a failure is projected, the cause of failure is identified, the failure date is determined and a critical indicator is assigned for scheduling. The maintenance requests generated by this procedure at Block 76 are combined with the new maintenance schedule (Block 67 of FIG. 7) and the new production schedule (Block 68 of FIG. 4) at Blocks 77 and 77 respectively, and the daily maintenance schedule is created at Block 79.

Daily maintenance scheduling refines the weekly planning function described above in connection with FIG. 7. Maintenance requests for time dependent and usage dependent events can be scheduled any day during the week that they are due. MIC directives may have a specific start date which must be followed; others can be scheduled during the week in which they are due. Maintenance requests which have a predetermined start date are scheduled. The other Maintenance requests are then scheduled using machine loading techniques. This process includes looking at production orders which have a due date. Maintenance operations will be scheduled around specific machine requirements necessary to support production commitments.

More particularly, at Block 89, all production orders and maintenance requests from Blocks 67 and 68 of FIG. 7B are gathered. Then, at Block 90, special production orders are assigned a run priority based upon the date the production order is due and the amount of time it takes to produce the order. The production orders are then sorted by their new date at Block 91, and at Block 92, special production orders are scheduled to take ownership of the production equipment. Special maintenance requests which must be performed in a certain time frame are then scheduled at Block 93. Finally, at Block 94, the remaining maintenance requests are scheduled up to the maintenance hours (man and machine hours) available, and the remaining noncritical production orders are then scheduled.

DETAILED OPERATION: PARTS MANUAL MANAGEMENT SUBSYSTEM 5

A production complex consists of many pieces of machinery. Each machine has a Parts Manual which describes how the machinery is assembled, and includes a parts list, also referred to as a "Bill-Of-Material", for each assembly. The parts manuals are electronically stored and maintained by the Parts Manual Management Subsystem 5 (FIG. 1). The engineering drawings are converted to a digital format and the image is stored on parts manual file 7. The assembly structure and the parts lists are also stored on parts manual file 7. Each assembly has an image associated with it. The assemblies are arranged in a hierarchical listing. An illustration of the hierarchical listing in the parts manual file is shown in FIGS. 10A–10D.

Figure 10A:
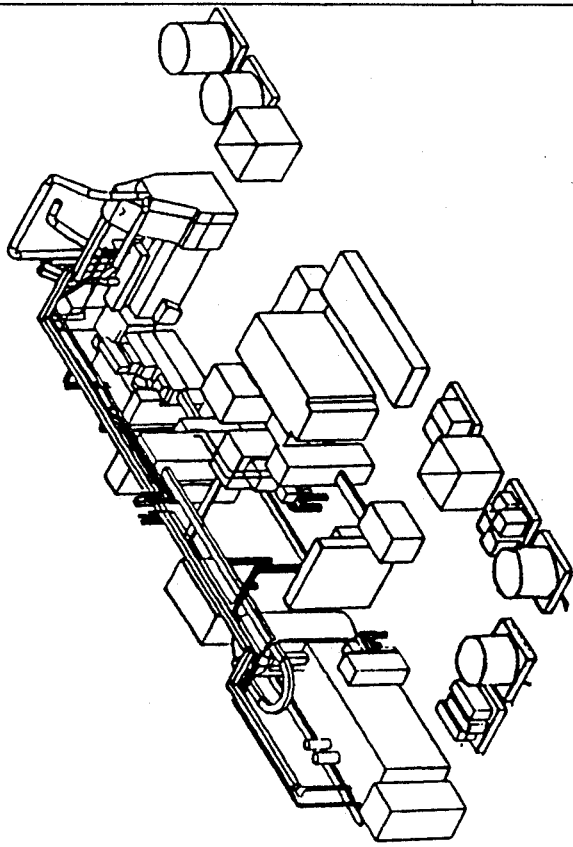
FIGS. 10A-10D illustrate the hierarchical listing of the parts manual file of FIG. 1.

When a unique production line identification is entered such as the factory, unit and complex number is entered, the parts manual management subsystem lists the components or parts list for that piece of equipment. The maintenance operator can enter a specific equipment identification number and the automated parts manual management subsystem will begin at that point. For example, if a maintenance operator enters the factory, unit and complex, the display of FIG. 10A is displayed. The left side of the display is an image of the selected complex. The upper right corner includes a list of all parts in the complex, one hierarchical level down from the complex level. The lower right corner allows a user to obtain help information, to exit the parts manual file, or to view a complete bill of materials (described below) without an accompanying image.

Figure 10B:
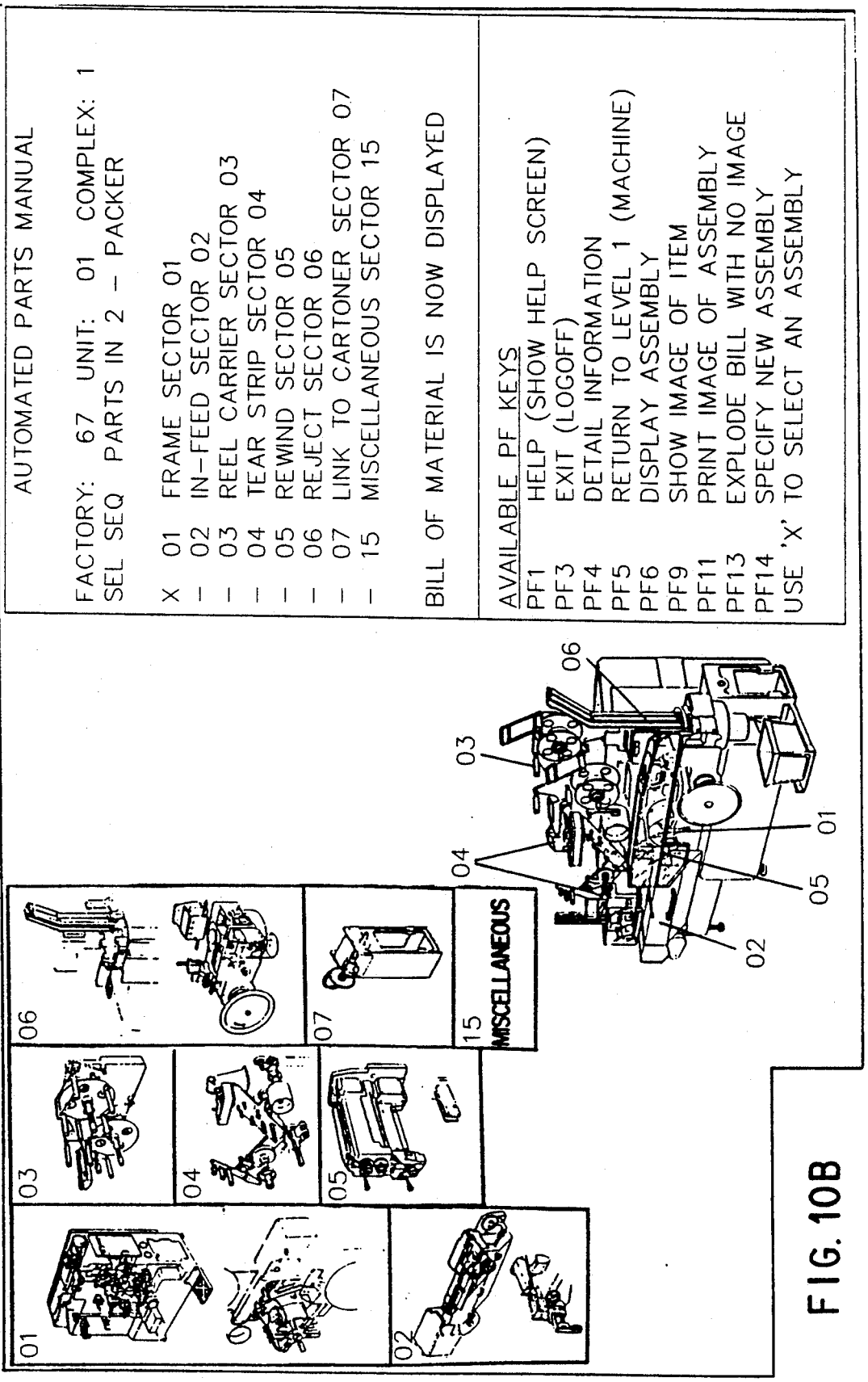

The operator may then select the next piece of equipment to look at. As shown in FIG. 10A, the packer was selected and display of FIG. 10B is displayed. The packer has eight sections. An image of each is displayed on the left side of the display of FIG. 10B. The upper right corner includes a list of the parts. The lower right corner contains the above described "help", "exit", and "explode bill" option described above. Options also allow detail information (such as company part number, type of part or replacement history) to be displayed, allows return to a higher level in the hierarchy, allows an image to be printed, or a new assembly to be specified.

Figure 10C:
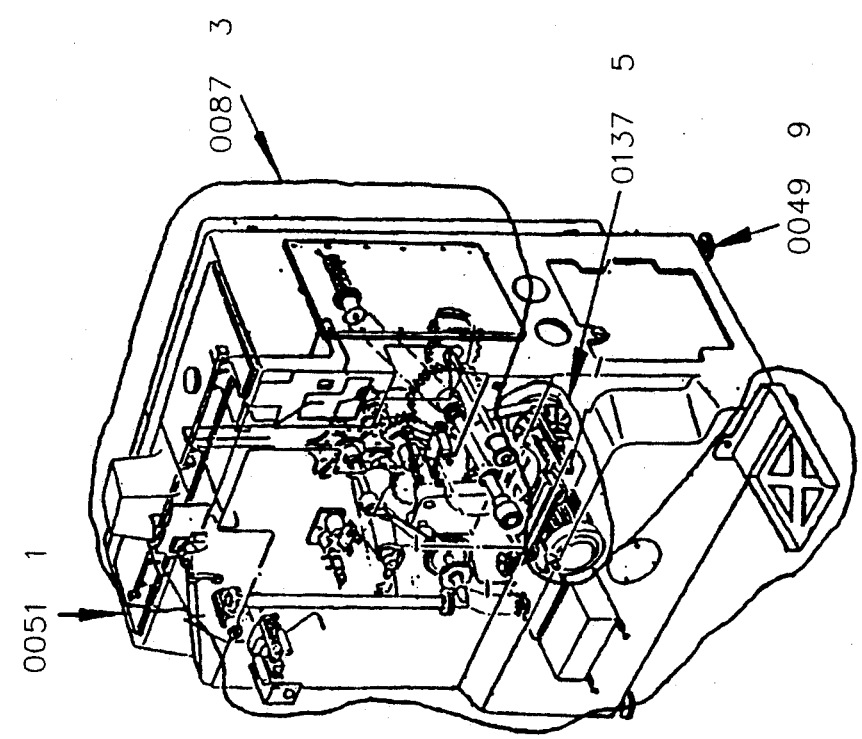
Figure 10D:
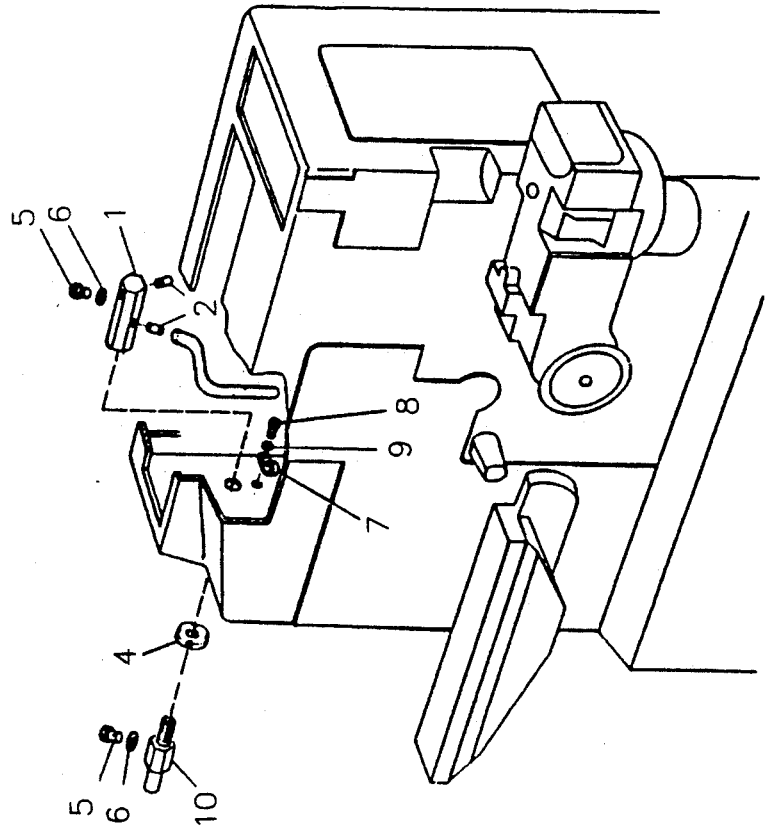

When the maintenance operator selects option 1 - FRAME SECTION 1" the computer reveals the next level of the machinery shown in FIG. 10C. When the maintenance operator selects option 1-part 0051, the last assembly of this sector appears on the computer along with the parts list (FIG. 10D). This is the lowest level in the hierarchial listing of parts. The maintenance operator may select the parts which are required by placing a 'P' beside the parts displayed. The parts will be automatically ordered, assigned an emergency maintenance request number, unless this is a planned modification, and the Parts Manual File will be updated to reflect the replacement parts. The Parts Manual Management Subsystem cooperates with the Spares Inventory Management System, as described below, to review part availability and to automatically issue the requested parts. The Parts Manual Management Subsystem also cooperates with the Maintenance Schedule Management System described above. All planned and unplanned maintenance requests are implemented through the Parts Manual Management Subsystem.

The engineering services department may maintain the master copy of the Parts Manual File. Each plant may be provided with a distributed version of the Parts Manual File for the equipment in their plant. Changes which are applied to the master copy are electronically transmitted to the plants throughout the day. Alternatively a CD-ROM may be created for remote use on a personal computer.

The engineering services department may identify a modification prior to determining to which complex(es) the modification will be applied or knowing the modification date. A planning parts model allows engineering services to create the parts list associated to the modification without associating the modifications to a specific complex. When the complex and date are defined for the modification, the planning parts model is copied to the specific complex. This allows for spare parts planning prior to committing the plant maintenance operations to an implementation schedule. The planning parts model also provides the capability to perform a cost benefit analyst of the proposed modifications.

The Parts Manual File and Parts Manual Management Subsystem may be implemented using commercially available imaging systems such as the Wang Integrated Image System (WIIS) marketed by Wang, Lowell, Mass.

DETAILED OPERATION: ENGINEERING CHANGE CONTROL MANAGEMENT SUBSYSTEM 4

Figure 11:
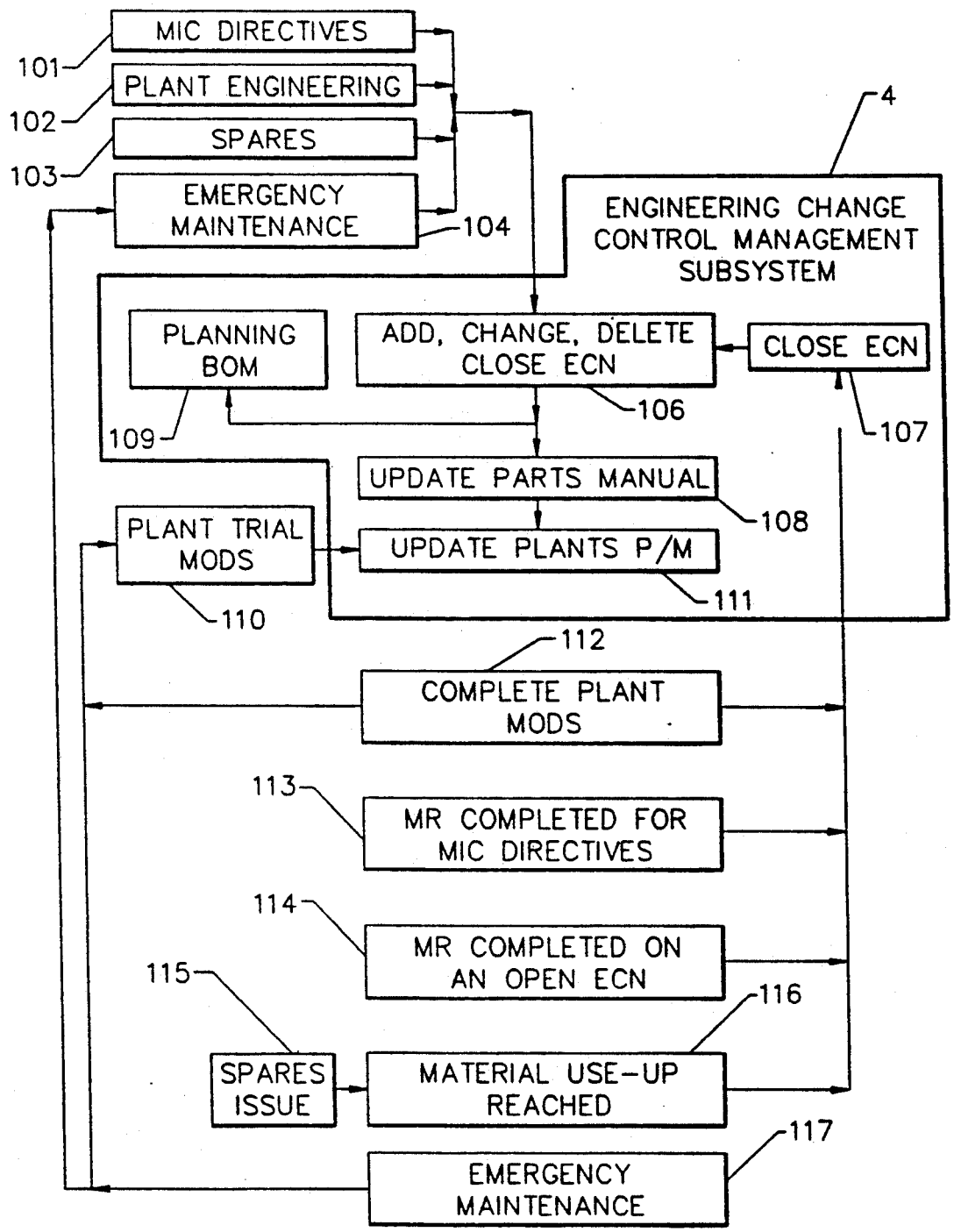
FIG. 11 illustrates the operations performed by the engineering change control management subsystem of FIG. 1.

All modifications to the Parts Manual File are controlled by the Engineering Change Control Management Subsystem 4 (FIG. 1). Referring to FIG. 11, the detailed operation of the Engineering Change Control Management Subsystem will now be described. An Engineering Change Number (ECN) is assigned for every modification to the Parts Manual File. The criteria to implement the modification, such as a date, is also assigned to the Engineering Change Number (ECN). All permanent modifications to the Parts Manual File are coordinated by a central Engineering Change Control (ECC) function. Each plant can establish temporary changes for plant trial modifications. These changes are in effect for a short duration and will be automatically removed, for example after 10 working days. Plant trial modifications must be submitted through the central ECC function when the modifications are to become permanent.

The maintenance request issued to perform a modification references the ECN to be applied. The Parts Manual File is updated when maintenance performs the task and closes the maintenance request. The ECN is closed when all the modifications under the control of the ECN are completed. Emergency maintenance performed on a piece of equipment is captured and routed to engineering services for review. The parts manual file will be updated based upon their action.

Engineering change control is divided into two phases. Identifying a change and coordinating the engineering change with the Parts Manual File is the first phase. Closing the engineering change and applying the change to the Parts Manual File is the second phase. Referring now to FIG. 11, in the first phase, all permanent modifications to the Parts Manual File (Block 108) are applied to the master copy and distributed to the plants (Block 111) upon ECN completion. Requests for modification come from several sources: 1) Maintenance Improvement Committee/vendor directives (Block 101) - such as equipment design changes for an efficiency upgrade; (2) Plant engineering modifications (Block 102) - implementing improvement suggestions from the maintenance operators; (3) Spare Part Inventory Control (Block 103) - for part substitution and replacements; and (4) Emergency maintenance performed (Block 104).

These modifications are sent to an engineering services group which coordinates all engineering changes via the Engineering Change Control Management Subsystem 4. Engineering services can operate the Engineering Change Control Management Subsystem 4 to add a part, remove (delete) a part or replace a part. The first step is to create an engineering change by adding an engineering change notice to the ECN file and establishing the criteria when the change is to take place. Next, at Block 108, the Parts Manual File is modified to reflect the engineering change - add, remove or replace a part(s).

A new part added to the Parts Manual File is classified as "inactive" and will not appear on the Parts Manual File until an engineering change number is assigned. A part to be removed will be flagged as such when the engineering change number is assigned. A replacement part is a two step operation: (1) remove the current part to be replaced; (2) add the replacement part.

Example: Update of Parts Manual File

FIG. 12 shows two examples of Engineering Change Control (FIG. 11, Block 106) and updating the Parts Manual (FIG. 11, Block 108). The first example in FIG. 12 is for drawing number 0051.01. Engineering Change Number 1010 indicates that this drawing is to be deleted (1010D) and replaced by 0051.01.01 (1010A) on 2/10/XX. Drawing number 0051.01 will be used prior to 2/10/XX. Drawing 0051.01.01 will be used beginning 2/10/XX. The second example in FIG. 12 is for a part replacement. The distributor 4030 will be replaced by 4030.01 on 2/5/XX, controlled by Engineering Change Number 1011. Distributor 4030 is to be used before 2/5/XX (1011D). Distributor 4030.01 will be used beginning 2/5/XX (1011A). FIG. 13 shows the parts lists in effect on 2/5/XX.- FIG. 14 shows the same parts lists in effect on 2/10/XX. The parts list in FIGS. 12, 13 and 14 represent three different parts lists over a period of time based on the criteria of each engineering change number.

The example of FIGS. 12, 13 and 14 are for Unit 01 Complex 01. The same engineering change number can be used to modify multiple complexes concurrently. However, each complex must have an unique engineering change number to time-phase changes.

Closing the engineering change number and applying the changes to the Parts Manual File is the second phase of engineering change control. See Block 107 of FIG. 11. The information flow for closing ECN's is shown in FIG. 11. There are four methods of closing engineering change numbers, as follows:

(1) Engineering services can close an ECN upon demand (Block 107). The changes indicated by the ECN Will be applied to the Parts Manual File when this occurs.

(2) Completion of a plant trial modification (Block 110) will close the temporary plant ECN. The changes indicated in the temporary trial mod will be removed from the plant's Parts Manual File (Block 111). The master copy of the Parts Manual File will be updated if the plant trial modification has been entered by engineering services.

(3) The completion of a maintenance request (Blocks 113 and 117) will close an engineering change number. This can occur when maintenance issues a MR to implement a MIC directive (Block 113) or when emergency maintenance is performed (Block 117). Engineering services will be notified when a part was replaced which was not listed in the Parts Manual File.

(4) Engineering change numbers associated with material (part) use up, will be closed when spares (Block 115) issues the last part (Block 116). This will be described in further detail below.

Detailed Description: Database File Structures

Having described the detailed operation of the Engineering Change Control Management Subsystem 4 and Parts Manual Management Subsystem 5, the data file structures for the associated data files will now be described. These files are the Engineering Change Control File 12, and Parts Manual File 7. The Parts Manual File 7 includes three files: The Parts Master File, the Parts Image File and the Parts List File. They are described below.

(1) The Parts Master File—The layout of this file is shown in FIG. 15. The following fields are included:

| Part Number | Vendor drawing number or Vendor part number from vendor parts catalog |
|---|---|
| Description | Vendor description |
| Status | A - active |
| | I - inactive |
| | O - obsolete |
| Image Address | Physical location of the image of the engineering drawing in the parts image file |
| Date Last Chg | Date that the image was last modified |
| XYZ Part Nbr | Unique internal company part number for this part. Different vendor part numbers may use the same internal company part. |
| Substitute/ Replacement XYZ part nbr | The internal part number which will replace the current internal part during material use-up. |
| ECN nbr. | Engineering Change Number authorizing this change. |
| ECN Action | S - the substitute/replacement internal part number will replace the current XYZ part number |
| | R - the internal part number will replace this substitute/replacement internal part number |
| Complexes used in | List of complexes which this assembly appears in |
| Low Level | Lowest level number in the parts list file which this part appears |
| Planning | The planning level for this part. Used during spare parts planning. |

(2) The Parts Image File which contains the compressed representation of each drawing.

(3) The Parts List (Bill-of-Material) File. The layout of this file appears in FIG. 16. The following fields are included:

| Assembly Nbr | Engineering drawing number |
|---|---|
| Part Nbr | Spare part number used in this assembly |
| Sequence Nbr | Drawing sequence number for this spare part |
| Status | A - active |
| | I - inactive |
| Quantity Per | Number of spare parts needed at this sequence for the assembly |
| Scrap Factor | Scrap factor associated with this spare part |
| ECN Nbr | Engineering change control number assigned to this modification |
| ECN Action | A - add to assembly |
| | D - delete from assembly |
| Date Last Changed | Date of the last ECN modification made to this part |
| Cumulative Run Hours | Actual run hours posted to this part on this assembly |
| Mean-time | Life expectancy, in run-hours, for this part |

(4) The Engineering Change Control File contains the Engineering Change Notice File. The layout of this file appears in FIG. 17. The fields are as follows:

| Engineering Change Nbr | Number assigned to this ECN |
|---|---|
| ECN-Criteria | DT - implementation date |
| | VU - vendor part replacement inventory use-up |
| | RU - internal part replacement inventory use-up |
| | MR - maintenance request which will implement this change |
| ECN description | |

(5) The Regularly Scheduled (RS) Event file contains the following data:

| RS-number | unique number which identifies this record |
|---|---|
| RS-dept/complex | department and complex number |
| RS-description | description of this RS |
| RS-sched date | trigger date for generating maintenance request |

| | |
|---|---|
| | (MR). Used with frequency and lead time to determine time to generate an MR |
| RS-frequency | time in days between MR generation |
| RS-lead-time | number of days an MR is to be generated prior to the actual maintenance event |
| RS-shift | the beginning shift for this MR |
| RS-shutdown hrs | the number of hours required to perform this request |
| RS-priority | the priority sequence to perform the maintenance event; used to group maintenance operations |

Example: Engineering Change Control Management Subsystem Operation

FIGS. 18 through 22 represent a comprehensive example of the Parts Manual File 7 (FIG. 1) during different phases of engineering change control. The Parts Manual File for complex 670101 is illustrated in FIG. 18. Four engineering changes will be made to complex 670101, as follows:

(1) ECN 123 will replace Part-C with Part-B on 2/15/XX. This is an example of a "date control" engineering change.

(2) ECN 456 will replace Part-F with Part-E when the last Part-F is issued. This is an example of a "material use-up" engineering change which replaces one vendor part with another vendor part.

(3) ECN 789 is based on a Maintenance Improvement Committee directive (controlled by a maintenance request—MR). One part (Part-K) is replaced with three parts.

(4) ECN 886 will replace one internal XYZ part (55687) with another internal XYZ part (55666) for vendor part Part-A upon material use-up of XYZ part 55687. This engineering change replaces a vendor part with an equivalent part from another Vendor.

The completely modified Parts Manual File for complex 670101 is shown in FIG. 22.

Figure 23:
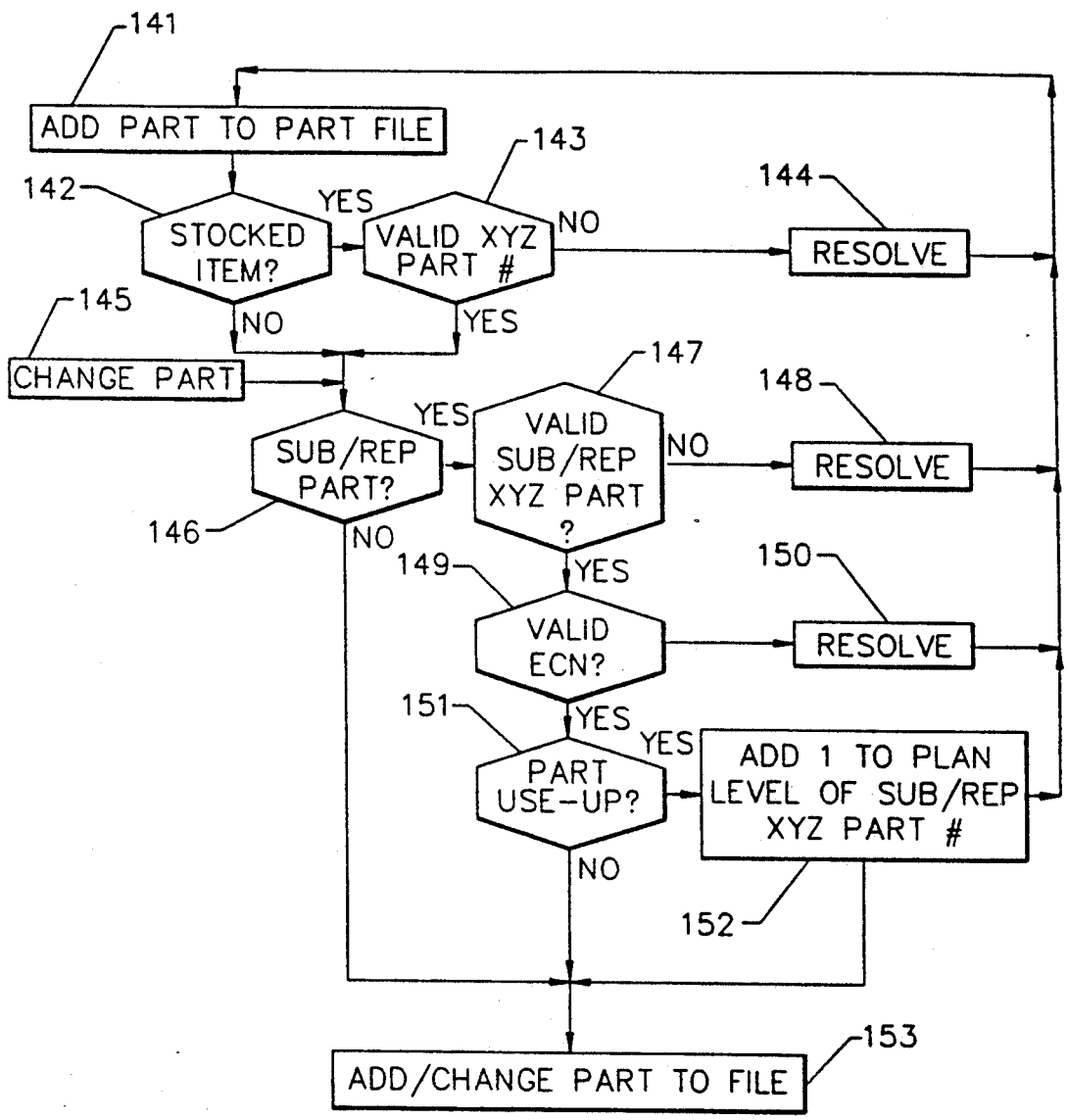
FIGS. 23 and 24 illustrate the operations performed by the engineering change control management subsystem of FIG. 1 to accomplish the changes illustrated in FIGS. 18-22.

All of these changes require that new parts be added to the parts master file. The operations performed by Engineering Change Control Management Subsystem 4 to accomplish these changes are illustrated in FIG. 23. In Block 141, line items 30-34 in FIG. 15 are added to the parts master file. Since these items are stocked (Block 142) and no engineering change control entries have been made for these parts (Block 146) the parts on line item 30-33 are added to the parts master after verifying that the XYZ part number exists (Block 143). Line item 34 (01B110) is a non-stocked item (Block 142) because it has no XYZ part number. Therefore it is added directly to the parts master (Block 153).

Figure 24:
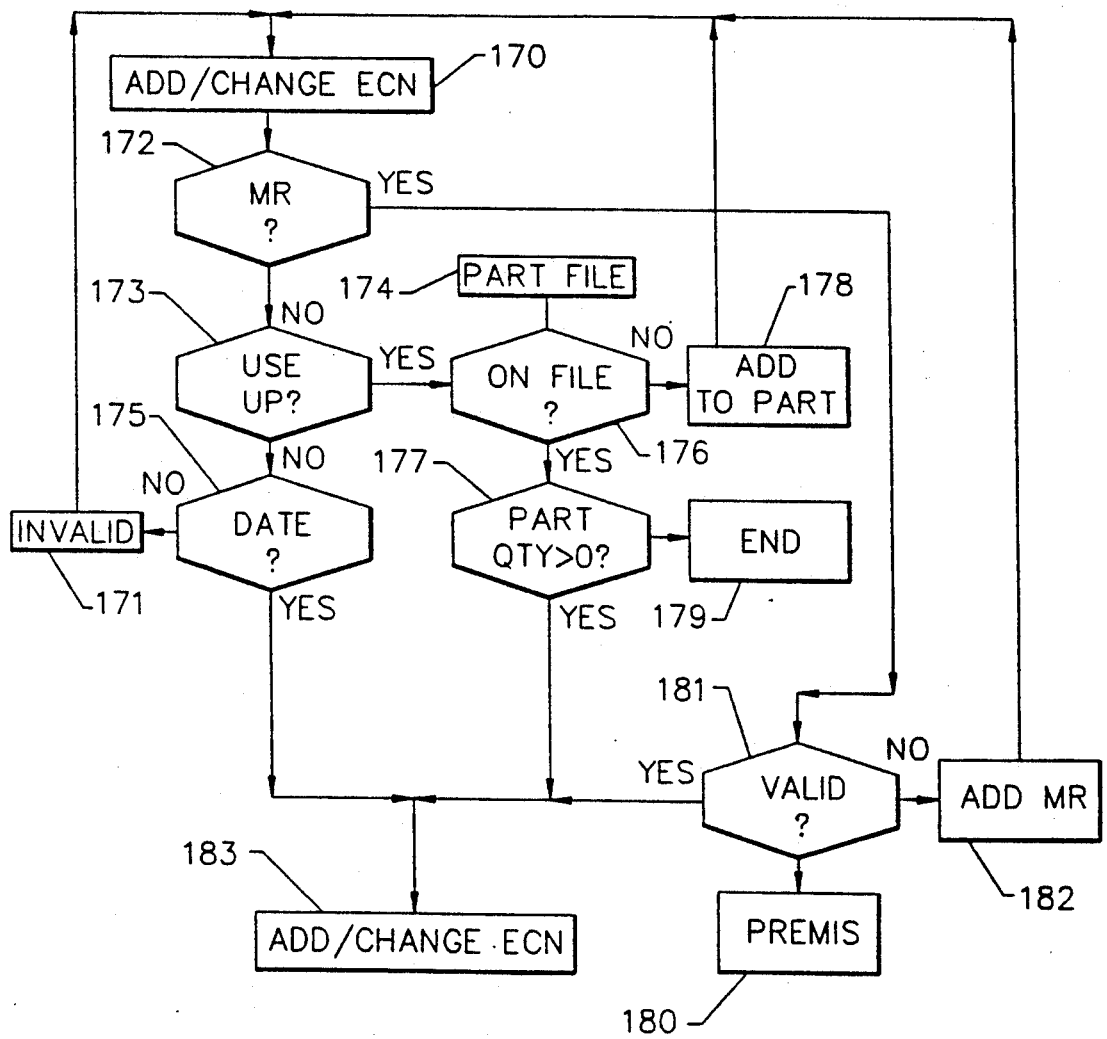

Next, referring to FIG. 24, the engineering change control entries are created. ECN 123—Group PM schedule—is date controlled (Block 175) to go into effect on 2/15/xx. ECN 456 is coded as a vendor part replacement to be implemented when Part-F is depleted (Block 173). This requires that Part-F be in the part master file (Block 176) and that the inventory quantity on-hand be greater than 0 (Block 177), plus any reserved stock if desired. ECN 789 is to implement a MIC improvement (Block 172) modification and will be effective when MR123 is completed. ECN 886 is another part use-up (Block 173). This one replaces one XYZ part with another XYZ part. This is the only ECN implemented through the part master.

Figure 25:
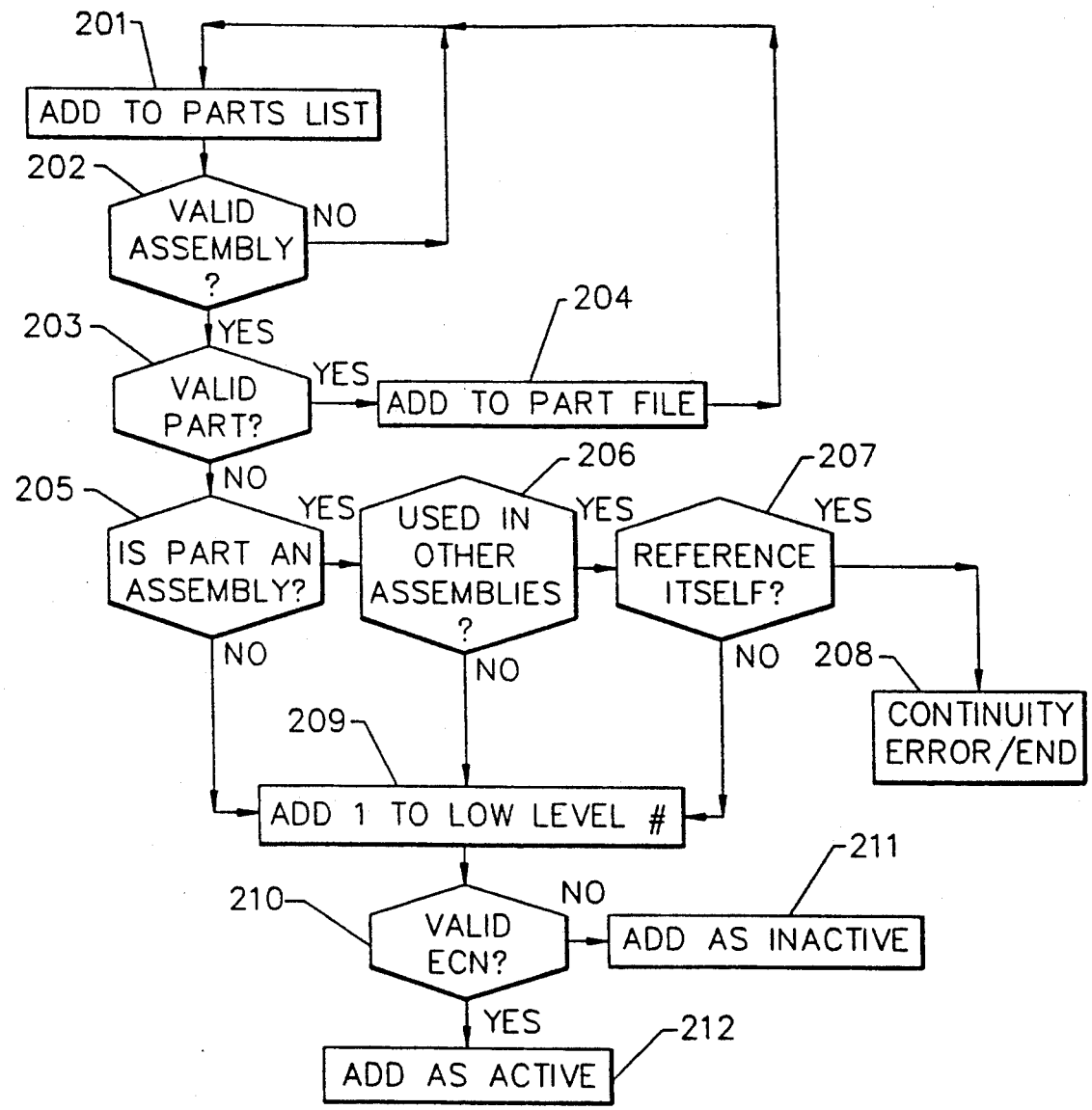
FIG. 25 illustrates the steps in updating the parts list.

The parts list is updated next. See FIG. 25. All changes are applied to the 01B1 assembly (Block 202). The last 5 line items (28-32) are added to the parts list (Block 204). Line items 22 and 28 are controlled by ECN 123 to be implemented on 2/15/xx. Line item 22 will be deleted and line item 28 added on this date.

ECN 456 controls line items 25 and 29. Line item 25 will be deleted and line item 29 will be added when the last vendor part Part-F is issued (reserved stock can be maintained by supplying a minimum inventory level).

ECN 789 is the last ECN to be implemented by the parts list. Line 25 will be deleted and line items 30-32 will be added when the maintenance request MR123 is completed.

Two additional steps are performed. When the part added to the parts list is an assembly. A check is made to determined if the assembly being added exists in other assemblies (Block 206). If it does, another check is made to determine whether the assembly references itself somewhere in the assembly structure (Block 207). This would create an endless loop, so the addition is rejected when this condition is detected (Block 208).

The assembly's low level code and the planning level code is incremented by 1 (Block 210) and stored as the parts low level code and planning level code. The planning level code is used during spare parts planning to ensure that all requirements for a part are known before replenishment orders are calculated.

The last step is to add the part as active (A) when an MR is entered (Block 212), or Inactive (I) when no MR is entered (Block 211). A part coded as Inactive is ignored for all purposes except for editing.

The last ECN (886) is implemented by the parts master, FIG. 15. Line item 24 will be implemented when XYZ part number 55687 is used-up.

FIG. 19 shows the parts list for 670101 with the three ECN's pending. When accessing the active parts list, only those parts in effect until the ECN is closed will be shown. FIG. 26 shows the active parts list of 670101 on 2/14/xx when no ECN's have been closed.

Stepping through FIGS. 20-22 illustrates the parts list as each ECN is closed. FIG. 20 is displayed after 2/14/xx—ECN 123 has been closed. FIG. 21 has both ECN 123 and 456 closed. Finally, FIG. 22 is the Parts List when all three ECN's have been implemented.

The engineering changes to the automated parts model are performed when parts are issued to a maintenance request (Block 115 of FIG. 11) or when a maintenance request is closed (Block 107 of FIG. 11). The operational sequence for closing ECN's is shown in FIG. 27.

Figure 27:
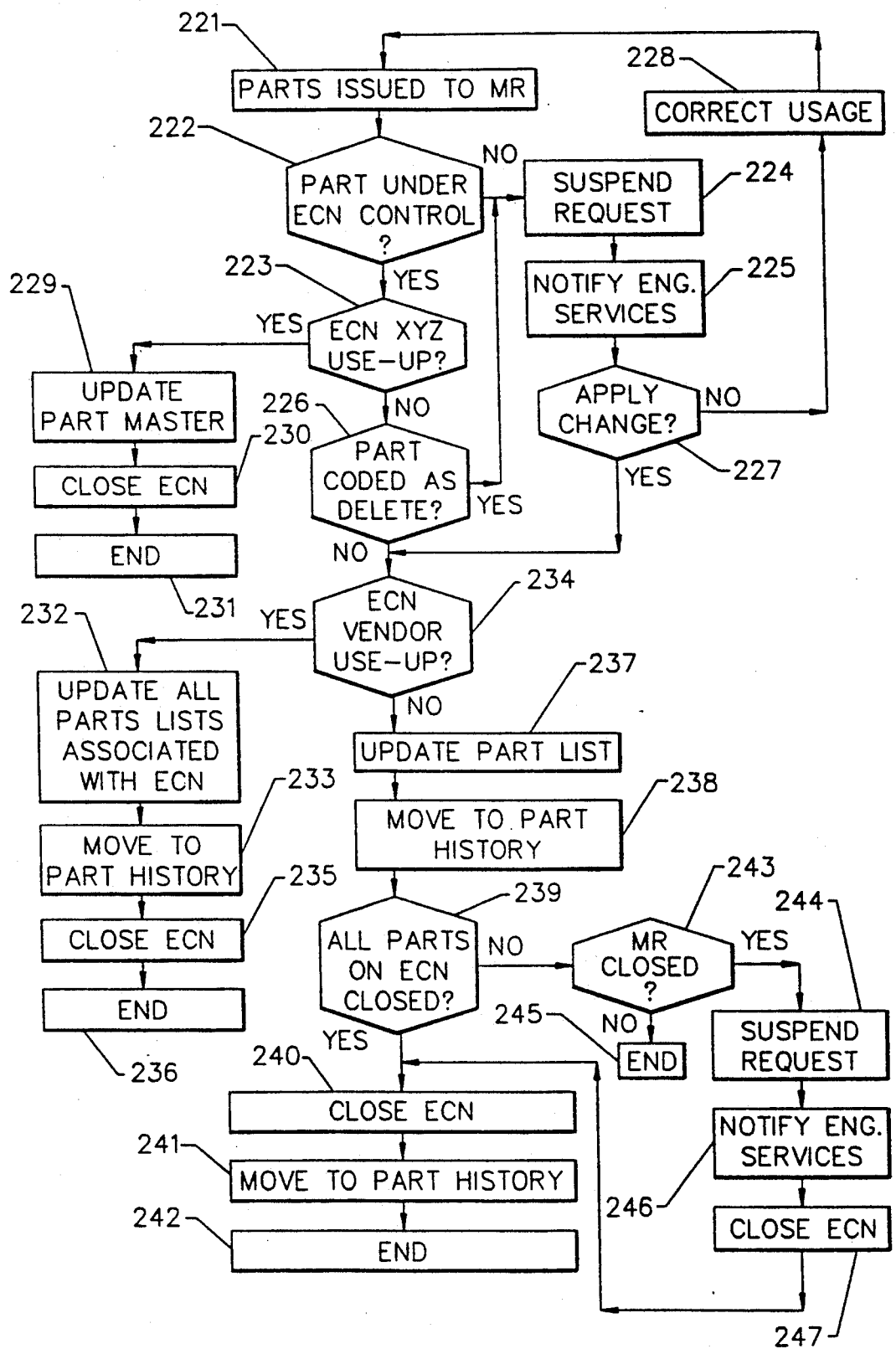
FIG. 27 illustrates the operations performed to close an engineering change number according to the present invention.

Referring to FIG. 27, each part issued to a MR (Block 221) is checked to determine if that part is under ECN control (Block 222). The request is suspended (Block 224) and engineering services is notified for corrective action (Block 225) when a part is not under ECN control.

If the part is under ECN control (Block 222), a part under XYZ use-up control (Block 223) updates the part master (Block 229) by moving the substitute/replacement XYZ part number into the XYZ part number field.

The ECN is then closed (Block 230) and removed from the ECN file. The process then ends (Block 231).

A part issued to a parts list item coded as delete (DEL) (Block 226) is suspended (Block 224) and engineering services is notified for corrective action (Block 225).

ECN's for vendor use-up (Block 234) will update all parts lists which are associated with this ECN (Block 232. The old item(s) on the parts list coded (DEL) is moved to ECN/part list history (Block 233) and removed from the parts list. The ECN is also closed at this time (Block 235) and the process ends (Block 236).

The remaining ECN changes are under MR control. Parts may be issued to a MR over a period of time. Each part issue will cause the parts list to be updated (Block 237) and the part history file updated (Block 238). The ECN is checked to verify if all changes have been made (Block 239). When all changes have been made, the ECN is closed (Block 240) and moved to ECN history (Block 241). The process then ends.

The request is suspended (Block 244) and engineering services notified (Block 246) for action when the MR is closed (Block 243) but the ECN is still open (Block 247).

The ECN/Parts List History File contains all changes to the Parts Manual File. The Parts Manual File can be recreated for any point in time. Statistical data about part usage, mean-time failure rates and number of maintenance occurrences may also be derived from the history file.

DETAILED OPERATION: SPARES INVENTORY MANAGEMENT SUBSYSTEM 6

Referring again to FIG. 1, the details of the Spares Inventory Management Subsystem 6 will now be described. Spare parts consist of four types of inventory items:

Generic items, such as nuts, bolts and washers: These items are maintained in bulk and issued as required. These items are carried in the spares inventory management subsystem and the parts manual file for reference.

Non-stocked items include the machine frame, doors and other items which are not likely to need replacing. These items are carried in the Parts Manual File for reference and in order to provide a complete hierarchial listing in the parts manual.

Consumable parts not maintained on the production bill-of-material, such as adhesives, are listed as component items. Dies which print the product logo, inks and cutting blades are further examples of consumable parts not maintained on the production bill-of-materials. These items are replaced when they wear out or are used up. Spare parts for consumables are planned based on future run hours. For example, cutting blades are replaced at the beginning of each production shift. Accordingly, each scheduled complex must have a set of cutting blades for each production shift scheduled. Accumulating the cutting blades required to support the plant schedule yields the amount of cutting blades required each day, week or month.

Replaceable parts, such as fans, motors, shafts and drives, are those spare parts which have an extended life but which can break. These items have a mean-time failure rate which is initially rated by the vendor. The vendor normally supplies these parts. Posting the actual run hours to these parts and accumulating the future run hours provides the ability to compare the run hours to the mean-time failure rate and time-phase projected parts replacement.

In general, Spares Inventory Management Subsystem 8 manages the purchasing of spare parts in the following way: Non-stocked parts are purchased upon request. Generic parts are reordered using typical "Order Point" techniques. In other words, when the quantity on-hand falls below the predetermined order point, a replacement order is placed for a predetermined order quantity. Consumable and replaceable parts are managed using a time-phased requirements technique. This time-phased technique will now be described.

Figure 28:
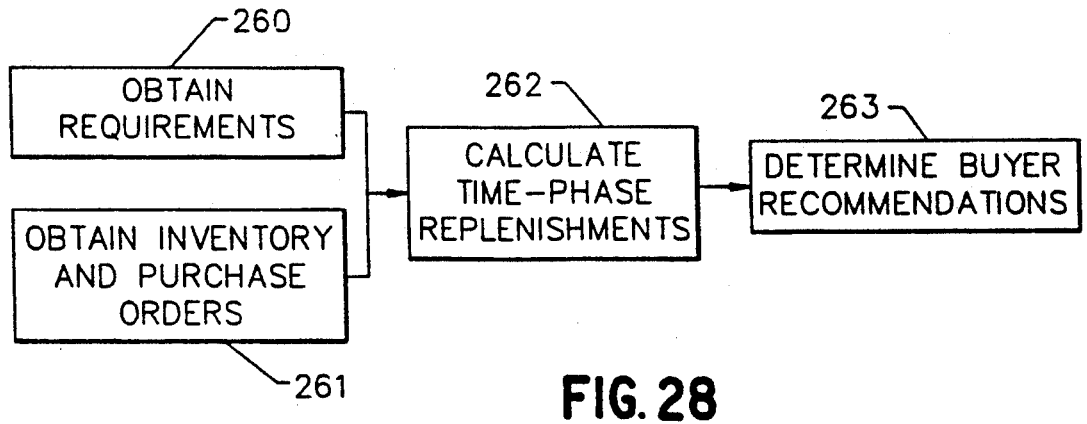
FIG. 28 illustrates the overall spare parts planning cycle according to the present invention.

Referring to FIG. 28, the planning cycle generally consists of four steps. The first step, at Block 260, obtains the requirements for spare parts. The second step, at Block 261, gathers the existing inventory and an outstanding purchase orders. The third step, at Block 262, is to calculate the time-phase replenishment schedule. The last step at Block 63 is to determine the buyer recommendations. Each of these steps will now be described in detail.

At Block 260, the requirements for spare parts are obtained. Requirements for spare parts come from three sources: (1) spare parts identified in the parts manual file, (2) spare parts identified in the planning bill, and (3) spare parts allocated to a specific maintenance request. The requirements from the first two sources are calculated in the same way and will be described below in connection with FIG. 30. The spare parts allocated to a specific maintenance request is added to the calculated spare parts requirements.

Figure 29:
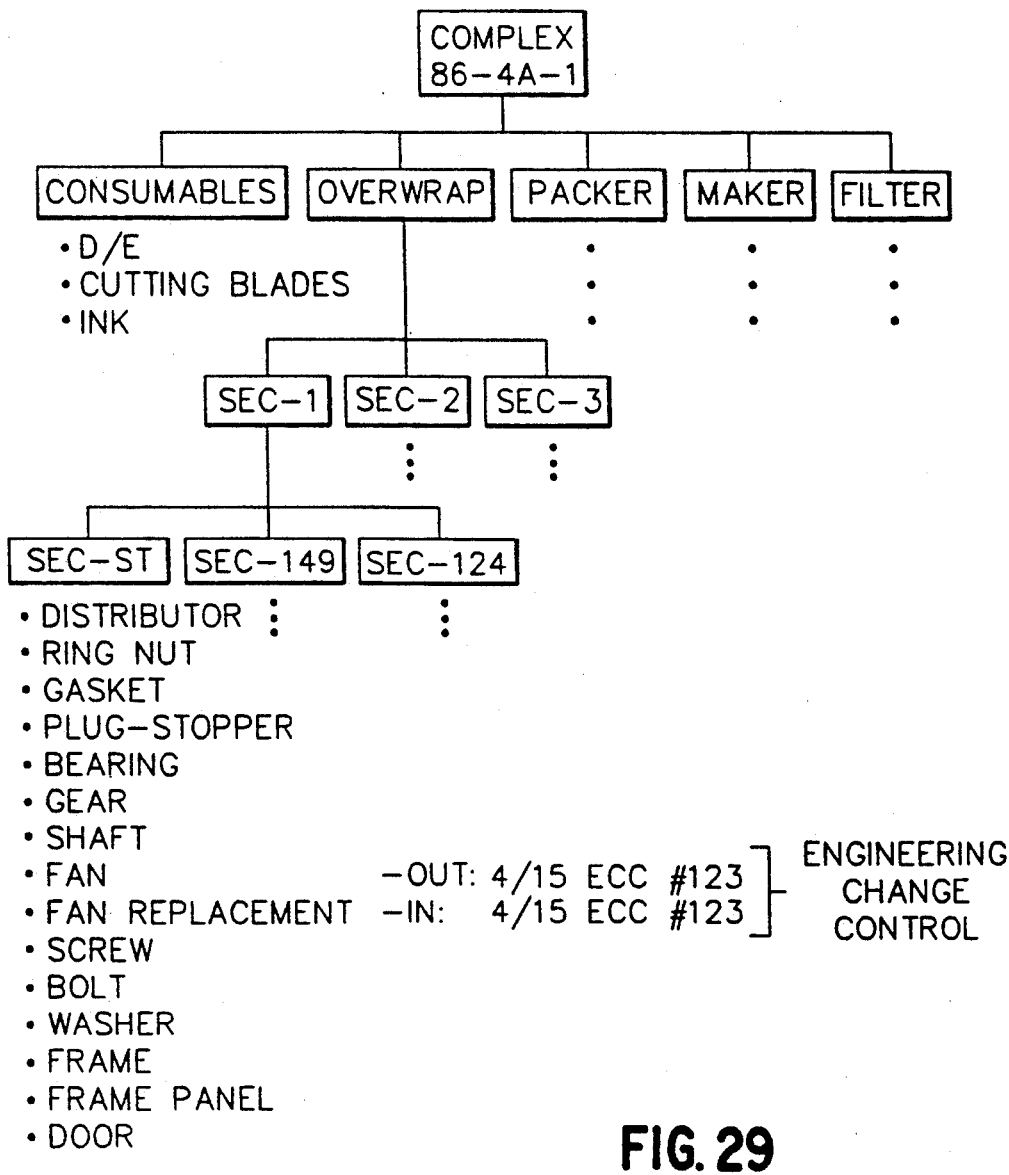
FIG. 29 illustrates another example of the automated parts manual of the present invention.

(1) Spare Parts Identified in the Parts Manual File: As already described, each vendor provides a parts manual describing how its equipment is assembled. Engineering drawings and parts list of all components are included in the parts manual. These parts manuals are referred to when maintenance is performed or engineering changes are planned. The parts manual file is a bill-of-material representation of all vendor parts manuals. The parts manual file organizes all of the vendor part manuals representing a complex. This provides a multi-level bill-of-material for each complex. FIG. 29 is an illustration. Each item in the parts manual file has an inventory classification assigned to it, i.e. generic, non-stocked, consumable or replaceable.

Each spare part classified as "consumable" or "replaceable" has a mean-time failure rate. The mean-time failure rate is the number of run hours at which this part is likely to fail or need replacement. Each part accumulates their actual run hours—stored in the cumulative run hours field. The planned run hours for each week are also accumulated for these parts. The planned run hours are added to the actual run hours. The results are compared to the mean-time failure rate. A requirement for the part is created each time the planned run hours exceeds the mean-time failure rate.

When these parts are replaced the actual run hours are set to zero and the accumulating of actual run hours begins again. The information on each replaced part is moved to the parts history file. The complex, equipment number, MR number and other pertinent data is saved. The accumulated run hours are also saved. Statistical analysis is applied to review the mean-time failure rate for this part running on this complex number. The vendor rated mean-time failure rate is reviewed and modified if justified.

Replacement parts which are still under warranty by the vendor are listed for warranty replacement. The vendor's warranty date and/or warranty hours are maintained for the warranty comparison.

(2) Spare Parts Identified in the Planning Bill: As already described, "Planning Bills" can be set up for regularly scheduled maintenance events such as preventative maintenance, machine configuration changes and consumable parts. This type of planning bill defines each spare part required to perform a maintenance event. This provides greater flexibility to engineering services. A parts list can be maintained for spare parts planning using the planning bill rather than coding the detail in the parts manual file.

Engineering services can create a planning bill to plan for engineering changes without modifying the parts manual file. The planning bill is used to evaluate machine modifications and to plan for the new machine parts. For example, an upgrade requires 50 new parts to replace 40 on various locations of the machine. A planning bill is created listing the 50 new parts and the 40 parts to be replaced. The planning bill is used to schedule the time-phased parts delivery. The future obsolete parts (those parts to be replaced) are phased out according to the planning bill. The actual implementation of the project is performed through the parts manual file under engineering change control as already described. The planning bill is removed upon completion of the project.

(3) Spare Parts Allocated to a Specific Maintenance Request: A planned maintenance request to perform a specific maintenance event can specify the parts required. These parts are allocated for this specific maintenance request. These parts are not available for routine maintenance usage.

Figure 30:
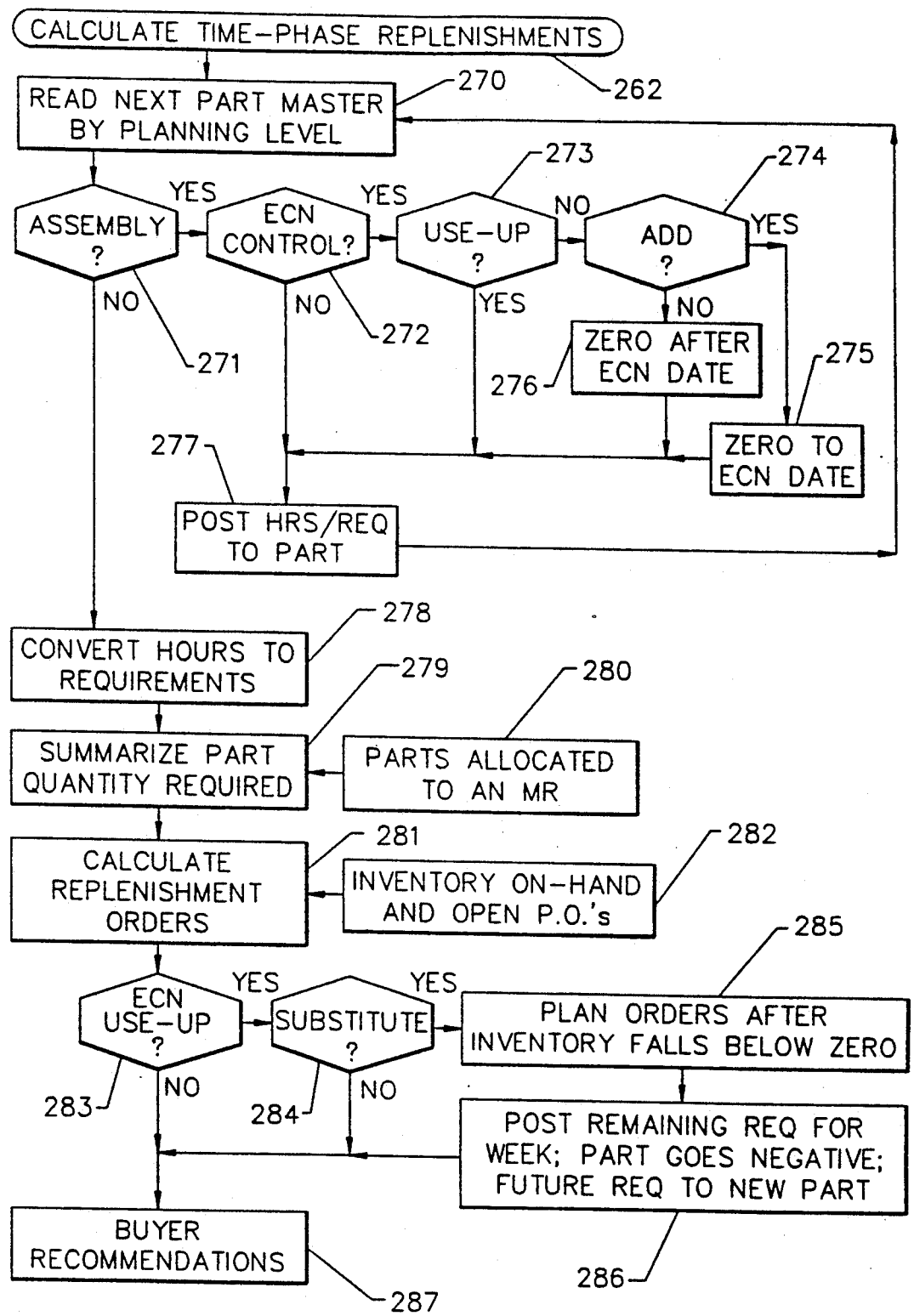
FIG. 30 illustrates the detailed operations to calculate the time phase replenishments of FIG. 28.

Referring now to FIG. 30, the detailed operations to calculate time-phase replenishments (Block 262 of FIG. 28) will now be described. At Block 270, the Part Master is read by Planning Levels. This ensures that all requirements are calculated for each item prior to scheduling replenishment orders. For example, a part with a planning level code of 5 is planned after levels 0–4, so that all requirements for this part which were defined in levels 0–4 have been accumulated by the time level 5 is ready for scheduling.

A part which is an "assembly", i.e. a part which has lower level items associated with it, must have its accumulated run hours posted to each of its parts list items. Accordingly, at Block 271, a test is made as to whether a part is an assembly.

A check is to made to determine if a part is under ECN control at Block 272. If the part is controlled under ECN use-up (Block 273 no action is taken at this time. Use-up is implemented during the calculate replenishment phase below. A part added to the parts manual file or planning bill (Block 274) has the run hours/requirements set to zero from the first period up to the period which the ECN becomes effective (Block 275). A part deleted from the automated parts manual or planning bill has the run hours/requirements set to zero from the period the ECN becomes effective to the end of the planning horizon (Block 276).

Example: Spare Parts Ordering

FIG. 31 illustrates the above described operations for applying ECN changes. The assembly 01B1—Maker Section 1 (see FIG. 19) has two parts under ECN control. Part 01B13 Part-C is under ECN control 123. Effective 2/15/XX this part will be deleted from this assembly. Part 01B12 Part-B is also under ECN control 123. This part will be added to this assembly effective on 2/15/XX. For parts under an ECN controlled by a maintenance request, the MR's start date is used to determine the period which an ECN is planned to become effective.

An assembly under ECN control must have its run hours/requirements implemented under ECN control. All parts included in this assembly are subjected to the same ECN control, therefore only the run hours/requirements in effect for the ECN will be posted to the individual part.

Returning again to FIG. 30, the run hours/requirements are now posted to the individual items which make up the assembly, at Block 277.

Non-assembly parts (Block 271) have their run hours converted to requirements (Block 278). FIG. 32 is an example. Part-C had actual run hours for last week of 100 hours. The planned run hours for this part is shown for weeks 1 through 21. The mean-time failure rate for this part is 1375 hours. The required quantity is calculated as follows:

(1) The actual run hours are added to the previous cumulative run hours giving the new cumulative run hours.

(2) The plan run hours for each week are added to the cumulative run hours giving the projected cumulative run hours for each week.

(3) Each week that the projected cumulative run hours exceed the mean-time failure rate, a replacement part is required. The projected cumulative run hours is reset by subtracting the mean-time failure rate for the projected cumulative run hours.

In the example of FIG. 32, the cumulative run hours prior to this planning cycle was 900. The actual run hours for the previous week was 100 hours. The new cumulative run hours is 1000. The projected cumulative run hours for each week is incremented by the planned run hours. The projected cumulative run hours for week 1 is 1100. This consist of the previous projected cumulative run hours of 1000 plus the planned run hours for week 1 of 100. This calculation continues for the entire planning horizon.

Continuing with the example of FIG. 32, after each projected cumulative run hours is calculated, it is compared to the mean-time failure rate. A "requirement" is created each time that the mean-time failure rate is exceeded. This occurs twice in FIG. 32. Week 5 has a projected cumulative run hours of 1400. The mean-time failure rate is 1375. Since the projected cumulative run hours exceeds the mean-time failure rate by 25 hours (1400−1375) a requirement is created. The projected cumulative run hours is reduced by the mean-time failure rate and the calculations for projected cumulative run hours begins again. Week 6 has a projected cumulative run hours of 125 consisting of 25 projected cumulative run hours from week 5 (1400−1375) plus the 100 planned run hours for week 6. The second occurrence for creating a requirement is in week 21.

Returning now to FIG. 30, the requirements allocated to a specific maintenance request (Block 280) are added at Block 279 to the requirements from the previous step (Block 278). All requirements for this part have been 'pushed' down to this planning level.

Then, at Block 282, the current inventory on-hand and all open purchase orders for this part are obtained for spares as described above in the Parts Manual File description. At this point all requirements are known and existing inventory, actual (30) and on order (20), is known.

Several other things about this part are known. The order quantity is 20; i.e. every time an order is placed 20 will be ordered. The vendor requires two weeks notice to deliver this part, so the lead time is 2 weeks. Finally there is no safety stock for this part, i.e. "Just-in-Time" techniques are to be applied. The order quantity, lead time and safety stock are variables and can be set to any value.

At Block 281, the replenishment is now calculated. FIG. 33 shows the calculations. The projected on-hand is calculated by the formula:

$$on\text{-}hand(N-1) - required(N) + on\ order(N) + plan\ orders(N).$$

A plan order is created for each week that the projected on-hand falls below the safety stock quantity. A replenishment order is created by off-setting the week the plan order quantity is needed by the lead time.

The projected on-hand for
week 1 is 20, i.e. (30−10+0+0);
week 2 is 30, i.e. (20−10+20+0);
week 3 is 15, i.e. (30−15+0+0);
week 4 is 7, i.e. (15−8+0+0);
week 5 is −3, i.e. (7−10+0+0).

The projected on-hand goes negative in week 5; i.e. it falls below safety stock of 0. Therefore, an order must be placed to arrive in week 5. A plan order for 20 (order quantity is 20) is created for week 5. The lead time for this part is 2 weeks. The replenishment order for 20 parts must be placed in week 3 for the parts to arrive in week 5. The projected on-hand calculations begin again.

The projected on-hand for
week 5 is 17, i.e. (7−10+0+20);
week 6 is 7, i.e. (17−10+0+0);
week 7 is 19, i.e. (7−8+0+20).

The projected on-hand for week 7 would go negative (−1) if the plan order for 20 was not created. The remaining calculations for the projected on-hand are performed the same way.

Referring again to FIG. 30, at Block 283, the part is checked for ECN use-up control. If the part is to be phased out (replaced) when it is used-up, the remaining requirements for this part must be posted to the substitute part (Block 284). FIG. 34 shows this example. Part 01B16 Part-F is under control of ECN 456—use-up to be replaced by 01B15 Part-E. The first time the projected on-hand goes negative (−3) for this part (Part-F) is week 5 (Block 285). The remaining requirements for week 5 (−3) and all future requirements for this part are posted to the replacement part (01B15 Part-E) at Block 286. The replacement part is at least one planning level lower than the current planning level. This insures that the remaining requirements for this part are included in the requirements for the replacement part. This technique is used for planning purposes only. The ECN will go into effect when the last part is actually issued from spares.

The last function performed in the spare part planning cycle is the Buyer Recommendation (Block 287). Although the system calculates when to place an order or to advise the rescheduling of an existing purchase order, the Buyer is responsible for the actual company commitment. The system will not automatically issue or reschedule a purchase order. However, it will be understood by those having skill in the art that the system may be configured to automatically issue or reschedule a purchase order.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A computer integrated maintenance system for use with a computer integrated manufacturing system, the computer integrated manufacturing system including a computer controller for controlling a plurality of production complexes each of which includes a plurality of production machines, the manufacturing system computer controller including an electronically stored master schedule file having therein a schedule of actual production and planned production for the plurality of complexes, the manufacturing system computer controller controlling the plurality of production machines based upon the planned production in the master schedule file; said computer integrated maintenance system comprising:

an electronically stored parts manual, containing a hierarchical listing of parts in the plurality of production machines in the plurality of production complexes; and, maintenance operations computer controlling means, communicatively connected to said electronically stored parts manual and adapted to be communicatively connected to the master schedule file, comprising:

first means for obtaining a schedule of actual production and planned production for the plurality of complexes from the master schedule file;

second means for identifying parts in the hierarchical listing to be maintained during a predetermined time period, and a corresponding maintenance time during the predetermined time period for each identified part, based upon the obtained schedule;

third means for reassigning the corresponding maintenance times for the identified parts, based upon the hierarchical listing of parts in the electronically stored parts manual, to reduce lost production time for each of the plurality of complexes;

fourth means for generating a revised schedule of planned production based upon the reassigned maintenance times for the identified parts; and fifth means for communicating the revised schedule of planned production to the master schedule file;

whereby the plurality of complexes are controlled based upon the revised schedule of planned production to allow for maintenance activities while maximizing production.

2. The computer integrated maintenance system of claim 1 wherein said third means comprises;

means for determining when a complex is inactive, based upon the obtained schedule; and, means for reassigning the corresponding maintenance times for at least some of the identified parts to the time when the complex including the a least some of the identified parts is inactive.

3. The computer integrated maintenance system of claim 1 wherein said third means comprises means for grouping at least some of the corresponding maintenance times for identified parts in a complex, to reduce lost production time for that complex.

4. The computer integrated maintenance system of claim 3 wherein said third means further comprises means for identifying a critical part to be maintained in a complex and a corresponding critical maintenance time, and means for reassigning at least some of the corresponding maintenance times for other parts in the complex to the critical maintenance time.

5. The computer integrated maintenance system of claim 1 wherein said third means further comprises means for determining manpower needed to perform maintenance according to the reassigned maintenance times, and means for further reassigning the reassigned maintenance times to permit maintenance to be performed with available manpower.

6. The computer integrated maintenance system of claim 1 wherein said electronically stored parts manual further includes an end of life indicator for selected ones of the production machines, the end of life indicator indicating that the associated production machine is scheduled to be replaced or modified; and wherein said third means comprises means for eliminating the corresponding maintenance for parts in machines having an associated end of life indicator, to thereby reduce lost production time.

7. The computer integrated maintenance system of claim 1 wherein said electronically stored parts manual further contains means for identifying the type of maintenance for a part to be one of time dependent maintenance or usage dependent maintenance; and wherein said second means comprises means for identifying parts to be maintained and a corresponding maintenance time for identified parts having usage dependent maintenance, based upon the obtained schedule.

8. The computer integrated maintenance system of claim 1 wherein said second means further comprises means for accepting a user selection of said predetermined time period.

9. The computer integrated maintenance system of claim 1 wherein said electronically stored parts manual further contains an image file, including a corresponding image for parts in the hierarchical listing.

10. The computer integrated maintenance system of claim 1 wherein said hierarchical listing comprises a complete bill of materials for each complex.

11. The computer integrated maintenance system of claim 1 wherein said electronically stored parts manual identifies each of the parts as being one of a consumable, replaceable, generic or non-stocked part.

12. The computer integrated maintenance system of claim 1 wherein said electronically stored parts manual further includes an associated part number for each of the parts.

13. The computer integrated maintenance system of claim 12 wherein said electronically stored parts manual further includes a replacement part number for selected ones of the parts.

14. The computer integrated maintenance system of claim 12 wherein said electronically stored parts manual further includes an industry standard part number for selected ones of the parts.

15. The computer integrated maintenance system of claim 1 wherein said electronically stored parts manual comprises a plurality of electronically stored parts manuals, a respective one of which contains a hierarchical listing of parts in the plurality of production machines in a respective one of said plurality of complexes.

16. The computer integrated maintenance system of claim 1 wherein said maintenance operations computer controller further comprises:
sixth means for generating a list of the identified parts, to facilitate ordering of the identified parts.

17. The computer integrated maintenance system of claim 16 wherein said sixth means further comprises means for generating a list of corresponding maintenance times for the identified parts, to facilitate ordering of the identified parts to be available for the corresponding maintenance times.

18. The computer integrated maintenance system of claim 16 wherein said sixth means further comprises means for generating orders for the identified parts.

19. The computer integrated maintenance system of claim 17 wherein said sixth means further comprises means for generating orders for the identified parts.

20. The computer integrated maintenance system of claim 1:
wherein the manufacturing system computer controller further includes an engineering change file having therein a schedule of engineering changes to be made on the production machines;
wherein said maintenance operations computer controller is further adapted to be communicatively connected to the engineering change file;
wherein said first means further obtains a schedule of engineering changes from the engineering change file; and,
wherein said second means further comprises means for identifying the parts to be maintained and the corresponding maintenance time based upon the obtained schedule of actual production and planned production and based upon the obtained schedule of engineering changes.

21. The computer integrated maintenance system of claim 1 wherein said third means further comprises:
means for accepting an indication that unplanned maintenance is performed on a broken part at a predetermined time; and
means for reassigning at least some of the corresponding maintenance times for identified parts in the same complex as the first part, to correspond to said predetermined time;
whereby at least some planned maintenance is rescheduled to occur during unplanned maintenance.

22. A computer integrated manufacturing and maintenance system for controlling manufacturing and maintenance of a plurality of production complexes each of which includes a plurality of production machines, said computer integrated manufacturing and maintenance system comprising:
an electronically stored master schedule file having therein a schedule of actual production and planned production for the plurality of complexes;
means for controlling the plurality of production machines based upon the schedule of planned production in the master schedule file;
an electronically stored parts manual, containing a hierarchical listing of parts in the plurality of production machines in the plurality of production complexes;
first means, communicatively connected to said master schedule file, for obtaining a schedule of actual production and planned production for the plurality of complexes from the master schedule file;

second means, communicatively connected to said first means and said electronically stored parts manual, for identifying parts in the hierarchical listing to be maintained during a predetermined time period, and a corresponding maintenance time during the predetermined time period for each identified part, based upon the obtained schedule;

third means, communicatively connected to said second means, for reassigning the corresponding maintenance times for the identified parts, based upon the hierarchical listing of parts in the electronically stored parts manual, to reduce lost production time for each of the plurality of complexes;

fourth means, communicatively connected to said third means, for generating a revised schedule of planned production based upon the reassigned maintenance times for the identified parts; and fifth means, communicatively connected to said fourth means and said master schedule file, for communicating the revised schedule of planned production to the master schedule file;

whereby the plurality of complexes are controlled based upon the revised schedule of planned production to allow for maintenance activities while maximizing production.

23. The computer integrated manufacturing and maintenance system of claim 22 wherein said third means comprises;
means for determining when a complex is inactive, based upon the obtained schedule; and,
means for reassigning the corresponding maintenance times for at least some of the identified parts to the time when the complex including the at least some of the identified parts is inactive.

24. The computer integrated manufacturing and maintenance system of claim 22 wherein said third means comprises means for grouping at least some of the corresponding maintenance times for identified parts in a complex, to reduce lost production time for that complex.

25. The computer integrated manufacturing and maintenance system of claim 24 wherein said third means further comprises means for identifying a critical part to be maintained in a complex and a corresponding critical maintenance time, and means for reassigning at least some of the corresponding maintenance times for other parts in the complex to the critical maintenance time.

26. The computer integrated manufacturing and maintenance system of claim 22 wherein said third means further comprises means for determining manpower needed to perform maintenance according to the reassigned maintenance times, and means for further reassigning the reassigned maintenance times to permit maintenance to be performed with available manpower.

27. The computer integrated manufacturing and maintenance system of claim 22 wherein said electronically stored parts manual further includes an end of life indicator for selected ones of the production machines, the end of life indicator indicating that the associated production machine is scheduled to be replaced or modified; and wherein said third means comprises means for eliminating the corresponding maintenance for parts in machines having an associated end of life indicator, to thereby reduce lost production time.

28. The computer integrated manufacturing and maintenance system of claim 22 wherein said electronically stored parts manual further contains means for identifying the type of maintenance for a part to be one of time dependent maintenance or usage dependent maintenance; and wherein said second means comprises means for identifying parts to be maintained and a corresponding maintenance time for identified parts having usage dependent maintenance, based upon the obtained schedule.

29. The computer integrated manufacturing and maintenance system of claim 22 wherein said second means further comprises means for accepting a user selection of said predetermined time period.

30. The computer integrated manufacturing and maintenance system of claim 22 wherein said electronically stored parts manual further contains an image file, including a corresponding image for parts in the hierarchical listing.

31. The computer integrated manufacturing and maintenance system of claim 22 wherein said hierarchical listing comprises a complete bill of materials for each complex.

32. The computer integrated manufacturing and maintenance system of claim 22 wherein said electronically stored parts manual identifies each of the parts as being one of a consumable, replaceable, generic or non-stocked part.

33. The computer integrated manufacturing and maintenance system of claim 22 wherein said electronically stored parts manual further includes an associated part number for each of the parts.

34. The computer integrated manufacturing and maintenance system of claim 33 wherein said electronically stored parts manual further includes a replacement part number for selected ones of the parts.

35. The computer integrated manufacturing and maintenance system of claim 33 wherein said electronically stored parts manual further includes an industry standard part number for selected ones of the parts.

36. The computer integrated manufacturing and maintenance system of claim 22 wherein said electronically stored parts manual comprises a plurality of electronically stored parts manuals, a respective one of which contains a hierarchical listing of parts in the plurality of production machines in a respective one of said plurality of complexes.

37. The computer integrated manufacturing and maintenance system of claim 22 further comprising:
sixth means, communicatively connected to said third means, for generating a list of the identified parts, to facilitate ordering of the identified parts.

38. The computer integrated manufacturing and maintenance system of claim 37 wherein said sixth means further comprises means for generating a list of corresponding maintenance times for the identified parts, to facilitate ordering of the identified parts to be available for the corresponding maintenance times.

39. The computer integrated manufacturing and maintenance system of claim 37 wherein said sixth means further comprises means for generating orders for the identified parts.

40. The computer integrated manufacturing and maintenance system of claim 38 wherein said sixth means further comprises means for generating orders for the identified parts.

41. The computer integrated manufacturing and maintenance system of claim 22 further comprising:
an engineering change file having therein a schedule of engineering changes to be made on the production machines;

said first means being communicatively connected to said engineering change control file to obtain a schedule of engineering changes from the engineering change file; and, said second means further comprising means for identifying the parts to be maintained and the corresponding maintenance time based upon the obtained schedule of actual production and planned production and based upon the obtained schedule of engineering changes.

42. The computer integrated manufacturing and maintenance system of claim 1 wherein said third means further comprises:

means for accepting an indication that unplanned maintenance is performed on a first part at a predetermined time; and means for reassigning at least some of the corresponding maintenance times for identified parts in the same complex as the first part, to correspond to said predetermined time;

whereby at least some planned maintenance is rescheduled to occur during unplanned maintenance.

43. A computer integrated maintenance method for use with a computer integrated manufacturing system, the computer integrated manufacturing system including a computer controller for controlling a plurality of production complexes each of which includes a plurality of production machines, the manufacturing system computer controller including an electronically stored master schedule file having therein a schedule of actual production and planned production for the plurality of complexes, the manufacturing system computer controller controlling the plurality of production machines based upon the planned production in the master schedule file; said computer integrated maintenance method being practiced on a maintenance operations computer controller and comprising the steps of:

generating an electronically stored parts manual, containing a hierarchical listing of parts in the plurality of production machines in the plurality of production complexes;

obtaining a schedule of actual production and planned production for the plurality of complexes from the master schedule file;

identifying parts in the hierarchical listing to be maintained during a predetermined time period, and a corresponding maintenance time during the predetermined time period for each identified part, based upon the obtained schedule;

reassigning the corresponding maintenance times for the identified parts, based upon the hierarchical listing of parts in the electronically stored parts manual, to reduce lost production time for each of the plurality of complexes;

generating a revised schedule of planned production based upon the reassigned maintenance times for the identified parts; and communicating the revised schedule of planned production to the master schedule file;

whereby the plurality of complexes are controlled based upon the revised schedule of planned production to allow for maintenance activities while maximizing production.

44. The computer integrated maintenance method of claim 43 wherein said reassigning step comprises the steps of:

determining when a complex is inactive, based upon the obtained schedule; and, reassigning the corresponding maintenance times for at least some of the identified parts to the time when the complex including the at least some of the identified parts is inactive.

45. The computer integrated maintenance method of claim 43 wherein said reassigning step comprises the step of grouping at least some of the corresponding maintenance times for identified parts in a complex, to reduce lost production time for that complex.

46. The computer integrated maintenance method of claim 45 wherein said reassigning step further comprises the steps of:

identifying a critical part to be maintained in a complex and a corresponding critical maintenance time; and reassigning at least some of the corresponding maintenance times for other parts in the complex to the critical maintenance time.

47. The computer integrated maintenance method of claim 43 wherein said reassigning step further comprises the steps of:

determining manpower needed to perform maintenance according to the reassigned maintenance times; and further reassigning the reassigned maintenance times to permit maintenance to be performed with available manpower.

48. The computer integrated maintenance method of claim 43 wherein said electronically stored parts manual further includes an end of life indicator for selected ones of the production machines, the end of life indicator indicating that the associated production machine is scheduled to be replaced or modified; and wherein said reassigning step comprises the step of eliminating the corresponding maintenance for parts in machines having an associated end of life indicator, to thereby reduce lost production time.

49. The computer integrated maintenance method of claim 43 wherein said electronically stored parts manual further contains means for identifying the type of maintenance for a part to be one of time dependent maintenance or usage dependent maintenance; and wherein said identifying step comprises the step of identifying parts to be maintained and a corresponding maintenance time for identified parts having usage dependent maintenance, based upon the obtained schedule.

50. The computer integrated maintenance method of claim 43 wherein said identifying step further comprises the step of accepting a user selection of said predetermined time period.

51. The computer integrated maintenance method of claim 43 wherein said generating step further comprises the step of generating an electronically stored parts manual containing an image file, including a corresponding image for parts in the hierarchical listing.

52. The computer integrated maintenance method of claim 43 wherein said hierarchical listing comprises a complete bill of materials for each complex.

53. The computer integrated maintenance method of claim 43 wherein said generating step further comprises the step of generating an electronically stored parts manual which identifies each of the parts as being one of a consumable, replaceable, generic or non-stocked part.

54. The computer integrated maintenance method of claim 43 wherein said generating step further comprises the step of generating an electronically stored parts manual including an associated part number for each of the parts.

55. The computer integrated maintenance method of claim 54 wherein said generating step further comprises the step of generating an electronically stored parts manual including a replacement part number for selected ones of the parts.

56. The computer integrated maintenance method of claim 54 wherein said generating step further comprises the step of generating an electronically stored parts manual including an industry standard part number for selected ones of the parts.

57. The computer integrated maintenance method of claim 43 wherein said generating step further comprises the step of generating a plurality of electronically stored parts manuals, a respective one of which contains a hierarchical listing of parts in the plurality of production machines in a respective one of said plurality of complexes.

58. The computer integrated maintenance method of claim 43 further comprising the step of:
  generating a list of the identified parts, to facilitate ordering of the identified parts.

59. The computer integrated maintenance method of claim 58 wherein said list generating step further comprises the step of generating a list of corresponding maintenance times for the identified parts, to facilitate ordering of the identified parts to be available for the corresponding maintenance times.

60. The computer integrated maintenance method of claim 58 wherein said list generating step further comprises the step of generating orders for the identified parts.

61. The computer integrated maintenance method of claim 59 wherein said list generating step further comprises the step of generating orders for the identified parts.

62. The computer integrated maintenance method of claim 43:
  wherein the manufacturing system computer controller further includes an engineering change file having therein a schedule of engineering changes to be made on the production machines;
  wherein said schedule obtaining step further comprises the step of obtaining a schedule of engineering changes from the engineering change file; and,
  wherein said identifying step further comprises the step of identifying the parts to be maintained and the corresponding maintenance time based upon the obtained schedule of actual production and planned production and based upon the obtained schedule of engineering changes.

63. The computer integrated maintenance method of claim 43 wherein said reassigning step further comprises the steps of:
  accepting an indication that unplanned maintenance is performed on a first part at a predetermined time; and
  reassigning at least some of the corresponding maintenance times for identified parts in the same complex as the first part, to correspond to said predetermined time;
whereby at least some planned maintenance is rescheduled to occur during unplanned maintenance.

64. A compute integrated manufacturing and maintenance method for controlling manufacturing and maintenance of a plurality of production complexes each of which includes a plurality of production machines, the computer integrated manufacturing and maintenance method comprising the steps of:

generating an electronically stored master schedule file having therein a schedule of actual production and planned production for the plurality of complexes;
  controlling the plurality of production machines based upon the planned production in the master schedule file;
  generating an electronically stored parts manual, containing a hierarchical listing of parts in the plurality of production machines in the plurality of production complexes;
  obtaining a schedule of actual production and planned production for the plurality of complexes from the master schedule file;
  identifying parts in the hierarchical listing to be maintained during a predetermined time period, and a corresponding maintenance time during the predetermined time period for each identified part, based upon the obtained schedule;
  reassigning the corresponding maintenance times for the identified parts, based upon the hierarchical listing of parts in the electronically stored parts manual, to reduce lost production time for each of the plurality of complexes;
  generating a revised schedule of planned production based upon the reassigned maintenance times for the identified parts; and
  communicating the revised schedule of planned production to the master schedule file;
whereby the plurality of complexes are controlled based upon the revised schedule of planned production to allow for maintenance activities while maximizing production.

65. The computer integrated manufacturing and maintenance method of claim 64 wherein said reassigning step comprises the steps of;
  determining when a complex is inactive, based upon the obtained schedule; and,
  reassigning the corresponding maintenance times for at least some of the identified parts to the time when the complex including the at least some of the identified parts is inactive.

66. The computer integrated manufacturing and maintenance method of claim 64 wherein said reassigning step comprises the step of grouping at least some of the corresponding maintenance times for identified parts in a complex, to reduce lost production time for that complex.

67. The computer integrated manufacturing and maintenance method of claim 66 wherein said reassigning step further comprises the steps of identifying a critical part to be maintained in a complex and a corresponding critical maintenance time, and reassigning at least some of the corresponding maintenance times for other parts in the complex to the critical maintenance time.

68. The computer integrated manufacturing and maintenance method of claim 64 wherein said reassigning step further comprises the steps of determining manpower needed to perform maintenance according to the reassigned maintenance times, and further reassigning the reassigned maintenance times to permit maintenance to be performed with available manpower.

69. The computer integrated manufacturing and maintenance method of claim 64 wherein said electronically stored parts manual further includes an end of life indicator for selected ones of the production machines, the end of life indicator indicating that the associated production machine is scheduled to be replaced or modified; and wherein said reassigning step comprises the step of eliminating the corresponding maintenance for parts in machines having an associated end of life indicator, to thereby reduce lost production time.

70. The computer integrated manufacturing and maintenance method of claim 64 wherein said electronically stored parts manual further contains means for identifying the type of maintenance for a part to be one of time dependent maintenance or usage dependent maintenance; and wherein said identifying step comprises the step of identifying parts to be maintained and a corresponding maintenance time for identified parts having usage dependent maintenance, based upon the obtained schedule.

71. The computer integrated manufacturing and maintenance method of claim 64 wherein said identifying step further comprises the step of accepting a user selection of said predetermined time period.

72. The computer integrated manufacturing and maintenance method of claim 64 wherein said generating step further comprises the step of generating an electronically stored parts manual further containing an image file, including a corresponding image for parts in the hierarchical listing.

73. The computer integrated manufacturing and maintenance method of claim 64 wherein said hierarchical listing comprises a complete bill of materials for each complex.

74. The computer integrated manufacturing and maintenance system of claim 64 wherein said generating step further comprises the step of generating an electronically stored parts manual identifies each of the parts as being one of a consumable, replaceable, generic or non-stocked part.

75. The computer integrated manufacturing and maintenance method of claim 64 wherein said generating step further comprises the step of generating an electronically stored parts manual which includes an associated part number for each of the parts.

76. The computer integrated manufacturing and maintenance method of claim 75 wherein said generating step further comprises the step of electronically stored parts manual which includes a replacement part number for selected ones of the parts.

77. The computer integrated manufacturing and maintenance method of claim 75 wherein said generating step further comprises the step of electronically stored parts manual which includes an industry standard part number for selected ones of the parts.

78. The computer integrated manufacturing and maintenance method of claim 64 wherein said generating step further comprises the step of generating a plurality of electronically stored parts manuals, a respective one of which contains a hierarchical listing of parts in the plurality of production machines in a respective one of said plurality of complexes.

79. The computer integrated manufacturing and maintenance method of claim 64 further comprising the step of:
generating a list of the identified parts, to facilitate ordering of the identified parts.

80. The computer integrated manufacturing and maintenance method of claim 79 wherein said list generating step further comprises the step of generating a list of corresponding maintenance times for the identified parts, to facilitate ordering of the identified parts to be available for the corresponding maintenance times.

81. The computer integrated manufacturing and maintenance method of 79 wherein said list generating step further comprises the step of generating orders for the identified parts.

82. The computer integrated manufacturing and maintenance method of claim 80 wherein said list generating step further comprises the step of generating orders for the identified parts.

83. The computer integrated manufacturing and maintenance method of claim 64 further comprising the step of:
generating an engineering change file having therein a schedule of engineering changes to be made on the production machines; and
obtaining a schedule of engineering changes from the engineering change file; and,
wherein said identifying step further comprises the step of identifying the parts to be maintained and the corresponding maintenance time based upon the obtained schedule of actual production and planned production and based upon the obtained schedule of engineering changes.

84. The computer integrated manufacturing and maintenance method of claim 64 wherein said reassigning step further comprises the steps of
accepting an indication that unplanned maintenance is performed on a first part at a predetermined time; and
reassigning at least some of the corresponding maintenance times for identified parts in the same complex as the first part, to correspond to said predetermined time;
whereby at least some planned maintenance is rescheduled to occur during unplanned maintenance.

85. A computer integrated maintenance system for use with a computer integrated manufacturing system, the computer integrated manufacturing system including a computer controller for controlling a plurality of production complexes each of which includes a plurality of production machines, the manufacturing system computer controller including an electronically stored master schedule file having therein a schedule of actual production and planned production for the plurality of complexes, the manufacturing system computer controller controlling the plurality of production machines based upon the planned production in the master schedule file, said computer integrated maintenance system comprising:
an electronically stored parts manual, containing a hierarchical listing of parts in the plurality of production machines in the plurality of production complexes;
maintenance operations computer controlling means, adapted to be communicatively connected to the manufacturing system computer controller, and communicatively connected to the electronically stored parts manual, said maintenance operations computer controlling means comprising:
maintenance schedule management means, for identifying parts in the hierarchical listing to be maintained during a predetermined time period based upon the planned production in the master schedule file, and for scheduling maintenance activities for the identified parts to reduce disruption of production;
engineering change control management means, for integrating engineering change control activities into the scheduled maintenance activities;

parts manual management means, for updating the hierarchical listing in response to maintenance activities and engineering change control activities; and, spares inventory management means, for generating requirements to order replacement parts for the identified parts to be available for use in the scheduled maintenance activities.

86. The computer integrated maintenance system of claim 85 wherein said maintenance schedule management means further comprises:

means for accepting an indication that unplanned maintenance will be performed during said predetermined time period; and, means for scheduling maintenance activities for the identified parts based upon the planned production in the master schedule file and the indication of unplanned maintenance, to reduce disruption of production.

87. The computer integrated maintenance system of claim 85 wherein said maintenance schedule management means identifies parts to be maintained during the predetermined time period based upon one of projected use or the elapsed time since last replacement.

88. The computer integrated maintenance system of claim 85 wherein said maintenance schedule management means minimizes disruption of production by scheduling non-critical maintenance in a predetermined complex to occur concurrently with critical maintenance in the predetermined complex.

89. The computer integrated maintenance system of claim 85 wherein said maintenance schedule management means further comprises means for scheduling maintenance activities for the identified parts to allow scheduled maintenance activities to be performed using predetermined manpower levels.

90. The computer integrated maintenance system of claim 85 wherein said hierarchical listing of parts in said electronically stored parts manual comprises a plurality of parts levels from a lowest level to a highest level, and wherein each part in the lowest level is identified as being one of a consumable part which is consumed by the production process, a replaceable part which has an extended life but is subject to wear or failure, a generic part which is a common part used in large numbers on many of the production machines, and a non-stocked part which does not normally require replacement.

91. The computer integrated maintenance system of claim 85 wherein said electronically stored parts manual further includes an associated part number for each of the parts.

92. The computer integrated maintenance system of claim 91 wherein said electronically stored parts manual further includes a replacement part number for selected ones of the parts.

93. The computer integrated maintenance system of claim 91 wherein said electronically stored parts manual further includes an industry standard part number for selected ones of the parts.

94. The computer integrated maintenance system of claim 85 wherein said electronically stored parts manual comprises a plurality of electronically stored parts manuals, a respective one of which contains a hierarchical listing of parts in the plurality of production machines in a respective one of said plurality of complexes.

95. The computer integrated maintenance system of claim 85 wherein said engineering change control management means comprises means for integrating engineering change control activities into the scheduled maintenance activities based upon one of a specified engineering control implementation date, consumption of spare parts, or a specified maintenance activity.

96. The computer integrated maintenance system of claim 85 wherein said maintenance schedule management means further comprises means for generating a daily maintenance schedule to identify maintenance activities to be performed each day to reduce disruption of production.

97. The computer integrated maintenance system of claim 85 further comprising:

an electronically stored spares inventory file for identifying generic parts used in said plurality of production machines and replaceable parts used in said plurality of production machines; and said spares inventory management means further comprising means for generating requirements to order a generic part when an inventory quantity falls below a predetermined quantity and for identifying requirements to order a replacement part to be available for use in the scheduled maintenance activities.

98. A computer integrated manufacturing and maintenance system for controlling manufacturing and maintenance of a plurality of production complexes each of which includes a plurality of production machines, said computer integrated manufacturing and maintenance system comprising:

an electronically stored master schedule file having therein a schedule of actual production and planned production for the plurality of complexes;

means for controlling the plurality of production machines based upon the planned production in the master schedule file;

an electronically stored parts manual, containing a hierarchical listing of parts in the plurality of production machines in the plurality of production complexes;

maintenance schedule management means, for identifying parts in the hierarchical listing to be maintained during a predetermined time period based upon the planned production in the master schedule file, and for scheduling maintenance activities for the identified parts to reduce disruption of production;

engineering change control management means, for integrating engineering change control activities into the scheduled maintenance activities;

parts manual management means, for updating the hierarchical listing in response to maintenance activities and engineering change control activities; and, spares inventory management means, for generating requirements to order replacement parts for the identified parts to be available for use in the scheduled maintenance activities.

99. The computer integrated manufacturing and maintenance system of claim 98 wherein said maintenance schedule management means further comprises:

means for accepting an indication that unplanned maintenance will be performed during said predetermined time period; and, means for scheduling maintenance activities for the identified parts based upon the planned production in the master schedule file and the indication of unplanned maintenance, to minimize disruption of production.

100. The computer integrated manufacturing and maintenance system of claim 98 wherein said maintenance schedule management means identifies parts to be maintained during the predetermined time period based upon projected use or the elapsed time since last replacement.

101. The computer integrated manufacturing and maintenance system of claim 98 wherein said maintenance schedule management means minimizes disruption of production by scheduling non-critical maintenance in a predetermined complex to occur concurrently with critical maintenance in the predetermined complex.

102. The computer integrated manufacturing and maintenance system of claim 98 wherein said maintenance schedule management means further comprises means for scheduling maintenance activities for the identified parts to allow scheduled maintenance activities to be performed using predetermined manpower levels.

103. The computer integrated manufacturing and maintenance system of claim 98 wherein said hierarchical listing of parts in said electronically stored parts manual comprises a plurality of parts levels from a lowest level to a highest level, and wherein each part in the lowest level is identified as being one of a consumable part which is consumed by the production process, a replaceable part which has an extended life but is subject to wear or failure, a generic part which is a common part used in large numbers on many of the production machines, and a non-stocked part which does not normally require replacement.

104. The computer integrated manufacturing and maintenance system of claim 98 wherein said electronically stored parts manual further includes an associated part number for each of the parts.

105. The computer integrated manufacturing and maintenance system of claim 104 wherein said electronically stored parts manual further includes a replacement part number for selected ones of the parts.

106. The computer integrated manufacturing and maintenance system of claim 104 wherein said electronically stored parts manual further includes an industry standard part number for selected ones of the parts.

107. The computer integrated manufacturing and maintenance system of claim 98 wherein said electronically stored parts manual comprises a plurality of electronically stored parts manuals, a respective one of which contains a hierarchical listing of parts in the plurality of production machines in a respective one of said plurality of complexes.

108. The computer integrated manufacturing and maintenance system of claim 98 wherein said engineering change control management means comprises means for integrating engineering change control activities into the scheduled maintenance activities based upon one of a specified engineering control implementation date, consumption of spare parts, or a specified maintenance activity.

109. The computer integrated manufacturing and maintenance system of claim 98 wherein said maintenance schedule management means further comprises means for generating a daily maintenance schedule to identify maintenance activities to be performed each day to reduce disruption of production.

110. The computer integrated manufacturing and maintenance system of claim 98 further comprising:

an electronically stored spares inventory file for identifying generic parts used in said plurality of production machines and replaceable parts used in said plurality of production machines; and said spares inventory management means further comprising means for generating requirements to order a generic part when an inventory quantity falls below a predetermined quantity and for identifying requirements to order a replacement part to be available for use in the scheduled maintenance activities.

111. A computer integrated maintenance system for a complex including a plurality of machines used to perform a primary function and which also require maintenance; said computer integrated maintenance system comprising:

an electronically stored parts manual, containing a hierarchical listing of parts in the plurality of machines in the complex; and, maintenance operations computer controlling means, communicatively connected to said electronically stored parts manual comprising:

first means for obtaining a schedule of actual and planned use for the plurality of machines;

second means for identifying parts in the hierarchical listing to be maintained during a predetermined time period, and a corresponding maintenance time during the predetermined time period for each identified part, based upon the obtained schedule;

third means for reassigning the corresponding maintenance times for the identified parts, based upon the hierarchical listing of parts in the electronically stored parts manual, to reduce lost use time for the complex; and fourth means for generating a revised schedule of planned use based upon the reassigned maintenance times for the identified parts;

whereby use of the complex may be controlled based upon the revised schedule of planned use to allow for maintenance activities.

112. The computer integrated maintenance system of claim 111 wherein said third means comprises;

means for determining when a machine is inactive, based upon the obtained schedule; and, means for reassigning the corresponding maintenance times for at least some of the identified parts to the time when the machine including the at least some of the identified parts is inactive.

113. The computer integrated maintenance system of claim 111 wherein said third means comprises means for grouping at least some of the corresponding maintenance times for identified parts in a machine, to reduce lost use time for that machine.

114. The computer integrated maintenance system of claim 113 wherein said third means further comprises means for identifying a critical part to be maintained in a machine and a corresponding critical maintenance time, and means for reassigning at least some of the corresponding maintenance times for other parts in the machine to the critical maintenance time.

115. The computer integrated maintenance system of claim 111 wherein said third means further comprises means for determining manpower needed to perform maintenance according to the reassigned maintenance times, and means for further reassigning the reassigned maintenance times to permit maintenance to be performed with available manpower.

116. The computer integrated maintenance system of claim 111 wherein said electronically stored parts manual further includes an end of life indicator for selected ones of the machines, the end of life indicator indicating that the associated machine is scheduled to be replaced or modified; and wherein said third means comprises means for eliminating the corresponding maintenance for parts in machines having an associated end of life indicator, to thereby reduce lost use time.

117. The computer integrated maintenance system of claim 111 wherein said electronically stored parts manual further contains means for identifying the type of maintenance for a part to be one of time dependent maintenance or usage dependent maintenance; and wherein said second means comprises means for identifying parts to be maintained and a corresponding maintenance time for identified parts having usage dependent maintenance, based upon the obtained schedule.

118. The computer integrated maintenance system of claim 111 wherein said second means further comprises means for accepting a user selection of said predetermined time period.

119. The computer integrated maintenance system of claim 111 wherein said electronically stored parts manual further contains an image file, including a corresponding image for parts in the hierarchical listing.

120. The computer integrated maintenance system of claim 111 wherein said hierarchical listing comprises a complete bill of materials for each machine.

121. The computer integrated maintenance system of claim 111 wherein said electronically stored parts manual identifies each of the parts as being one of a consumable, replaceable, generic or non-stocked part.

122. The computer integrated maintenance system of claim 111 wherein said electronically stored parts manual further includes an associated part number for each of the parts.

123. The computer integrated maintenance system of claim 122 wherein said electronically stored parts manual further includes a replacement part number for selected one of the parts.

124. The computer integrated maintenance system of claim 122 wherein said electronically stored parts manual further includes an industry standard part number for selected ones of the parts.

125. The computer integrated maintenance system of claim 111 wherein said electronically stored parts manual comprises a plurality of electronically stored parts manuals, a respective one of which contains a hierarchical listing of parts in a respective one of the machines.

126. The computer integrated maintenance system of claim 111 wherein said maintenance operations computer controller further comprises:
fifth means for generating a list of the identified parts, to facilitate ordering of the identified parts.

127. The computer integrated maintenance system of claim 126 wherein said fifth means further comprises means for generating a list of corresponding maintenance times for the identified parts, to facilitate ordering of the identified parts to be available for the corresponding maintenance times.

128. The computer integrated maintenance system of claim 126 wherein said fifth means further comprises means for generating orders for the identified parts.

129. The computer integrated maintenance system of claim 127 wherein said fifth means further comprises means for generating orders for the identified parts.

130. The computer integrated maintenance system of claim 111 further comprising an engineering change file having therein a schedule of engineering changes to be made on the machines;
wherein said maintenance operations computer controller is communicatively connected to the engineering change file;
wherein said first means further obtains a schedule of engineering changes from the engineering change file; and,
wherein said second means further comprises means for identifying the parts to be maintained and the corresponding maintenance time based upon the obtained schedule of actual and planned use and based upon the obtained schedule of engineering changes.

131. The computer integrated maintenance system of claim 111 wherein said third means further comprises:
means for accepting an indication that unplanned maintenance is performed on a broken part at a predetermined time; and
means for reassigning at least some of the corresponding maintenance times for identified parts in the same machine as the first part, to correspond to said predetermined time;
whereby at least some planned maintenance is rescheduled to occur during unplanned maintenance.

132. A computer integrated maintenance method for a complex including a plurality of machines used to perform a primary function and which also require maintenance; said computer integrated maintenance method being practiced on a maintenance operations computer controller and comprising the steps of:
generating an electronically stored parts manual, containing a hierarchical listing of parts in the plurality of machines in the complex;
obtaining a schedule of actual and planned use for the plurality of machines;
identifying parts in the hierarchical listing to be maintained during a predetermined time period, and a corresponding maintenance time during the predetermined time period for each identified part, based upon the obtained schedule;
reassigning the corresponding maintenance times for the identified parts, based upon the hierarchical listing of parts in the electronically stored parts manual, to reduce lost use time for complex; and
generating a revised schedule of planned use based upon the reassigned maintenance times for the identified parts;
whereby use of the complex may be controlled based upon the revised schedule of planned use to allow for maintenance activities.

133. The computer integrated maintenance method of claim 132 wherein said reassigning step comprises the steps of:
determining when a machine is inactive, based upon the obtained schedule; and,
reassigning the corresponding maintenance times for at least some of the identified parts to the time when the machine including the at least some of the identified parts is inactive.

134. The computer integrated maintenance method of claim 132 wherein said reassigning step comprises the step of grouping at least some of the corresponding maintenance times for identified parts in a machine, to reduce lost use time for that machine.

135. The computer integrated maintenance method of claim 134 wherein said reassigning step further comprises the steps of:
identifying a critical part to be maintained in a machine and a corresponding critical maintenance time; and
reassigning at least some of the corresponding maintenance times for other parts in the machine to the critical maintenance time.

136. The computer integrated maintenance method of claim 132 wherein said reassigning step further comprises the steps of:
determining manpower needed to perform maintenance according to the reassigned maintenance times; and
further reassigning the reassigned maintenance times to permit maintenance to be performed with available manpower.

137. The computer integrated maintenance method of claim 132 wherein said electronically stored parts manual further includes an end of life indicator for selected ones of the machines, the end of life indicator indicating that the associated machine is scheduled to be replaced or modified; and wherein said reassigning step comprises the step of eliminating the corresponding maintenance for parts in machines having an associated end of life indicator, to thereby reduce lost use time.

138. The computer integrated maintenance method of claim 132 wherein said electronically stored parts manual further contains means for identifying the type of maintenance for a part to be one of time dependent maintenance or usage dependent maintenance; and wherein said identifying step comprises the step of identifying parts to be maintained and a corresponding maintenance time for identified parts having usage dependent maintenance, based upon the obtained schedule.

139. The computer integrated maintenance method of claim 132 wherein said identifying step further comprises the step of accepting a user selection of said predetermined time period.

140. The computer integrated maintenance method of claim 132 wherein said generating step further comprises the step of generating an electronically stored parts manual containing an image file, including a corresponding image for parts in the hierarchical listing.

141. The computer integrated maintenance method of claim 132 wherein said hierarchical listing comprises a complete bill of materials for each machine.

142. The computer integrated maintenance method of claim 132 wherein said generating step further comprises the step of generating an electronically stored parts manual which identifies each of the parts as being one of a consumable, replaceable, generic or nonstocked part.

143. The computer integrated maintenance method of claim 132 wherein said generating step further comprises the step of generating an electronically stored parts manual including an associated part number for each of the parts.

144. The computer integrated maintenance method of claim 143 wherein said generating step further comprises the step of generating an electronically stored parts manual including a replacement part number for selected ones of the parts.

145. The computer integrated maintenance method of claim 143 wherein said generating step further comprises the step of generating an electronically stored parts manual including an industry standard part number for selected ones of the parts.

146. The computer integrated maintenance method of claim 132 wherein said generating step further comprises the step of generating a plurality of electronically stored parts manuals, a respective one of which contains a hierarchical listing of parts in a respective one of the machines.

147. The computer integrated maintenance method of claim 132 further comprising the step of:
generating a list of the identified parts, to facilitate ordering of the identified parts.

148. The computer integrated maintenance method of claim 147 wherein said list generating step further comprises the step of generating a list of corresponding maintenance times for the identified parts, to facilitate ordering of the identified parts to be available for the corresponding maintenance times.

149. The computer integrated maintenance method of claim 147 wherein said list generating step further comprises the step of generating orders for the identified parts.

150. The computer integrated maintenance method of claim 148 wherein said list generating step further comprises the step of generating orders for the identified parts.

151. The computer integrated maintenance method of claim 132 further comprising the step of obtaining an engineering change file having therein a schedule of engineering changes to be made on the machines;
wherein said schedule obtaining step further comprises the step of obtaining a schedule of engineering changes from the engineering change file; and,
wherein said identifying step further comprises the step of identifying the parts to be maintained and the corresponding maintenance time based upon the obtained schedule of actual and planned use and based upon the obtained schedule of engineering changes.

152. The computer integrated maintenance method of claim 132 wherein said reassigning step further comprises the steps of:
accepting an indication that unplanned maintenance is performed on a first part at a predetermined time; and
reassigning at least some of the corresponding maintenance times for identified parts in the same machine as the first part, to correspond to said predetermined time;
whereby at least some planned maintenance is rescheduled to occur during unplanned maintenance.

153. A compute integrated maintenance system for a complex including a plurality of machines used to perform a primary function and which also require maintenance; said computer integrated maintenance system comprising;
an electronically stored parts manual, containing a hierarchical listing of parts in the plurality of machines in the complex;
maintenance operations computer controlling means, communicatively connected to the electronically stored parts manual, said maintenance operations computer controlling means comprising:
maintenance schedule management means, for identifying parts in the hierarchical listing to be maintained during a predetermined time period based upon a planned use schedule for the machines, and for scheduling maintenance activities for the identified parts to reduce loss of use of the complex;

engineering change control management means, for integrating engineering change control activities into the scheduled maintenance activities;

parts manual management means, for updating the hierarchical listing in response to maintenance activities and engineering change control activities; and, spares inventory management means, for generating requirements to order replacement parts for the identified parts to be available for use in the scheduled maintenance activities.

154. The computer integrated maintenance system of claim 153 wherein said maintenance schedule management means further comprises:

means for accepting an indication that unplanned maintenance will be performed during said predetermined time period; and, means for scheduling maintenance activities for the identified parts based upon the planned use schedule and the indication of unplanned maintenance, to reduce loss of use.

155. The computer integrated maintenance system of claim 153 wherein said maintenance schedule management means identifies parts to be maintained during the predetermined time period based upon one of projected use or the elapsed time since last replacement.

156. The computer integrated maintenance system of claim 153 wherein said maintenance schedule management means minimizes loss of use by scheduling non-critical maintenance in a predetermined machine to occur concurrently with critical maintenance in the predetermined machine.

157. The computer integrated maintenance system of claim 153 wherein said maintenance schedule management means further comprises means for scheduling maintenance activities for the identified parts to allow scheduled maintenance activities to be performed using predetermined manpower levels.

158. The computer integrated maintenance system of claim 153 wherein said hierarchical listing of parts in said electronically stored parts manual comprises a plurality of parts levels from a lowest level to a highest level, and wherein each part in the lowest level is identified as being one of a consumable part which is consumed by the machine, a replaceable part which has an extended life but is subject to wear or failure, a generic part which is a common part used in large numbers on many of the machines, and a non-stocked part which does not normally require replacement.

159. The computer integrated maintenance system of claim 153 wherein said electronically stored parts manual further includes an associated part number for each of the parts.

160. The computer integrated maintenance system of claim 159 wherein said electronically stored parts manual further includes a replacement part number for selected ones of the parts.

161. The computer integrated maintenance system of claim 159 wherein said electronically stored parts manual further includes an industry standard part number for selected ones of the parts.

162. The computer integrated maintenance system of claim 153 wherein said electronically stored parts manual comprises a plurality of electronically stored parts manuals, a respective one of which contains a hierarchical listing of parts in the plurality of machines.

163. The computer integrated maintenance system of claim 153 wherein said engineering change control management means comprises means for integrating engineering change control activities into the scheduled maintenance activities based upon one of a specified engineering control implementation date, consumption of spare parts, or a specified maintenance activity.

164. The computer integrated maintenance system of claim 153 wherein said maintenance schedule management means further comprises means for generating a daily maintenance schedule to identify maintenance activities to be performed each day to reduce loss of use.

165. The computer integrated maintenance system of claim 153 further comprising:

an electronically stored spares inventory file for identifying generic parts used in said plurality of machines and replaceable parts used in said plurality of machines; and said spares inventory management means further comprising means for generating requirements to order a generic part when an inventory quantity falls below a predetermined quantity and for identifying requirements to order a replacement part to be available for use in the scheduled maintenance activities.

* * * * *